United States Patent
Herder, III et al.

(10) Patent No.: US 11,343,099 B2
(45) Date of Patent: *May 24, 2022

(54) SYSTEM AND METHOD FOR SECURING PERSONAL INFORMATION VIA BIOMETRIC PUBLIC KEY

(71) Applicant: Badge Inc., Lewes, DE (US)

(72) Inventors: Charles H. Herder, III, Dallas, TX (US); Tina P. Srivastava, Dallas, TX (US)

(73) Assignee: Badge Inc., Lewes, DE (US)

( * ) Notice: Subject to any disclaimer, the term of this patent is extended or adjusted under 35 U.S.C. 154(b) by 276 days.

This patent is subject to a terminal disclaimer.

(21) Appl. No.: 16/416,073

(22) Filed: May 17, 2019

(65) Prior Publication Data
US 2019/0356491 A1 Nov. 21, 2019

Related U.S. Application Data

(60) Provisional application No. 62/672,822, filed on May 17, 2018.

(51) Int. Cl.
*H04L 29/06* (2006.01)
*H04L 9/32* (2006.01)
(Continued)

(52) U.S. Cl.
CPC .......... *H04L 9/3231* (2013.01); *H04L 9/0637* (2013.01); *H04L 9/0866* (2013.01);
(Continued)

(58) Field of Classification Search
CPC ... H04L 9/3231; H04L 9/3263; H04L 9/0866; H04L 9/0618; H04L 9/14; H04L 9/30;
(Continued)

(56) References Cited

U.S. PATENT DOCUMENTS

| 7,272,245 B1 | 9/2007 | Layton |
| 2001/0031075 A1 | 10/2001 | Fujii |
(Continued)

FOREIGN PATENT DOCUMENTS

| EP | 1 175 749 B1 | 7/2005 |
| JP | 2006-166433 A | 6/2006 |
(Continued)

OTHER PUBLICATIONS

Herder et al., "Trapdoor Computational Fuzzy Extractors and Stateless Cryptographically-Secure Physical Unclonable Functions," IEEE Transactions on Dependable and Secure Computing, vol. PP, No. 99, 18 pages (Mar. 1, 2016).
(Continued)

*Primary Examiner* — Jorge L Ortiz Criado
*Assistant Examiner* — Kevin Ayala
(74) *Attorney, Agent, or Firm* — Sunstein LLP

(57) ABSTRACT

A device, method, and computer readable storage medium generate a biometric public key for an individual based on both the individual's biometric data and a secret, in a manner that verifiably characterizes both while tending to prevent recovery of either by anyone other than the individual. The biometric public key may be later used to authenticate a subject purporting to be the individual, using a computing facility that need not rely on a hardware root of trust. Such biometric public keys may be distributed without compromising the individual's biometric data, and may be used to provide authentication in addition to, or in lieu of, passwords or cryptographic tokens. Various use cases are disclosed, including: enrollment, authentication, establishing and using a secure communications channel, and cryptographically signing a message.

24 Claims, 30 Drawing Sheets

(51) Int. Cl.
  *H04L 9/30* (2006.01)
  *H04L 9/08* (2006.01)
  *H04L 9/06* (2006.01)

(52) U.S. Cl.
  CPC .............. *H04L 9/30* (2013.01); *H04L 9/3242* (2013.01); *H04L 9/3247* (2013.01); *H04L 2209/38* (2013.01)

(58) Field of Classification Search
  CPC . H04L 63/0807; H04L 63/0861; G06F 21/32; G06F 21/575; G06F 2221/2117; G06F 2221/034; G06F 21/36
  See application file for complete search history.

(56) References Cited

U.S. PATENT DOCUMENTS

| | | |
|---|---|---|
| 2006/0123239 A1 | 6/2006 | Martinian et al. |
| 2007/0118758 A1 | 5/2007 | Takahashi et al. |
| 2007/0140145 A1 | 6/2007 | Kumar et al. |
| 2008/0025575 A1 | 1/2008 | Schonberg et al. |
| 2008/0072068 A1 | 3/2008 | Wang et al. |
| 2008/0235515 A1 | 9/2008 | Yedidia et al. |
| 2009/0271634 A1 | 10/2009 | Boult et al. |
| 2010/0287369 A1* | 11/2010 | Monden ................ H04L 9/3247 713/156 |
| 2011/0126024 A1 | 5/2011 | Beatson et al. |
| 2011/0302420 A1 | 12/2011 | Davida |
| 2012/0087550 A1 | 4/2012 | Akkermans et al. |
| 2012/0195475 A1 | 8/2012 | Abiko |
| 2014/0105403 A1 | 4/2014 | Baldi et al. |
| 2014/0139318 A1 | 5/2014 | Malpani et al. |
| 2014/0372766 A1 | 12/2014 | Ryan, Jr. |
| 2016/0034585 A1 | 2/2016 | Rokhlenko et al. |
| 2016/0125416 A1 | 5/2016 | Spencer et al. |
| 2016/0285871 A1* | 9/2016 | Chathoth ............ H04L 63/0838 |
| 2017/0085562 A1 | 3/2017 | Schultz et al. |
| 2017/0141920 A1 | 5/2017 | Herder, III et al. |
| 2017/0337364 A1 | 11/2017 | Whaley et al. |
| 2018/0114226 A1 | 4/2018 | Desai et al. |

FOREIGN PATENT DOCUMENTS

| | | |
|---|---|---|
| JP | 2007-148470 A | 6/2007 |
| JP | 2008-502071 A | 1/2008 |
| KR | 10-2018-0000849 A | 1/2018 |
| KR | 101845192 B1 | 4/2018 |
| WO | WO 2005/069534 | 7/2005 |
| WO | WO-2005069534 A1 * | 7/2005 .............. H04L 9/08 |
| WO | WO 2005/122467 A1 | 12/2005 |
| WO | WO 2017/075063 A1 | 5/2017 |

OTHER PUBLICATIONS

Herder et al., "A Stateless Cryptographically-Secure Physical Unclonable Function," IEEE Transactions on Dependable and Secure Computing, 17 pages, (2015).

Rivest et al., "A Method for Obtaining Digital Signatures and Public-Key Cryptosystems," Communications of the ACM, vol. 21, No. 2, pp. 120-126, (Feb. 1978).

Herder., "Trapdoor Computational Fuzzy Extractors," International Association for Cryptologic Research, vol. 20141118:190315, Nov. 15, 2014, 14 pages.

Fuller et al., "Computational Fuzzy Extractors," International Conference on Computer Analysis of Images and Patterns, Springer, Berlin, Heidelberg, Dec. 1, 2013, pp. 174-193.

Nandakumar et al., "Fingerprint-Based Fuzzy Vault: Implementation and Performance," IEEE Transactions on Information Forensics and Security, vol. 2, No. 4, Dec. 2007, pp. 744-757.

International Searching Authority, International Search Report—International Application No. PCT/US2016/061647, dated Feb. 21, 2017, together with the Written Opinion of the International Searching Authority, 14 pages.

U.S. Patent and Trademark Office/Lin Chang, Non-Final Rejection, U.S. Appl. No. 15/349,781, dated Jul. 23, 2018, 25 pages.

U.S. Patent and Trademark Office/Lin Chang, Final Rejection, U.S. Appl. No. 15/349,781, dated Feb. 14, 2019, 29 pages.

U.S. Patent and Trademark Office/Lin Chang, Non-Final Rejection, U.S. Appl. No. 15/349,7481, dated Jun. 12, 2019, 25 pages.

European Patent Office, Extended European Search Report, Application No. 16865141.2, dated Jun. 21, 2019, 5 pages.

Dodis et al., *Fuzzy Extractors: How to Generate Strong keys from Biometrics and Other Noisy Data*, Apr. 17, 2004, Advances in Cryptology—Eurocrypt 2004, LNCS, Springer, pp. 523-540, 978-3-540-21935-4, XP019005038.

European Patent Office, Communication pursuant to Article 94(3) EPC, Application No. 16865141.2, dated Feb. 7, 2020, 6 pages.

International Searching Authority/KR, International Search Report and Written Opinion of the International Searching Authority, Application No. PCT/US2019/032996, dated Sep. 24, 2019, 13 pages.

International Searching Authority/EPO, International Search Report and Written Opinion of the International Searching Authority, Application No. PCT/2020/015607, dated Apr. 17, 2020, 15 pages.

\* cited by examiner

Hot Wallets vs. Cold Wallets

Hot Wallets
- ✓ Can make trades
- ✓ Can access from anywhere
- ✗ Stores your private keys online
- ✗ Vulnerable to hacking Players in this space:
- Coinbase, BitGo, etc.

Cold Wallets
- ✓ You have your own private keys
- ✓ Resilient to hacking
- ✗ User friction
- ✗ If you lose your device or piece of paper with seed, you lose your money Players in this space:
- Ledger, Trezor, etc.

Fig. 13

The benefits of hot and cold wallets, with none of the downsides.

SYSTEM AND METHOD FOR SECURING PERSONAL INFORMATION VIA BIOMETRIC PUBLIC KEY

CROSS-REFERENCE TO RELATED APPLICATION

This application claims the benefit of U.S. provisional patent application Ser. No. 62/672,822, filed May 17, 2018 [practitioner's file 4223/1003]. This application is related to U.S. patent application Ser. No. 15/349,781 (corresponding to U.S. Patent Application Publication No. US 2017/0141920) and PCT Patent Application No. PCT/US2016/061647 (corresponding to International Publication No. WO 2017/083732, both filed Nov. 11, 2016 and claiming the benefit of U.S. Provisional Application No. 62/255,186, filed Nov. 13, 2015. Each of these related applications is hereby incorporated herein by reference in its entirety.

FIELD OF THE INVENTION

The present invention relates to security arrangements for protecting computers, components thereof, programs or data against unauthorized activity by providing authentication of user biometric data, and more particularly to using cryptographic means for verifying the identity or authority of the user using biometric data of the user without the need for non-transient storage of the biometric data.

DESCRIPTION OF RELATED ART

The prior art of biometric authentication systems generally falls into one of the following two categories. The first category provides authentication using a biometric database, where all biometrics are stored in a database locally or on a secure server. To authenticate a subject who purports to be a known individual, one collects biometric data from the subject and compares it with biometric data, stored in the secure database, that is associated with the individual. The subject is authenticated if his or her data matches the associated data in the database. Because biometric data capture processes produce slightly different data each time, the biometric data captured from the subject will not exactly match the biometric data originally captured from the individual, so a match must be performed using some closeness-of-fit measure.

The use of biometric databases suffers from at least three distinct drawbacks. The first drawback is that the database is a single point of failure: compromise of the secure server compromises all individuals' biometrics contained therein. This is a critical failure, because individuals cannot generate new biometrics (e.g., iris patterns in the eye, fingerprints, and other such physical characteristics). Remediation of this drawback requires considerable expense. To protect non-transient storage of biometrics locally requires expensive, tamper-proof memory, while to protect non-transient storage of biometrics on a publicly accessible database requires network firewalls and other considerable security measures. The second drawback is that authentication using remote biometric databases requires constant connectivity: a biometric scanner must communicate with the database server in order to validate user, and failure of the communications link could prevent authentication. This is a critical failure for time-sensitive authentication scenarios. (A locally stored database does not scale efficiently to the scenario where many users may be using multiple biometric scanners.) The third drawback is that a user has to provision authentication data with each device before using it. If a person owns several smartphones, for example, she must spend the time to set up biometric passwords on each device.

This first category of biometric authentication is analogous to "secret key" cryptosystems, in that they store the "secret key" i.e., the biometric template in some secure database, and the user presents his/her biometric template for authentication. Any compromise of the biometric secret results in a break in security. This is to be contrasted with the public key model of cryptography, wherein a user securely stores a private key, and publishes a public key that other parties may use to communicate securely. Adapting biometric authentication to such a public key model has been a longstanding goal, which brings us to the second category of biometric systems.

The second category of prior art biometric authentication systems uses a biometric "mask" (which is usually generated during user enrollment, is publicly available, and is unique per-user) with a code offset error correction. In this category, instead of storing the biometric data directly, one stores which bits from captured biometric data are stable (that is, unlikely to be noisy). Then, one uses error-correcting codes to correct for remaining noise. This approach also suffers from insecurity. It is known in the academic community and in industry that knowing which bits are stable could result in compromising the biometric itself, so storing which bits are stable can be as bad as storing the biometric itself. Moreover, if one attempts to store the stability mask in a secure database, then the same disadvantages of the biometric database reappear, namely the requirements to separately secure the database and to require constant availability. Finally, this approach is typically infeasible for real-world applications. For example, the best known error correcting codes cannot correct enough errors to extract keys reliably.

In summary, most commercially deployed biometric systems follow the first, "secret key" model. While there has been significant effort devoted to adapting biometrics to a public key model, current implementations of technologies are either insecure, impractical, or both.

SUMMARY OF ILLUSTRATED EMBODIMENTS

Various embodiments of the invention solve the above problems with biometric authentication by avoiding entirely the requirement to store either the original biometric data, or data that can be used to recover it. Instead, biometric data captured from an individual are used to encrypt a secret number, thereby forming a public key characterizing a biometric, or a "biometric public key". Advantageously, the encryption may be performed in a hardware security module (HSM), for example in an HSM that implements the United States Federal Information Processing Standards (FIPS), series 140, that defines requirements for such modules. The biometric data and the secret number are combined in such a way that biometric data later captured from a subject purporting to be the individual can be used to decrypt the secret number in a verifiable way, despite the fact that biometric data capture is not exactly repeatable.

These embodiments are particularly robust for several reasons. A biometric public key described herein may be distributed freely, as the key is self-validating. Thus, a subject may carry her own biometric public key in a physical token for authentication as an individual. For example, the physical token may be public and non-electronic, such as a QR code on a business card. In this way, the need is avoided for a central biometric database, especially one that must be constantly available yet safeguarded against compromise.

Another reason the disclosed embodiments are robust is that they may rely on the advantages of the biometric mask, without its attendant disadvantages. That is, a biometric public key may be created using the portions of the biometric data that are most repeatable between measurements and best distinguish between different individuals. When the extracted information is qualified in this manner, it provides a dramatically better basis for authentication, because the information extracted this way from one person's biometric will differ substantially and in a repeatable way from the information extracted from another person's biometric.

Yet another reason why the method of authentication is uniquely robust is that the information extracted from the biometric data is not accessible to the public. Instead, the extracted information is processed so as to produce a public key, and then the extracted information is discarded. Because neither the biometric data nor any intermediate processing results are stored, they cannot be stolen, and therefore the biometric data is much more secure than in prior art systems. The public key can be used in the myriad of ways in which public keys have been used in the prior art—however, a biometric public key has the benefit of being uniquely associated with an individual by virtue of the biometric.

Thus, a first embodiment of the invention is a system for using biometric data to authenticate a subject as an individual whose biometric data has been previously obtained using a first transducer, without the need for non-transient storage of the biometric data. The device includes a second transducer and a first computing facility that is coupled to the second transducer. The first computing facility has a computing processor and a non-transitory computer readable storage medium encoded with instructions that, when executed by the computing processor, establish certain processes for authentication.

A first such process is receiving by the first computing facility, a transaction request. A second such process is receiving by the first computing facility, from the second transducer, a digital electronic signal that characterizes a biometric of the subject. A third such process is extracting by the first computing facility, from the digital electronic signal, (a) a set of biometric values of the subject and (b), for each member of the set of biometric values of the subject, a confidence value indicating a degree of confidence that the corresponding biometric value is stable between characterizations. A fourth such process is using the confidence values to select, by the first computing facility, a confident subset of the set of biometric values of the subject, the confident subset being a reliable discriminant of the identity of the subject based on the biometric. A fifth such process is receiving by the first computing facility, from a storage facility, a biometric public key that was computed based on a secret number and the biometric data of the individual that has been previously obtained using the first transducer, wherein the biometric public key verifiably characterizes both the biometric data of the individual and the secret number without the need for non-transient storage of either the biometric data of the individual or the secret number. A sixth such process is calculating, by the first computing facility, a candidate value for the secret number using the biometric public key and the confident subset. A seventh such process is determining by the first computing facility whether the subject is authenticated as the individual by determining whether the candidate value for the secret number is deemed equivalent to the secret number characterized by the biometric public key. When the subject is authenticated as the individual, constructing by the first computing facility the transaction, digitally signing the transaction using the secret number, and transmitting the signed transaction to a transaction processor.

Variations on this first embodiment are contemplated. In one variant, the storage facility is a public data source for storing the biometric public key, the device further comprising a hardware security module for authenticating the public data source to the device. Another variant further comprises a non-transitory data store, and the storage facility is the non-transitory data store. In another variant, the storage facility is a cryptographic token provided by the subject. In yet another variant, the device includes a hardware security module for ensuring the integrity of the second transducer. In still another variant, the device includes a mathematics coprocessor.

In a further variant, the established processes further include receiving by the first computing facility, from the storage facility, a one-way function of the secret number, and transmitting, by the first computing facility, includes applying the one-way function to the candidate value for the secret number and comparing the result to the received one-way function of the secret number. The one-way function may be a cryptographic hash function.

The biometric public key may include data comprising a bitwise exclusive OR of (a) a vector of biometric values of the individual, with (b) a matrix product of a binary matrix with a representation of the secret number as a vector of bits. In a variant, the binary matrix is non-square, and transmitting, by the first computing facility, includes (a) calculating, by the first computing facility, a set of candidate biometric values of the individual using the biometric public key, the binary matrix, and the putative secret number, and (b) determining that a Hamming distance between the set of candidate biometric values of the individual and the set of extracted biometric values of the subject is less than a given threshold distance. The binary matrix is selected from the group consisting of (i) associated uniquely with the individual, (ii) associated uniquely with the device, (iii) permanently fixed as a design parameter wherein the same binary matrix can be used to authenticate multiple individuals, and (iv) combinations thereof. One variant includes a third transducer for inputting additional assurance data used to compute the biometric public key.

One variant further includes using, by the first computing facility, biometric data pertaining to a different measurable characteristic to authenticate a second subject as a second individual whose biometric data has been previously obtained. In some variants, the method further includes performing additional actions after a successful authentication of the subject as the individual. Thus, one variant further includes decrypting, by the first computing facility using the candidate value for the secret number, encrypted cipher text received by a computing device in which the first computing facility is disposed. Another variant includes digitally signing a message, by the first computing facility using the candidate value for the secret number. Yet another variant further includes receiving encrypted firmware for booting a computing device in which the first computing facility is disposed, by the first computing facility, from a memory of the computing device; decrypting, by the first computing facility using the candidate value for the secret number, the encrypted firmware to produce decrypted firmware; and providing the decrypted firmware by the first computing facility to a computing processor of the computing device. Still another variant further includes executing a cryptographic algorithm that operates on the secret number, by the first computing facility, responsive to a request message from an application executing on a computing processor of a computing device in which the first computing facility is disposed.

Another variant includes allowing by a second computing facility access to the resource by a designated owner of the resource with no time restriction; and allowing by the second computing facility access to the resource by a party other than the designated owner only when a specified condition has been satisfied. Optionally, in certain variants, the second computing facility is the same as the first computing facility. Alternatively or additionally, the specified condition is occurrence of a passage of a specified amount of time since last access to the resource. Alternatively or additionally, the transaction is access to a blockchain, and the specified condition is a time restriction based on a relative height of the blockchain. In a further alternative embodiment, instructions include a P2SH script.

Whereas the preceding features and embodiments have been expressed in relation to conditions under which a transaction is digitally signed, they can be applied equally to other embodiments wherein an individual has been authenticated, but in which digitally signing a transaction is not required.

Another embodiment of the invention is a system for at least one of peer-to-peer enrollment and authentication between a first device that purports to store biometric information of an individual and a second device being used by a subject purporting to be the individual. The system executes computer processes. The processes include receiving, by the second device, biometric information of the subject. The processes include running a protocol by the first and second devices to determine if the biometrics received by the second device match the biometrics stored by the first device above a predetermined confidence threshold, without the first device sending the biometric information of the individual to the second device and without the second device sending the biometric information of the subject to the first device. The processes further include authenticating the subject as the individual when the biometrics received by the second device are deemed equivalent to the biometrics stored by the first device above the predetermined confidence threshold.

Optionally, the first device is one of a plurality of candidate devices that are registered with a broker and that purport to store biometric information of the individual, and wherein the processes include as follows. The processes include providing, by the second device, specification information for the second device to the broker. The processes further include selecting, by the broker, the first device, from among the plurality of candidate devices, for at least one of peer-to-peer enrollment and authentication with the second device based on the specification information for the second device and specification information stored by the broker for each of the plurality of candidate devices. The processes also include connecting the first and second devices for at least one of peer-to-peer enrollment and authentication.

Alternatively or additionally, the processes include transferring user data from the first device to the second device after the subject has been authenticated as the individual. Alternatively or additionally, the processes include as follows. The processes include encrypting, by the first device, data stored on the first device. The processes also include transmitting, by the first device to the second device, the encrypted data. The processes further include decrypting, by the second device, the encrypted data to recover the data. The processes also include storing, by the second device, the data in the second device.

Alternatively or additionally, the processes include running a secure multiparty computation protocol between the first and second devices to compute a biometric matching function between the biometrics stored on the first and second devices without either one of the devices revealing its respective biometric information to the other.

Alternatively or additionally, the secure multiparty computation protocol include as follows. The protocol includes running an oblivious transfer (OT) step plus an execution of Yao's garbled circuits in a first direction from the first device to the second device to produce, in each device, a first output key. The protocol includes running an oblivious transfer (OT) step plus an execution of Yao's garbled circuits in a second direction from the second device to the first device to produce, in each device, a second output key. The protocol includes combining, by each device, the first and second output keys to produce a final output key. Alternatively or additionally, the system contains a secure enclave for processing biometric data. Alternatively or additionally, each enclave is configured to attest its integrity prior to authentication.

Another embodiment of the invention is a system for at least one of peer-to-peer enrollment and authentication between a first device and a second device, wherein there exists specification information for each device. The system executes computer processes. The processes include determining whether the specification information for the second device is compatible with the specification information for the first device. The processes further include failing the enrollment or authentication when the specification information for the second device is incompatible with the specification information for the first device.

Another embodiment of the invention is a system for at least one of peer-to-peer enrollment and authentication between a first device and a second device, wherein the first device is one of a plurality of candidate devices that are registered with a broker. The system the system executes computer processes. The processes include providing, by the second device, specification information for the second device to the broker. The processes also include determining, by the broker, whether any of the candidate devices are compatible with the second device based on the specification information for the second device and specification information stored by the broker for each of the plurality of candidate devices. The processes further include failing the enrollment or authentication when the specification information for the second device is incompatible with the specification information for the candidate devices.

Another embodiment of the invention is a system for using biometric data to encrypt target data of a subject as an individual whose biometric data has been previously obtained using a first transducer, without the need for non-transient storage of the biometric data. The device includes a second transducer and a computing facility that is coupled to the second transducer. The computing facility has a computing processor and a non-transitory computer readable storage medium encoded with instructions that, when executed by the computing processor, establish certain processes.

A first such process is receiving by the computing facility, target data to be encrypted. A second such process is receiving by the computing facility, from the second transducer, a digital electronic signal that characterizes a biometric of the subject. A third such process is extracting by the computing facility, from the digital electronic signal, (a) a set of biometric values of the subject and (b), for each member of the set of biometric values of the subject, a confidence value indicating a degree of confidence that the corresponding biometric value is stable between characterizations. A fourth such process is using the confidence values to select, by the computing facility, a confident subset of the set of biometric values of the subject, the confident subset being a reliable discriminant of the identity of the subject based on the biometric. A fifth such process is receiving by the computing facility, from a storage facility, a biometric public key that was computed based on a secret number and the biometric data of the individual that has been previously obtained using the first transducer, wherein the biometric public key verifiably characterizes both the biometric data of the individual and the secret number without the need for non-transient storage of either the biometric data of the individual or the secret number. A sixth such process is calculating, by the computing facility, a candidate value for the secret number using the biometric public key and the confident subset. A seventh such process is determining by the computing facility whether the candidate value for the secret number is deemed equivalent to the secret number characterized by the biometric public key. An eighth such process is encrypting the target data using the biometric public key.

Another embodiment of the invention is a system to decrypt encrypted target data using biometric data of a subject as an individual whose biometric data has been previously obtained using a first transducer, without the need for non-transient storage of the biometric data. The system includes a second transducer and a computing facility that is coupled to the second transducer. The computing facility has a computing processor and a non-transitory computer readable storage medium encoded with instructions that, when executed by the computing processor, establish certain processes.

A first such process is receiving by the computing facility, the encrypted target data, wherein the target data has been encrypted using a biometric public key of the subject, wherein the biometric public key was computed based on a secret number and the biometric data of the individual that has been previously obtained using the first transducer, wherein the biometric public key verifiably characterizes both the biometric data of the individual and the secret number without the need for non-transient storage of either the biometric data of the individual or the secret number. A second such process is receiving by the computing facility, from the second transducer, a digital electronic signal that characterizes a biometric of the subject. A third such process is extracting by the computing facility, from the digital electronic signal, (a) a set of biometric values of the subject and (b), for each member of the set of biometric values of the subject, a confidence value indicating a degree of confidence that the corresponding biometric value is stable between characterizations. A fourth such process is using the confidence values to select, by the computing facility, a confident subset of the set of biometric values of the subject, the confident subset being a reliable discriminant of the identity of the subject based on the biometric. A fifth such process is receiving by the computing facility, from a storage facility, the biometric public key. A sixth such process is calculating, by the computing facility, a candidate value for the secret number using the biometric public key and the confident subset. A seventh such process is determining by the computing facility whether the candidate value for the secret number is deemed equivalent to the secret number characterized by the biometric public key. An eighth such process is using the secret number to decrypt the encrypted target data.

A person having ordinary skill in the relevant art may appreciate that the invention may be embodied in other ways.

BRIEF DESCRIPTION OF THE DRAWINGS

The foregoing features of embodiments will be more readily understood by reference to the following detailed description, taken with reference to the accompanying drawings, in which:

FIG. 13 compares some of the benefits and detriments of hot wallets and cold wallets as known in the art;

DETAILED DESCRIPTION OF SPECIFIC EMBODIMENTS

Figure 1:
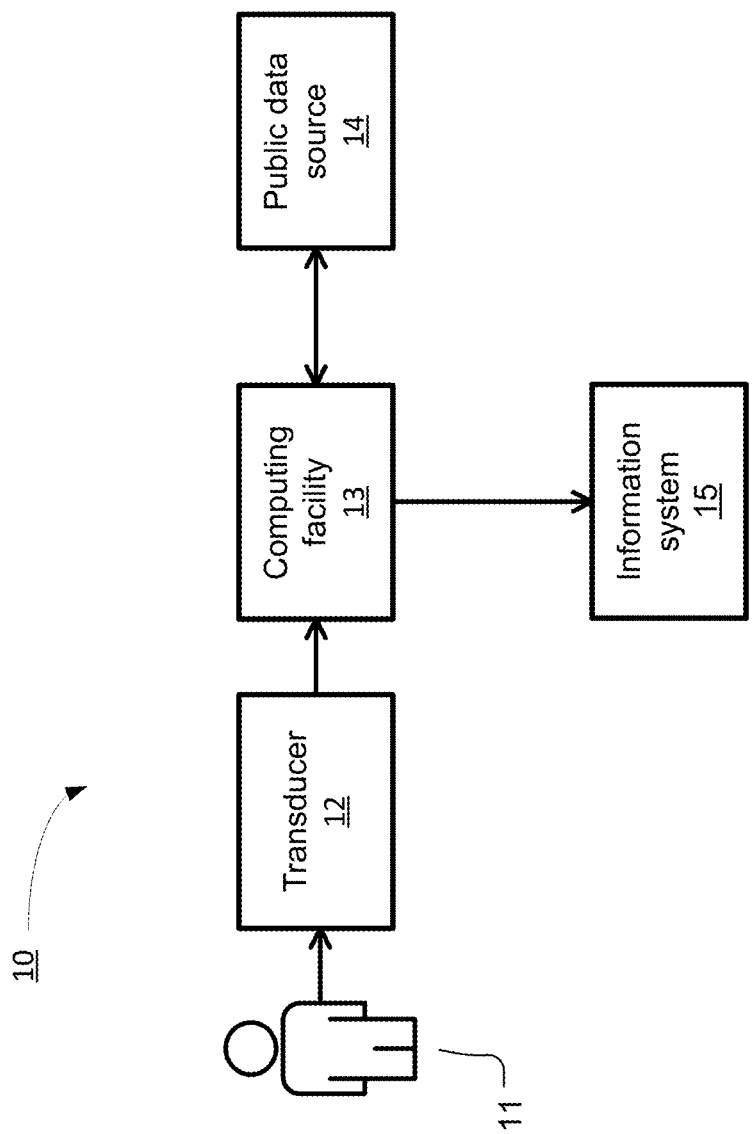
FIG. 1 is a schematic representation of an environment in which an embodiment of the invention may be used.

Definitions. As used in this description and the accompanying claims, the following terms shall have the meanings indicated, unless the context otherwise requires:

An "individual" is an animate or inanimate object having a unique identity, and may be a human or other organism.

A "subject" is an animate or inanimate object purporting to have the unique identity of a specific individual.

A "biometric" is a measurable characteristic of a distinct individual or of a distinct group of individuals, or a combination of such characteristics, that may be used to determine the unique identity of the individual or group. Some non-limiting examples of such measurable organic characteristics are: an iris pattern, a retinal blood vessel pattern, a fingerprint, a genetic pattern or DNA fingerprint, a voice print, a speed or cadence of typing, a pattern of blood flow, a brain structure or electrical pattern, a behavioral signal (such as hand movements), expertise-based continuous biometrics, and a gait of the individual. An example of a measurable inorganic characteristic, when the individual is a distinct silicon wafer having transistors, is a random variation in the transistor gate delays caused by the process of manufacturing the distinct silicon wafer; such a "silicon biometric" is detectable using a ring oscillator, as is known in the art. Some additional non-limiting examples of biometrics include veins in an individual's wrist, pulse, input from a capacitive touch screen (e.g., behavioral, multi-touch, ear and/or cheek print, etc.), liveness detection, characteristics of an individual's driving or automotive behavior, brain biometrics, behavioral biometric signals such as touchscreen interaction, phone location, entropy from various types of personal information available from the user or other sources (e.g., an individual's date of birth, place of birth, social security number, driver's license number, past or present street address, organization membership numbers, browser history, stable details of an online profile such as a Facebook page, credit history information, etc.). Further, an individual may select an object (e.g., a token or totem) and use information about the object (e.g., a photograph or characteristic of this object) as a form of identifier; in some embodiments, the object may be a unique secret object, while in other embodiments, the object is not unique but rather a common object (e.g., a coin, paperclip, spoon). For behavioral characteristics, a user can be trained to perform certain behaviors so that an untrained user cannot replicate behavior.

A "biometric value" is a categorization of a portion of a measurement of a biometric according to a property of the measurement. For example, if the biometric is an iris print, and measurement consists of imaging an iris as an array of pixels, then the relevant portion of the measurement is a single pixel in the image, and the relevant property may be a brightness or color of the pixel to be categorized. Measurement of the entire biometric may include many biometric values.

A "confidence value for a biometric value", or simply "confidence value", is a number indicating a degree of relative confidence that the corresponding biometric value was correctly categorized.

A "confident subset" of biometric data is a collection of biometric values, selected according to their respective confidence values, that is (a) large enough to uniquely identify an individual within a given universe of identifiable individuals, and (b) small enough to be repeatably obtainable across measurements of the corresponding biometric under different conditions.

A "transducer" is any device having, as an output, an electronic signal that encodes a characterization of a biometric as a set of measured biometric values. If the output of such a device is not directly digital, then the term "transducer" includes any device additionally used to transform the output into digital form.

A "computing facility" means an electronic system having components that include a computing processor and a memory storing instructions that can be executed by the computing processor. A computing facility may be implemented, for example, by any of a desktop computer, a smartphone, a tablet computer, or other electronic devices. A computing facility also may be implemented by a wide range of other devices including client-server combinations, virtual machines, and embedded computing systems, including in, for example point-of-sale machines, automated teller machines (ATMs), physical access barriers, video display kiosks, and other electronic devices.

A "public key characterizing a biometric" (sometimes hereinafter a "biometric public key") is a number that (a) is calculated, based on a secret number and a set of biometric values of an individual, in a manner tending to prevent recovery of either the secret number or the set of biometric values by a subject other than the individual, and (b) verifiably characterizes both the biometric data of the individual and the secret number, without the need for non-transient storage of either the biometric data of the individual or the secret number. A biometric public key has nothing to do per se with public key/private key systems known in the art (of which some systems are sometimes called "PKI", for "public key infrastructure"), such as the RSA system. (See Rivest, Ronald L., Adi Shamir, and Len Adleman. "A method for obtaining digital signatures and public-key cryptosystems". *Communications of the ACM* 21.2 (1978): 120-126.)

A "storage facility" is a local or remote system for non-transitory storage of digital data. A storage facility optionally includes a server system to serve the data responsive to a request message from a processor, or the system can be accessed directly by the processor.

A "transaction" means performance of any action by or on behalf of a first party in relation to a second party, including accessing or posting a resource in a blockchain.

A "party" means any member selected from the group consisting of an individual person, an individual entity, an individual device, and any aggregations, combinations, and virtualizations of the foregoing. A party includes a certificate authority.

To encrypt target data "using" a biometric public key means to encrypt the target data via a member selected from the group consisting of (a) the biometric public key directly and (b) a component (such as a secret number) of the biometric public key.

Concepts relevant to the present invention have been disclosed in the article by C. Herder, L. Ren, M. van Dijk, M.-D. M. Yu, and S. Devadas, "Trapdoor computational fuzzy extractors and stateless cryptographically-secure physical unclonable functions," IEEE Transactions on Dependable and Secure Computing, vol. PP, no. 99, published Mar. 1, 2016 (available online at http://ieeexplore.ieee.org/document/7422776/), the contents of which are incorporated by reference in their entirety.

FIG. 1 is a schematic representation of an environment 10 in which an embodiment of the invention may be used. The environment 10 includes a subject 11 who desires access to an information system 15, such as a computer, smartphone, or other such electronic device. However, in accordance with standard data security practices, the information system 15 is protected by a security mechanism that permits access only once the subject has been authenticated as an individual authorized to use the information system 15. Alternatively, the subject 11 is not necessarily desiring access, but the embodiment is being used for surveillance, search, or track applications. Other possible uses are discussed below; it should be appreciated that various embodiments of the invention may be used to perform authentication of subjects as individuals generally, and the choice of embodiments discussed herein is made for concreteness, not to limit the scope of the invention.

Figure 2:
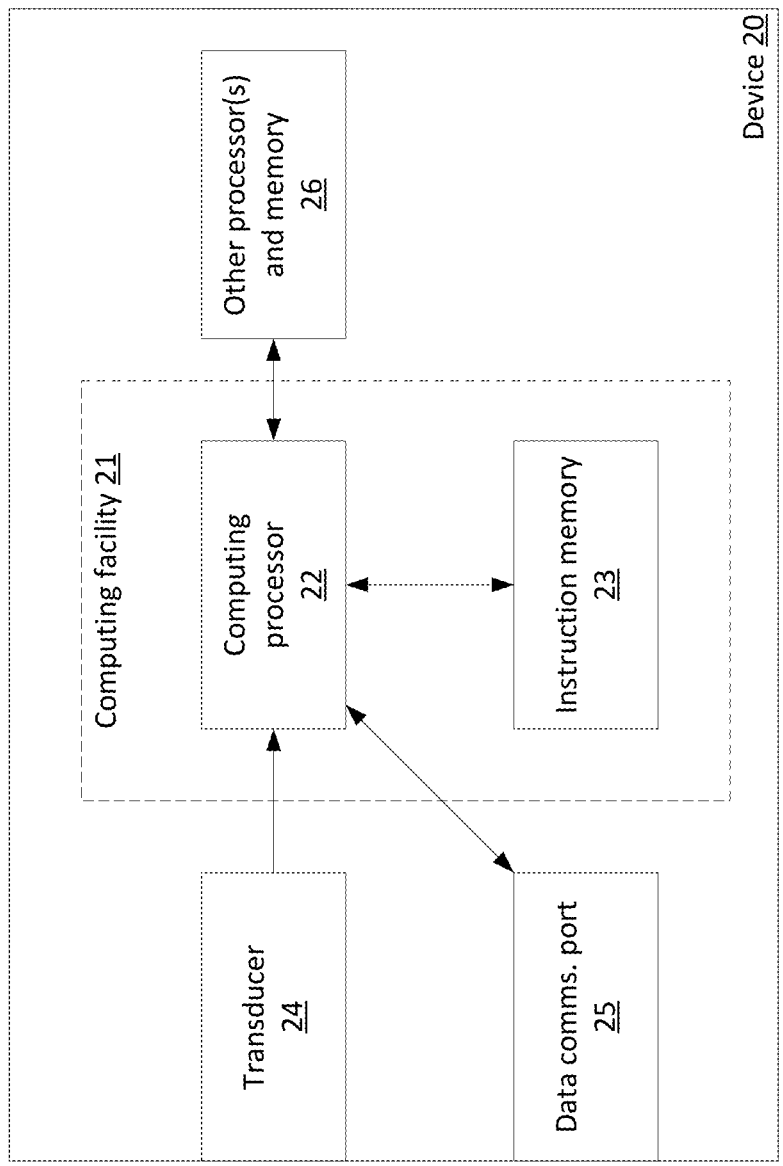
FIG. 2 is a schematic representation of a device for generating or using a biometric public key in accordance with an embodiment of the invention.

To facilitate the authentication process, the subject 11 is presented to a transducer 12, which obtains a biometric. The transducer 12 may be, for example, an iris scanner or a fingerprint reader. The transducer 12 converts raw biometric data, such as an image, into a digital electronic signal that characterizes the biometric of the subject. The digital electronic signal is communicated to a computing facility 13 that performs the computations required to authenticate the subject 11. To perform this task, the computing facility 13 obtains a biometric public key from a storage facility 14. The computing facility 13 may be implemented using hardware, and firmware or software known in the art. In some embodiments of the invention, the transducer 12 and computing facility 13 are embodied in a single device, such as a smartphone. Details of one such embodiment are shown in FIG. 2. The storage facility 14 may be any source of data, including a key store such as a cryptographic token, cloud data storage, website, a server, or any other such storage device.

As discussed in more detail below, the computing facility 13 combines the characterization of the biometric present in the digital electronic signal with the biometric public key to compute a secret. For example, the secret may be a password, or other such information; in general, the secret may be any digital data. However, since computation of the secret may involve various mathematical or cryptographic operations, the secret is referred to in what follows as a "secret number" on which those operations may be performed, with the understanding that its conversion to ASCII or Unicode characters (or some other format) does not change its information content.

In one embodiment, the biometric public key contains sufficient information for the computing facility 13 to determine that the secret number was correctly computed. For example, the secret number may be encrypted using a one-way function, such as a cryptographic hash, and the hashed value is communicated with the biometric public key. To authenticate the subject 11, the one-way function is applied to the computed (candidate) secret number to determine whether there is a match. Once the determination has been made, the computing facility 13 transmits to the information system 15 an indication that the subject 11 is authenticated as a known individual.

In another embodiment, the computing facility 13 transmits the secret to the information system 15, which determines whether the subject 11 is authenticated as the known individual. For example, the information system 15 could determine, using processes known in the art, whether the secret corresponds to a password already associated with the known individual, and grant or deny access accordingly.

FIG. 2 is a schematic representation of a device 20 for generating or using a biometric public key in accordance with an embodiment of the invention. During an authentication process, the device 20, and more particularly the computing facility 21, is configured so that a subject is authenticated as a known individual only after the several processes shown in FIGS. 4 and 6 have been successfully completed.

The device 20 includes a computing facility 21, which has a computing processor 22 and an instruction memory 23. The computing facility 21 may be, for example, a hardware security module as known in the art. The computing processor 22 may be any conventional microprocessor, application-specific integrated circuit (ASIC), field-programmable gate array (FPGA), or other device. The instruction memory 23 is operable to store instructions that can be executed by the computing processor 22, and can be a conventional volatile random access memory (RAM) or similar as known in the art, a non-volatile memory such as a read only memory (ROM) or similar as known in the art, or a combination of such technologies.

The device 20 also includes a transducer 24, coupled to the computing facility 21, that is operable to output a digital electronic signal that characterizes a biometric. The transducer 24 may be, for example, an iris scanner or fingerprint imager, or other technology known in the art for obtaining biometric data.

The device 20 further includes an optional data communications port 25, coupled to the computing facility 21. The data communications port 25 may be used during an enrollment process to transmit a biometric public key, computed by the computing facility 21, to another device such as a cryptographic token, or to a public data source such as a public key database as described below in connection with FIGS. 3-6. Also, the data communications port 25 may be used during an authentication process to receive a biometric public key from such a cryptographic token or public data source. Therefore, the physical configuration of the data communications port 25 may vary depending on application, but may in any event be a wired data networking port (such as an Ethernet port) or a wireless data networking port (such as a Bluetooth or other near-field communication transceiver).

Finally, the device 20 may include one or more other processors and memory 26. The computing facility 21 may be designed to be incorporated into the electronic circuitry of many devices, including desktop computers, smartphones, tablet computers, and other electronic devices, that perform functions unrelated to authentication. The other processors and memory 26 are shown to demonstrate how a computing facility 21 may be incorporated into such devices.

In some embodiments of the invention, the data communications port 25 is configurable to be coupled to a public data source that contains the biometric public key. Such embodiments may also include a hardware security module for authenticating the public data source to the device according to known methods. Alternately, the data communications port may physically receive a cryptographic token for storing the biometric public key. Note that this alternate embodiment does not require a reliable or consistent connection between the embodiment and any public data source, because the cryptographic token may be authenticated using known methods.

In some alternate embodiments of the invention, the device includes a hardware security module for ensuring the integrity of the second transducer. Such hardware security modules are known in the art. Alternately, the device may include a mathematics coprocessor for accelerating computation of mathematical operations relating to the equation. Such processors are also known in the art.

Figure 3:
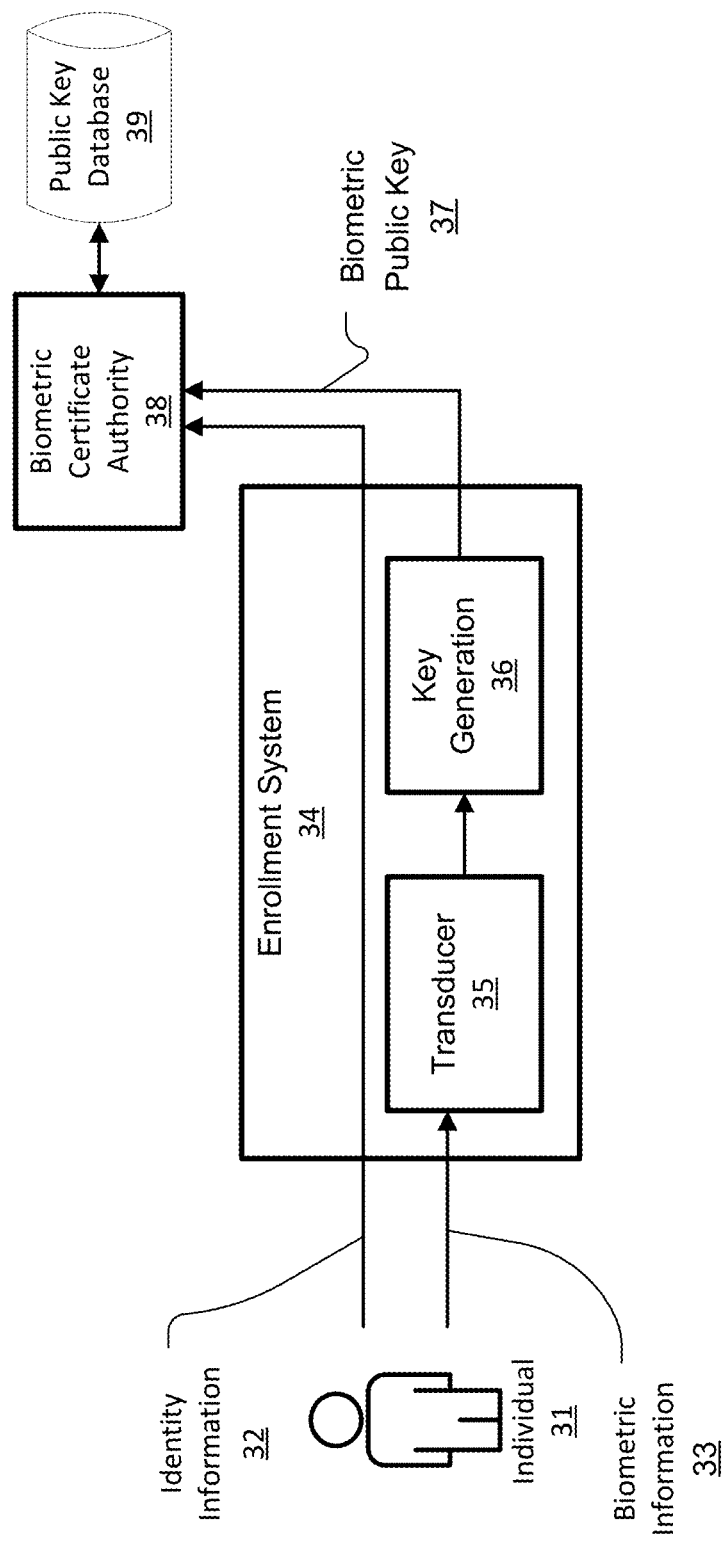
FIG. 3 is a schematic representation of data flow through functional components used in an embodiment of the invention during an enrollment process.

FIG. 3 is a schematic representation of data flow through functional components used in an embodiment of the invention during an enrollment process. The enrollment process creates a biometric public key for later use to authenticate the individual, as described below in connection with FIG. 4. The enrollment process begins with individual 31. This individual 31 is associated with certain identity information 32, for example a name, address, telephone number, driver license number, or other information that uniquely identifies the individual 31. The individual 31 also possesses measurable biometric information 33, for example a fingerprint or an iris pattern.

The individual 31 presents his or her identity information 32 and biometric information 33 to an enrollment system 34, which may be a device as shown in FIG. 2. In particular, the enrollment system 34 includes a transducer 35 as described above. The transducer 35 measures the biometric information 33 of the individual 31 using techniques known in the art that are particular to the type of biometric. For example, if the biometric is an iris print, then the transducer 35 may take an image of an eye of the individual 31. The transducer 35 then generates a digital electronic signal that characterizes the measured biometric of the individual, and forwards it to a computing facility within the enrollment system 34.

In the enrollment process of FIG. 3, the computing facility performs the indicated function of key generation 36. The key generation process 36 generates a biometric public key 37, as described below in connection with FIG. 5. To aid in later authentication, the enrollment system 34 may transmit the identity information 32 and the biometric public key 37 to a biometric certificate authority 38. The biometric certificate authority 38 may be, for example, a "certificate authority" as that phrase is known in the art of public key infrastructure, or it may be another facility that performs a similar function. The biometric certificate authority 38, upon receiving the identity information 32 and the biometric public key 37, stores these data in a public key database 39, which may be a conventional database.

Additional processes may be added to those depicted in FIG. 3 prior to enrollment. For example, the biometric certificate authority 38 may wish to authenticate the enrollment system 34 prior to accepting a new public key 37 or identity information 32. This may be done through standard encryption and authentication algorithms.

Advantageously, an existing database that (insecurely) stores identity information 32 in conjunction with biometric information 33 may be easily converted to a public key database 39 in accordance with an embodiment of the invention. The conversion process simply entails feeding the identity information 32 and biometric information 33 of each individual directly into the key generation 36 function of the enrollment system 34, bypassing the transducer 35. The resulting biometric public keys 37 may then be stored in association with the identity information 32, and the biometric information 33 may then be deleted (and therefore protected against compromise). Then, the biometric certificate authority 38 will not need to further protect the public key database 39 from malicious access, as no biometric information 33 will be stored therein. Moreover, individuals who had already enrolled will not need to re-enroll.

Moreover, such a conversion would not negatively impact biometric searching, such as might be used for criminal justice purposes. Current systems, including those in use by the Federal Bureau of Investigation, store large quantities of searchable biometric data. Understandably, these data are prime targets for identity thieves and other malicious actors who would abuse and exploit them for profit. However, the above processes may be applied to encode biometric data as a public key that is itself unusable as a biometric, without storing the biometric data in an otherwise usable form. Because the contemplated processes for creating biometric public keys are linear, as described below in connection with FIG. 5, they permit rapid searching to find a match to a biometric query, without the need to decode the stored data. Thus, the vulnerable biometric database can be entirely eliminated.

Figure 4:
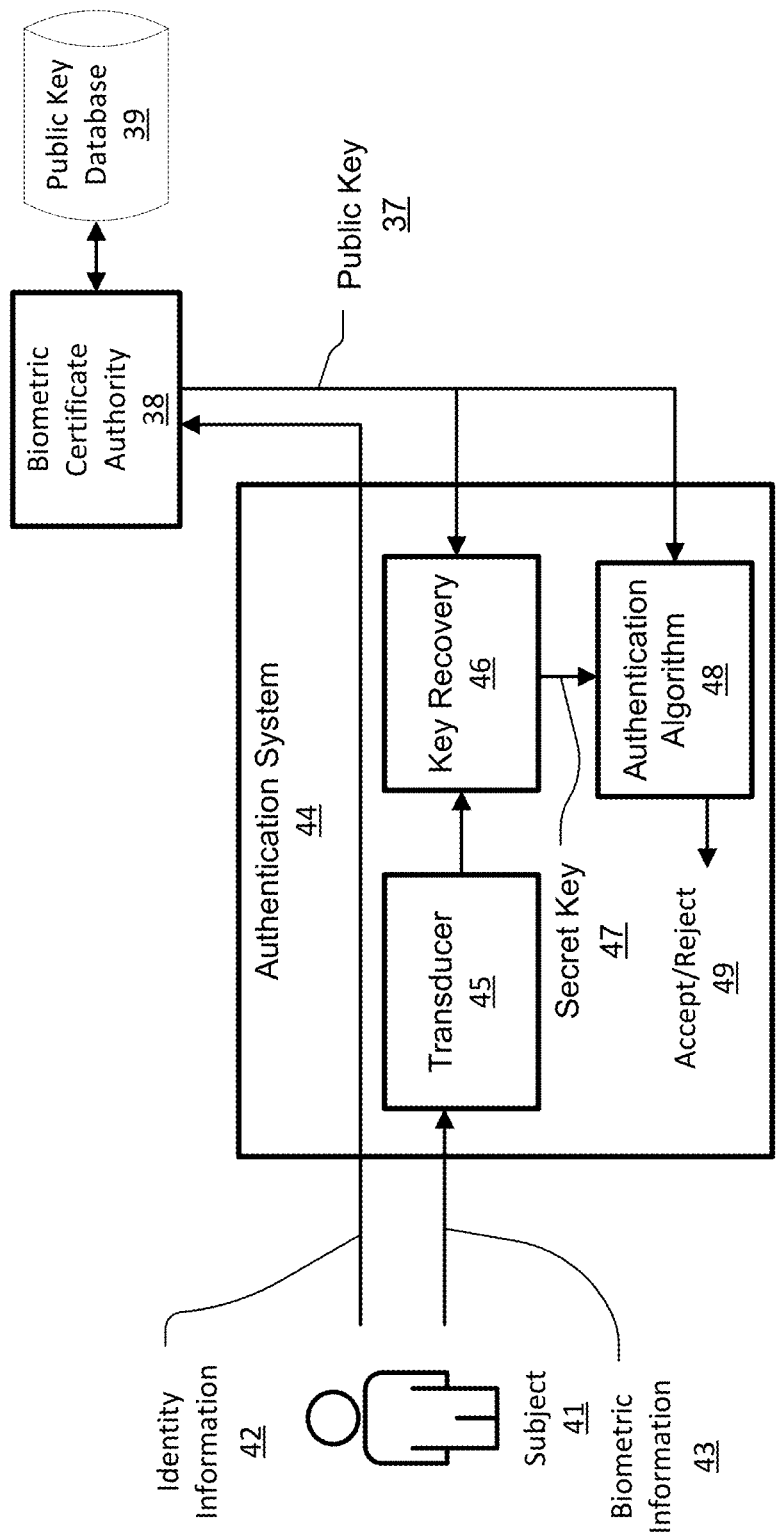
FIG. 4 is a schematic representation of data flow through functional components used in an embodiment of the invention during an authentication process.

FIG. 4 is a schematic representation of data flow through functional components used in an embodiment of the invention during an authentication process. Prior to authentication, an authorized individual would perform an enrollment process, such as that depicted in FIG. 3.

The authentication process begins with a subject 41 who is purporting to be the individual 31. The purpose of the authentication process is to confirm whether or not such a claim of identity is true. Thus, the subject 41 presents his or her identity information 42 and biometric information 43 to an authentication system 44, which may be a device as shown in FIG. 2. In particular, the authentication system 44 includes a transducer 45 as described above. The transducer 45 measures the biometric information 43 of the subject 41 using techniques known in the art that are particular to the type of biometric and forwards a characterization of the biometric to a computing facility, as described above.

The authentication system 44 forwards the identity information 42 to the biometric certificate authority 38 that holds the biometric public key 37 for the purported individual 31. The biometric certificate authority 38 then retrieves the biometric public key 37 from the public key database 39 using the purported identity information 42 (e.g., via a database query), and returns it to the authentication system 44 as indicated. The authentication system 44 may request the biometric public key 37 at any time, but as there may be a delay in obtaining the biometric public key 37 across a data communications network such as the Internet, the authentication system 44 may request the identity information 42 prior to activating the transducer 45. To alleviate this delay, in some embodiments the authentication system 44 includes a port to physically receive a cryptographic token or a dongle on which the biometric public key 37 is stored. In some alternate embodiments, the public key database 39 is stored locally to the authentication system 44 (e.g., accessible via a private network). In these embodiments, it may be efficient or more user-friendly to compare the biometric information 43 against every biometric public key 37 in the public key database 39. In this way, the subject 41 need not provide any identity information 42 at all.

Upon receipt of both the biometric information 43 of the subject 41, and the biometric public key 37 of the individual, the computing facility then performs the function of key recovery 46. The process of key recovery 46 entails computing a candidate value for the secret key 47 used to generate the biometric public key 37. This process is described in more detail below in connection with FIG. 6. The computing facility then provides the biometric public key 37 and the candidate value for the secret key 47 to an authentication algorithm 48. This authentication algorithm 48 determines whether the biometric public key 37 and the candidate value for the secret key 47 together authenticate the subject 41 as the individual 31, and provides as output an external indication 49 of the determination.

Figure 5:
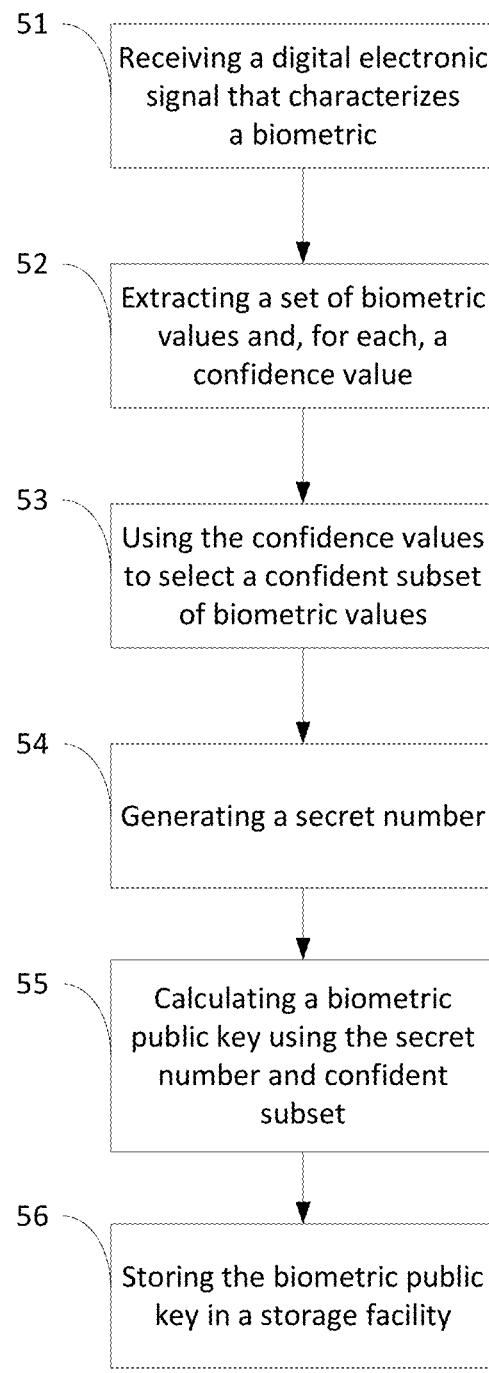
FIG. 5 is a flowchart illustrating a method of generating a biometric public key for an individual based on biometric data of the individual, without the need for non-transient storage of the biometric data, in accordance with the enrollment process of FIG. 3.

FIG. 5 is a flowchart illustrating a method of generating a biometric public key for an individual based on biometric data of the individual, without the need for non-transient storage of the biometric data. For concreteness, the biometric is described as an iris print; a person having ordinary skill in the art should be able to appreciate how the subsequent processes differ for other biometrics.

The processes of FIG. 5 are contemplated to be carried out by a computing facility in an enrollment system, such as the enrollment system 34 shown in FIG. 3. In a preferred embodiment, the computing facility is located in a secure environment, where the individual's identity could be separately authenticated. Thus, for example, the computing facility may be at a police station, or in a security office of a company, where a trusted person can verify the identity of the individual.

In a first process 51, the computing facility receives, from a transducer, a digital electronic signal that characterizes a biometric of the individual 31, as described above. Transduction may be performed according to any method known in the art. For an iris print, the transducer takes a photograph or video image of an iris, and outputs a signal encoding the image as (e.g. pixel) data according to a standard data format (e.g. RGB or grayscale).

In a second process 52, the computing facility extracts a set of biometric values from the signal. A biometric value may be any digital data, but is typically a set of bits, such as a single bit or a pair of bits representing a "most important" feature of the corresponding binary-encoded number, where importance depends on the particular application. For example, if the signal includes pixel data, then a biometric value may depend on brightness intensity or a mixture of color values. The biometric value may be determined by whether a value of the feature (e.g., the brightness) falls above or below a pre-determined threshold, or other effective technique known in the art.

Also in the second process 52, the computing facility extracts, for each such biometric value, a confidence value indicating a degree of confidence that the corresponding biometric value is stable between characterizations. A confidence value may also be any digital data, but is typically a number of bits representing how far the biometric value is from the pre-determined threshold. That is, if the original measurement is close to the threshold, then categorization of the corresponding measurement as a biometric value is less certain, while if the original measurement is farther away from the threshold, then categorization is more confident. Thus, for example, certain pixels in an iris image may not be read consistently across several readings, while others will. This information will change with each iris, but is generally consistent for each iris.

In a third process 53, the confidence values are used to select a confident subset of biometric values that are stable between characterizations. The confident subset should be a reliable discriminant of the identity of the subject based on the biometric, and may be done, for example, by selecting a subset of the extracted biometric values whose corresponding confidence values are above a certain threshold. This process 53 therefore selects biometric values that are less likely to be noisy, and more likely to be stable. Thus, although each individual iris capture may have significant variation, each will very likely contain a subset of pixels that are reliable, and can be used in subsequent processing. The processes 52 and 53 optionally may be repeated during enrollment until the confident subset of such pixels stabilizes. While any number of bits may be used as a confident subset, in one embodiment the number of bits in the confident subset is limited to fewer than 540 bits.

Processes 52 and 53 together produce a confident subset of the raw biological values that can be used to reliably discriminate between individuals. Ideally, the confident subset permits identification of individuals with an extremely low false acceptance rate (where a subject is authenticated as an individual that they are not), and with a relatively low false rejection rate (where a subject is not authenticated as an individual that they are). A detailed explanation of these processes is given below with respect to an embodiment that uses an iris print as the biometric. It will be understood that the processes as they apply to other biometrics must be altered accordingly. In particular, whether or not certain processes are performed or what threshold or parameters are used depends on the false accept rate and false reject rate, and these rates are varied because they depend on the application. It should also be understood that these processes may also be performed during the authentication method described below in connection with FIG. 6.

In the example embodiment, during process 52, an individual scans his eyes using an infrared iris scanner to generate an iris image. The iris image may be in a RAW format. Several processes are used to determine whether or not this iris image can lead to obtaining data that would enable reliably discriminating the identity of the subject. If not, an additional iris scan may be requested, for example.

For example, if the iris image is not in focus, then it is unlikely that data could be obtained from it that would enable reliably discriminating the identity of the subject. Thus, a two dimensional Fourier transform may be used to determine whether the iris image is in focus. Additionally or alternatively, characteristics of the optical scanner (e.g., optical anomalies, color accuracy, pixel errors, etc.) can be determined, such as in a pre-processing calibration process, and then used to process the captured iris image to correct for any errors introduced by the optical scanner itself.

A segmentation process may be used to identify and outline the pupil and iris in the image. If the pupil or iris are not found, it may indicate that the subject closed his eyes during the scan. The outline of the iris may be used to determine if portions of the iris are occluded, for example because the subject did not open his eyes wide enough during the scan. The iris image may be used to facilitate a low false rejection rate and ease-of-use. The subject may be asked to re-scan his eye to maintain a higher level of security and lower false accept rate.

Next, the iris, as outlined in the segmentation process, may be stretched from a donut-like shape to a rectangle, such as by using a polar to Cartesian transform. A normalization process may be performed to ensure the grey levels are in an appropriate region. The resulting biometric data are a matrix of 8 bit values that correspond to the grey scale. A Gabor transform may then be performed, resulting in a matrix of signed (positive and negative) 8 to 16 bit values. The matrix values that are positive are converted to ones and values that are negative are converted to zeros. The resulting matrix of zeros and ones is a two dimensional array of several thousand bits, called an "iris code".

This iris code is considered over sampled because it has regions or clusters of zeros and of ones. To improve security, specifically the measured entropy per bit, the iris code may be sub-sampled, such as by using a method that extracts only pixels that are 10 pixels apart. This sub-sampled array contains several hundred bits.

The next step is selecting the confident subset in process 53, the confident subset being a reliable discriminant of the identity of the subject based on the biometric. To do so, processes are performed to eliminate pixels that are not reliable because they are being obscured, such as by an eyelid, eyelash, glare, reflection, dust, dirt, or part of eyewear like the rim of a pair of glasses. One method of identifying reliable bits includes identifying bits in the center of clusters and far away from edges, since the edges are influenced by noise. The probability of error is inversely proportional to the distance to an edge. The probably of a bit erroneously flipping from zero to one or vice versa is higher at edges, so a confident subset would include samples in the middle of clusters. Thus, in the embodiment, each pixel is mapped to a number that represents the distance to the nearest edge or Euclidean distance. Smaller numbers indicate smaller distances or lower reliability.

In one embodiment, the number of bits in the confident subset may be defined as a security parameter plus some fraction. For example, for a security parameter of 80 bits, 100 bits will be selected in the confident subset. In another embodiment, the number of bits in the confident subset is based on a percentage. For example, the most reliable 20% of bits will be selected, resulting in a confident subset, such as one comprising 94 bits. Thus, the number of bits needed to distinguish two individuals is determined and that many bits with associated reliability are chosen as the confident subset, if possible.

One method of identifying reliable bits includes using the magnitude of the values in the matrix of signed values resulting from the Gabor transform. Values with very large magnitudes may indicate glare or reflection because the Gabor transform does not distinguish high contrast from errors like glare or reflection. Values with very low magnitudes are also likely to be unreliable because an erroneous bit flip is more likely. Therefore, the confident subset could include values with a medium magnitude, such as the middle 60% of values.

In a fourth process 54, the computing facility generates a secret number. There are many methods for generating a secret number, including the use of a pseudo-random number generator. Alternately, the secret number may be provided by the individual, in the form of a pass phrase that is subsequently processed using a cryptographic (e.g. hash) function to form a pseudo-random number.

In a fifth process 55, the computing facility calculates a biometric public key based on the secret number and the confident subset of biometric values. The process 55 corresponds to the function of key generation 36 in FIG. 3. One method of computing such a biometric public key uses linear algebra, although a person of ordinary skill in the art may appreciate other methods that may be used.

The linear algebra method may be more easily understood if some notation is first set. Represent the biometric public key as a vector of bits called K, the secret number as a vector of bits called S, and the confident subset of biometric data as a vector of bits called B. The biometric public key K has the same size as the confident biometric data B (i.e., each can be expressed using N rows and 1 column of bits), while the secret number S may have any size (i.e., it can be expressed using M rows and 1 column of bits). Choose a binary matrix A that has N rows and M columns of bits. Then a formula for the biometric public key K may be expressed as K=A·S+B. That is, the biometric public key K is obtained by multiplying the binary matrix A by the secret number S (i.e., using matrix multiplication), then adding the confident biometric data B (i.e. using a bitwise exclusive OR). The binary matrix A will not be square if M≠N.

The binary matrix A may be chosen using any technique, or may be chosen at random. One embodiment may choose the binary matrix A for each biometric public key K, so that it is uniquely associated with the individual. In this embodiment, the binary matrix A must be distributed with each biometric public key K, and in essence forms part of the public key. Another embodiment may associate the binary matrix A with the computing facility itself, to identify keys generated using that facility. In this embodiment, the binary matrix A is not uniquely associated with each biometric public key K, but must be obtained from a biometric certificate authority or other source prior to authentication. Still another embodiment may designate the binary matrix A as a constant design parameter, so that multiple computing facilities may be used to generate cross-compatible biometric public keys. In this embodiment, the binary matrix A need not even be made public, and may be stored in a secure portion of the device that generates the biometric public key K.

One may appreciate that the formula for K is linear. Therefore, in accordance with known properties of such formulas, it may be solved for a candidate value for the secret S, so long as K, A, and B are known. In particular, the solution is given by $S=A^{-1}(K-B)$, where if the binary matrix A is not square, a generalized matrix inverse (such as the Moore-Penrose pseudoinverse) may be used for the matrix multiplication. However, despite this linearity, the use of the secret S operates to mask the confident subset of biometric values B from detection, encrypting the value of B. In a pleasing symmetry, the use of the confident subset B operates to encrypt the value of S. In this way, the value of K verifiably characterizes both the biometric data of the individual and the secret number, without the need for non-transient storage of either the biometric data or the secret number.

It should be appreciated that the calculation may include information other than just the secret number S and the confident subset of biometric values B. Other information traditionally used for authentication purposes may be included as well, such as a name, driver license number, street address, organization membership number, and so on (additional examples are provided in the definition of "biometric"). This additional information may be easily incorporated in the linear method, e.g., by first converting it to a compatible binary form, then (bitwise) adding it into the biometric public key K directly, or (bitwise) adding it to the secret number S before multiplication with the binary matrix A. It will also be appreciated that, if such additional information is used in calculating the biometric public key K, it must also be presented during authentication; in this case, the formula to solve for the secret number S must be modified accordingly. Thus, for example, the key can be generated from any one or combination of information and does not necessarily require the collection of biometrics such as an iris or fingerprint using a biometric scanner (e.g., a key can be generated using one or more pieces of information such as a user's date of birth and social security number). It also should be noted that additional factors can be added to the public key after the initial enrollment event.

The method of FIG. 5 concludes with a process 56, in which the computing facility stores the biometric public key in a storage facility. The storage facility may be a memory outside the computing facility, such as the non-authentication memory of an enrollment system 34. The enrollment system 34 may then perform optional operations using this biometric public key that are not strictly related to key generation, such as displaying a message on a display screen. Alternately, the storage facility may be a memory within the computing facility itself, if the device housing the computing facility is intended to be used only by the individual or a small group of authorized individuals. In another embodiment, the storage facility is a cryptographic token or a dongle provided by the individual, which stores the biometric public key for later authentication use by the individual.

An embodiment of the invention also may store, in the storage facility, other information in association with the biometric public key itself, the combination of all such related data forming a record that can be certified by a biometric certificate authority using cryptographic techniques known in the art. For example, a timestamp associated with the collection of the biometric can be stored in the record, along with a timestamp associated with the computation of the biometric public key. These additional data optionally may be used during the authentication process described below in connection with FIG. 6, either separately or in combination, to provide additional assurance that the authentication process is valid. Such data are particularly useful when converting an existing database of raw biometric data to a database in accordance with an embodiment of the invention, since either or both of the timestamps may act as a proxy for the validity of the underlying biometric data.

Figure 6:
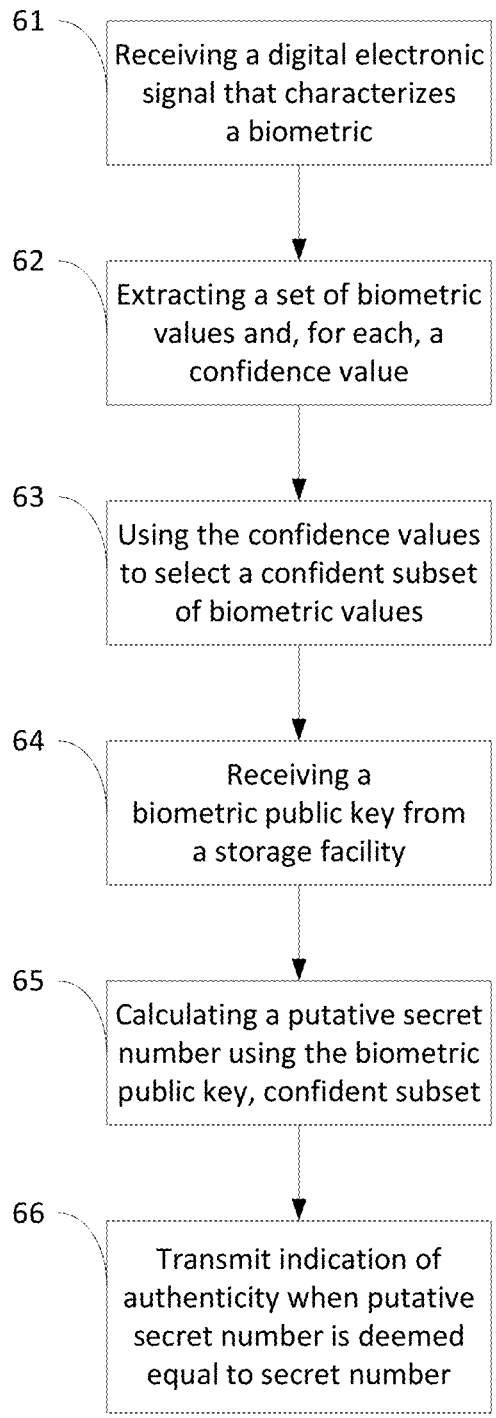
FIG. 6 is a flowchart illustrating a method of using biometric data to authenticate a subject as an individual whose biometric data has been previously obtained using a first transducer, without the need for non-transient storage of the biometric data, in accordance with the authentication process of FIG. 4.

FIG. 6 is a flowchart illustrating a method of using biometric data to authenticate a subject as an individual whose biometric data has been previously obtained using a first transducer, without the need for non-transient storage of the biometric data. The processes of FIG. 6 are contemplated to be carried out by a computing facility in an authentication system, such as the authentication system 44 shown in FIG. 4. The processes 61-63 of receiving a digital electronic signal that characterizes a biometric of a subject 41 purporting to be an individual 31, extracting biometric values and corresponding confidence values, and using the confidence values to select a confident subset of biometric values, are the same as processes 51-53 of FIG. 5, described above in detail.

The authentication processes of FIG. 6 diverge from the enrollment processes of FIG. 5 in process 64, in which the computing facility receives a biometric public key from a storage facility as described above in connection with FIG. 5. That is, the computing facility of the authentication system receives the product of the processes of FIG. 5. The storage facility may be, for example, a database controlled by a biometric certificate authority, or a dongle or cryptographic token, or a local memory, such as a non-transitory data store within the computing facility itself. In process 65, the computing facility calculates a candidate value for the secret number using the biometric public key and the confident subset. If the linear algebra method described in connection with process 55 is used to compute the biometric public key, the process 65 may be carried out in accordance with the formulas given in that description.

The method of FIG. 6 concludes with a process 66, in which the computing facility transmits an indication that the subject is authenticated as the individual when the candidate value for the secret number is deemed equivalent to the secret number characterized by the biometric public key. As described above in connection with FIG. 1, to determine equivalence, the secret number S may be encrypted using a one-way function (say, F) and the hashed value F(S) is received with the biometric public key K in process 64. It should be appreciated that, because the function F is one-way only, the secret number S cannot be feasibly recovered from the hashed value F(S), so the latter value F(S) may be made public without compromising the secret number S. To authenticate the subject, the function F is applied to the candidate value for the secret number S' to determine whether there is a match; that is, whether F(S)=F(S'). If so, then using well-known properties of cryptographic hash functions, one may conclude with a high degree of confidence that S=S', so the computing facility in fact already possesses the secret number S.

In another embodiment, to determine if the candidate value for the secret number S is correct, the embodiment may use the candidate value to compute candidate biometric data of the individual. This embodiment then compares the candidate biometric data of the individual with the captured biometric data of the subject, and authenticates the subject only if these two data sets are close enough according to some metric (e.g. Hamming distance). This is equivalent to the putative secret number being deemed equivalent to the actual secret number S. In this embodiment, F(S) does not need to be computed or published, and therefore F does not need to be included as a part of the embodiment.

It is possible that a small number of bits in the confident subset are erroneous, even though they were deemed reliable by the earlier processes, so if authentication fails, additional processes are performed before notifying that the subject is not authenticated as the individual, to ensure that the failure is not due to a problem with a small number of biometric values. In one embodiment, the confident subset includes 100 bits, and these additional processes may include brute force methods such as flipping the first bit out of 100, re-computing the key, and again determining if the subject is the individual. The process is repeated 100 times using a linear search to check for 1-bit errors in the confident subset. In another embodiment, two-bit errors are checked for by examining all possible combinations of 2-bit errors, re-computing the key each time and checking if the subject is the individual. In some embodiments, these computations may be performed in parallel in specialized hardware.

As discussed above in connection with FIG. 5, it should be appreciated that not everyone using an embodiment in accordance with the invention must authenticate using the same assurance data, or using only biometric data. A single device embodiment may include an iris scanner, fingerprint scanner, keyboard for entering a password, receptacle for a cryptographic token, and other such input mechanisms. Software or firmware for performing the method of FIG. 6 may prompt the subject to use any or all of these input mechanisms to provide the required assurance data. For example, if a biometric public key was created using both an iris scan and a fingerprint, then an authentication device that performs the method of FIG. 6 must incorporate both iris and fingerprint scanners.

Illustrated embodiments of the invention provide an "enroll-once authenticate-anywhere" system. An individual is required to enroll only one time, and is then able to authenticate on any authentication system in accordance with the embodiment. The individual need not have interacted with that authentication system before. The embodiment therefore provides an advantage over existing systems. If an individual owns multiple smartphones, or must replace her phone, she will be required to provision each phone. For example, she will be required to train each such device to recognize her fingerprint or iris. However, in accordance with this embodiment, no such repeated provisioning is required.

One embodiment of the invention therefore provides a "single sign-on" function. The biometric public key, by its nature, may be made entirely public, so it may be used by anyone desiring to authenticate subjects as individuals. Websites, banks, merchants, and others may use the same biometric public key. To the extent that no password was used to generate the biometric public key, no password will be required to authenticate a subject, and therefore no password maintenance procedures are required. In particular, because no password is required, it is impossible to forge the assurance data. The single sign-on embodiment can be implemented using a publicly accessible biometric certificate authority, or other such server, or by any of the other methods described above. One such embodiment includes a server for storing a hash of the secret number along with the biometric public keys. The hashes are indexed using identifying information (such as a name or address), then secured with an identification number and cryptographically signed. These records are then provided to anyone who wishes to authenticate a subject purporting to be an individual.

Thus, one embodiment of the invention provides a database of public keys that each characterize the biometric of an individual. Such public keys could be provided in a digitally signed certificate by a trusted third party, such as a certificate authority, using techniques known in the art. Then the identity of any person can be authenticated as follows. First, one obtains the public key of that person from the database. Next, one validates the public key using techniques known in the art. Then, one obtains the appropriate biometric from the person. Finally, one validates the obtained biometric against the public key using the authentication processes described above. According to this embodiment, any person can use his or her biometric data to be authenticated to anyone else, without publically exposing that biometric data, and in particular without registering that biometric data with the verifier.

Indeed, the above-described system and methods may be used to provide authentication for any purpose. In a number of uses, authentication of a subject as an individual is performed for the purpose of using information about the individual, such as, without limitation: temporarily identifying people receiving aide during or after a humanitarian crisis (e.g., to ensure equal distribution of aide), identifying people who file taxes, identifying people who receive health insurance, and so on. Thus, for example, embodiments of the invention may be used to replace social security numbers or driver licenses with biometric public keys.

In other uses, authentication of a subject as an individual is performed as a prerequisite to granting the subject any privilege accorded to the individual. Some such uses also require further assurances, such as presentation of a token or entry of a password, and include without limitation: border control applications, replacing hardware tokens such as common access cards (CAC), authenticating users to electronic devices such as smartphones, identifying employees for access to building premises and business data systems, authentication to a decentralized database (including peer-to-peer databases), and protecting digital messages (such as emails), among many others. Indeed, various embodiments of the invention may be used to entirely supplant the need for passwords or tokens.

Figure 7:
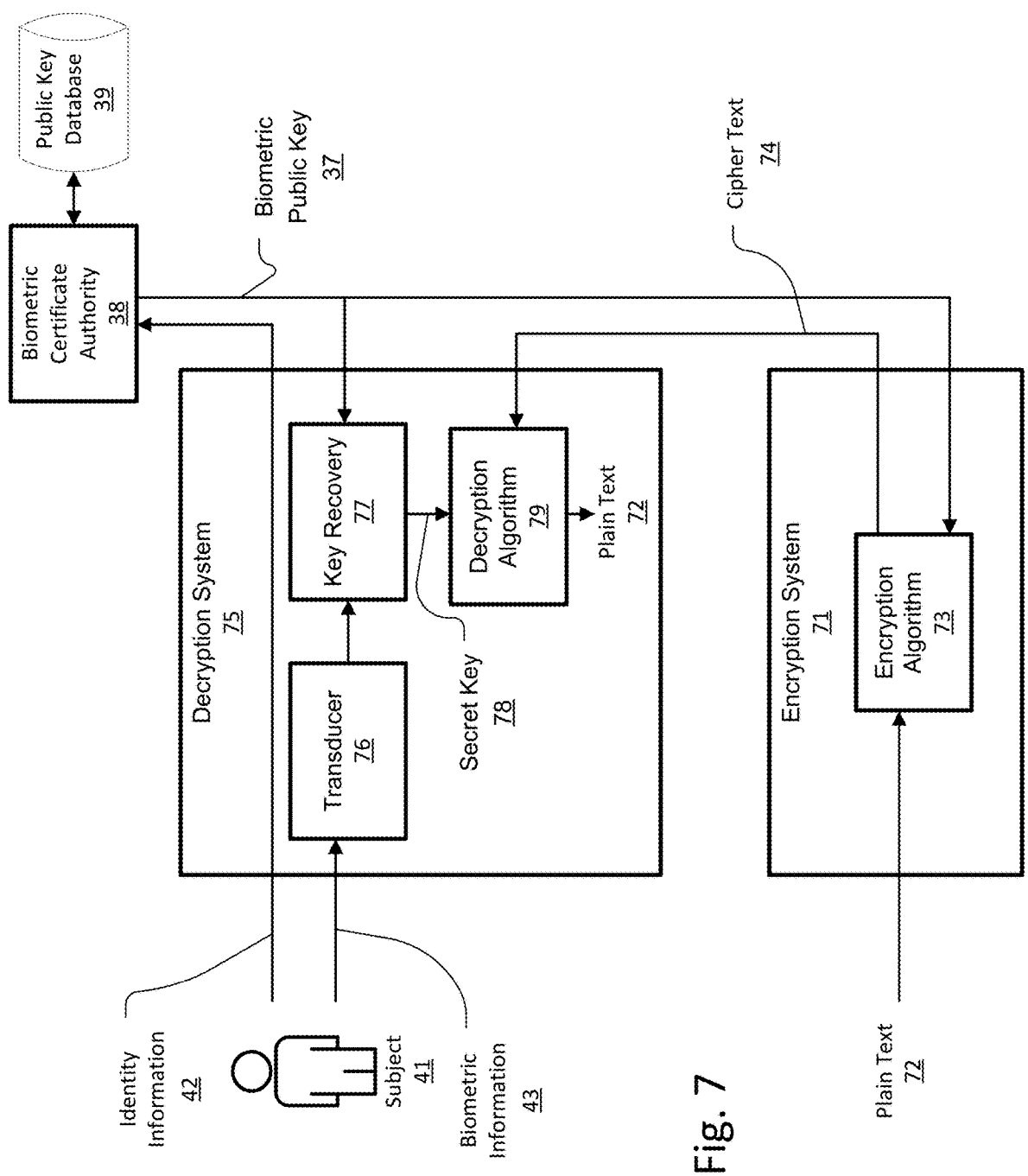
FIG. 7 is a schematic representation of data flow through functional components used in an embodiment of the invention to provide a unidirectional encrypted communications channel.
Figure 8:
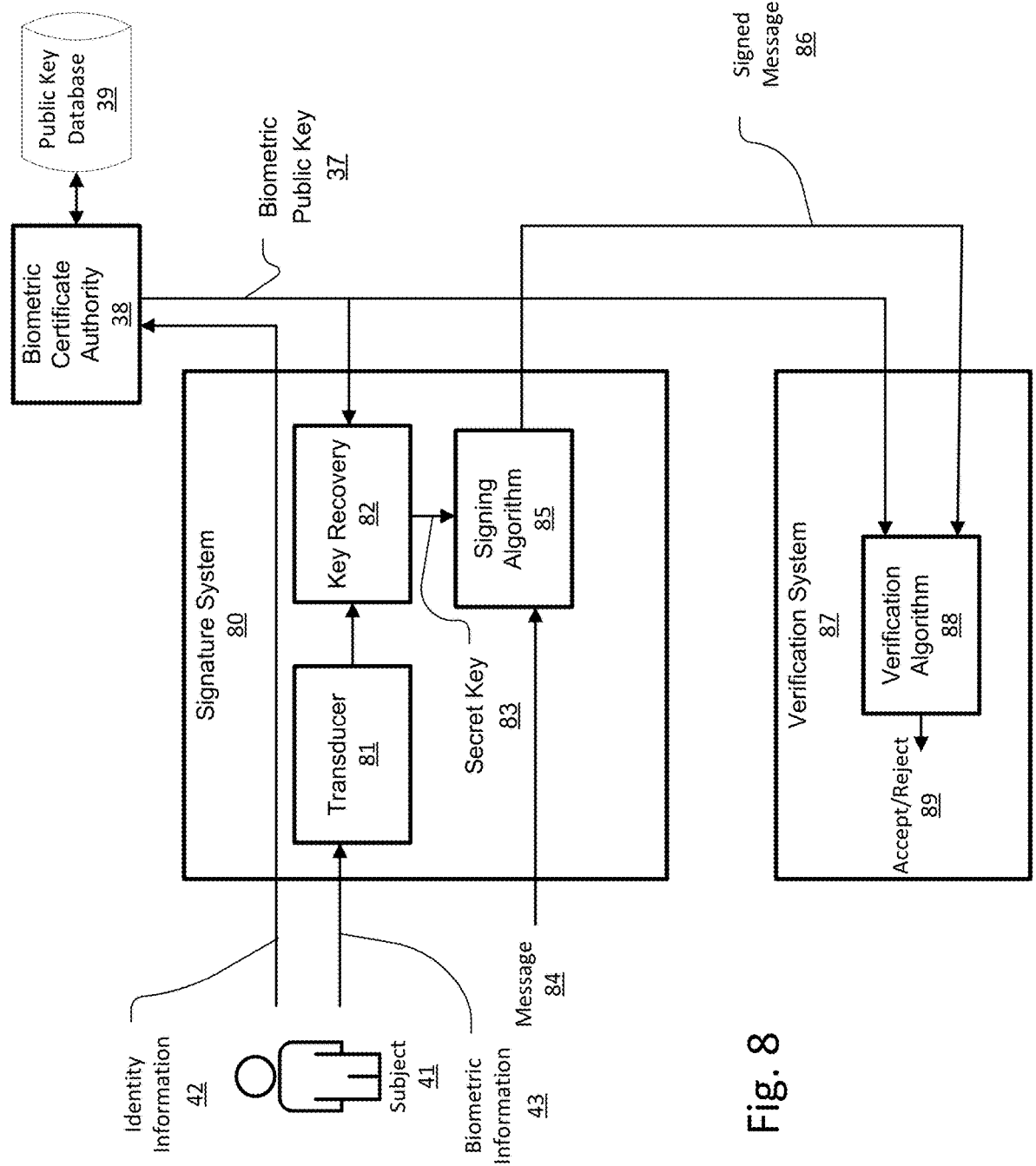
FIG. 8 is a schematic representation of data flow through functional components used in an embodiment of the invention to compute and verify a digital signature for a message.

Two particular uses are shown in FIGS. 7 and 8: secure communications, and message signing. These uses are well known and particularly common in the art of cryptographic systems, and are provided to illustrate the power and flexibility of various embodiments of the invention. The remaining figures illustrate various hardware implementations that provide cost savings over existing authentication mechanisms.

FIG. 7 is a schematic representation of data flow through functional components used in an embodiment of the invention to provide a communications channel to send encrypted messages to a subject 41. The communications channel shown in FIG. 7 is unidirectional; that is, it illustrates how messages may be sent from any person to the subject 41.

In accordance with the embodiment shown in FIG. 7, any person wishing to communicate securely with the subject 41 must have an encryption system 71. The encryption system 71 need only include a computing facility as known in the art; it need not include a transducer to authenticate the sender, unless bidirectional communication with the subject 41 is desired. Thus, the encryption system 71 may be an ordinary desktop computer, smartphone, or other device as known in the art.

To establish the secure communications channel to the subject 41, an individual first configures the encryption system 71 to receive a record containing the necessary encryption information. For example, the record may characterize a public/private key pair for performing an asymmetric encryption algorithm as known in the art. The public key may be stored directly in the record, while the private key may be the secret number characterized by the biometric public key 37.

Obtaining the record may be done using methods known in the art of public key distribution and public key infrastructure, for example by the encryption system 71 providing sufficient identity information to the biometric certificate authority 38 to permit retrieval of the record from the public key database 39. The particular biometric certificate authority 38 that includes the correct record may itself be determined, for example, by consulting a directory that maps individuals to such authorities.

Then, to encrypt plain text 72, a computing facility of the encryption system 71 executes an encryption algorithm 73 to generate a cipher text 74 using the public key data from the record. The cipher text 74 may then be sent to the decryption system 75 using any insecure communications means, such as the Internet.

Decryption in accordance with this embodiment begins in much the same way as the authentication process shown in FIGS. 4 and 6. Indeed, authentication of a subject 41 as the intended individual, using the subject's identity information 42 and biometric information 43, must be performed as a prerequisite to accessing the decryption functions of the computing facility of the decryption system 75. For brevity, these authentication processes are not described here. It is sufficient to note that the decryption system 75 may be implemented as a device as shown in FIG. 2 and described in connection therewith. In particular, it includes a transducer 76 and a computing facility that performs at least two functions: a key recovery function 77 that recovers the secret number 78 (identical to the key recovery function 46 described in connection with FIG. 4), and a decryption algorithm 79 that uses the recovered secret number 78 to reproduce the plain text 72 from received cipher text 74.

After performing the authentication processes described in connection with FIGS. 4 and 6, the decryption system 75 passes the recovered secret number 78 to a decryption algorithm 78, which uses the number as the private key corresponding to the public key used by the encryption algorithm 73. If the subject 41 is not authorized to decrypt the cipher text 74, the decryption algorithm 79 will necessarily fail because the secret number 78 will be incorrectly recovered by the key recovery function 77, and the plain text 72 will not be produced.

As would be understood by one skilled in the art, this enables the implementation of a secure, personalized cloud encryption capability. Specifically, in the current state of the art, it is difficult to encrypt data in the cloud, as the decryption key may not be present on all devices connected to the cloud service. The application of this concept to cloud encryption enables one to encrypt data prior to uploading to a cloud service, and then the ability to subsequently download and decrypt the data on a separate device using the biometric encryption/decryption capabilities disclosed herein. Furthermore, this technology can be extended to provide enterprise access control for data in the cloud by, for example, encrypting the file under an ephemeral key and encrypting this ephemeral key using the biometric public keys of the designated people who have access to the data.

Another example of an advantageous application of the concepts disclosed herein includes the implementation of a secure messaging or email service. Specifically, in the current state of the art, two parties attempting to communicate must agree on a secret key beforehand or use an asymmetric scheme (e.g., PGP or S/MIME) prior to sending their data. This is challenging and difficult to scale due to key management and revocation issues. However, using our technology, each individual can have a dedicated biometric public key that allows any other person to encrypt data that only the individual can decrypt. This enables a highly scalable, secure messaging system to be constructed using the concepts disclosed herein.

In the case of encryption and decryption, the system may be constructed in both an asymmetric and symmetric modes. In an asymmetric mode, the data may be encrypted by anyone with access to the individual's biometric public key, but may be decrypted only by the individual. In a symmetric mode, data may be encrypted only by the individual and may be decrypted only by the individual, as the symmetric key (that is a secret number) is derived from the individual's biometric data and the biometric public key.

It should be appreciated that the data flows depicted in FIG. 6 establish a unidirectional communications channel. To provide bidirectional communications, the process depicted in FIG. 6 may be performed between two or more individuals for mutual authentication (once per individual), simply by reversing the roles of the sender and receiver. Such mutual authentication may be performed prior to transmission of meaningful data. Moreover, if the communications will be extensive, a symmetric encryption algorithm 73 is preferred for computational efficiency. Such algorithms require the establishment of a shared secret, which may be done using a key agreement protocol known in the art such as the Diffie-Hellman protocol or the Kerberos protocol.

Another embodiment of the invention may be used to establish a secure data communications channel between two parties. A first, provisioning phase, is essentially the same as described above in connection with FIGS. 3 and 5, except that instead of storing the biometric public key and hash of the secret number in a public repository, this information is given by the individual 31 to the other person in a manner in which the individual's identity is unquestionable (for example, by the individual 31 physically handing the other person a cryptographic token containing the information). In a second, communication phase, the sender sends only the biometric public key to a subject 41 purporting to be the individual 31. The subject 31 uses a picture of their eye and the biometric public key to reconstruct the hash of the secret number, using the processes described above. If these processes are successful, then the hash function of the secret number becomes a shared secret that may be used, for example, as a "session key" (as that phrase is known in the art). However, the authentication processes can only be successful if the subject 41 possesses the biometrics of the individual 31. In this way, this embodiment enables the creation of a secure session for communication.

FIG. 8 is a schematic representation of data flow through functional components used in an embodiment of the invention to compute and verify a digital signature for a message. As with the decryption processes shown in FIG. 7, signing a message begins with a subject 41 providing identity information 42 and biometric information 43 to a device, in this case a signature system 80 that includes a transducer 81 and a computing facility that provides a key recovery function 82 that recovers the secret number 83 of the individual. Such a signature system 80 may be a device as shown in FIG. 2 and described above.

However, in accordance with this use case, the subject 41 provides the signature system 80 with a message 84 to be signed. The computing facility of the signature system 80 performs a signing algorithm 85 on the message to produce a signed message 86 that purports to be from the individual, using the secret key 83 recovered by the key recovery function 82. Such signing algorithms are well known in the art. For example, a message may be signed by applying a keyed-hash message authentication code (HMAC) as known in the art, using the secret key 83 as the key.

A verification system 87 may be used to verify the signed message 86, using methods known in the art. Thus, when the verification system 87 receives a signed message 86, it obtains a record containing the public key of the individual from the biometric certificate authority 38, using the methods described above in connection with FIG. 7. Then the verification system executes a verification algorithm 88, using the signed message 86 and the retrieved public key. Such verification algorithms form part of the overall message signing protocol, and are also well known in the art. If the verification was successful, the verification system 87 produces an "accept" indication, while if the verification was unsuccessful, the verification system 87 produces a "reject" indication.

In one embodiment of the invention, the verification system 87 also stores public keys that are signed by the biometric certificate authority 38, using standard PKI processes. In another embodiment, the signed message 86 includes a timestamp, and the verification system 87 only accepts signatures with a valid timestamp. In this way, a signed message 86 may be caused to expire after a fixed duration.

Figure 9:
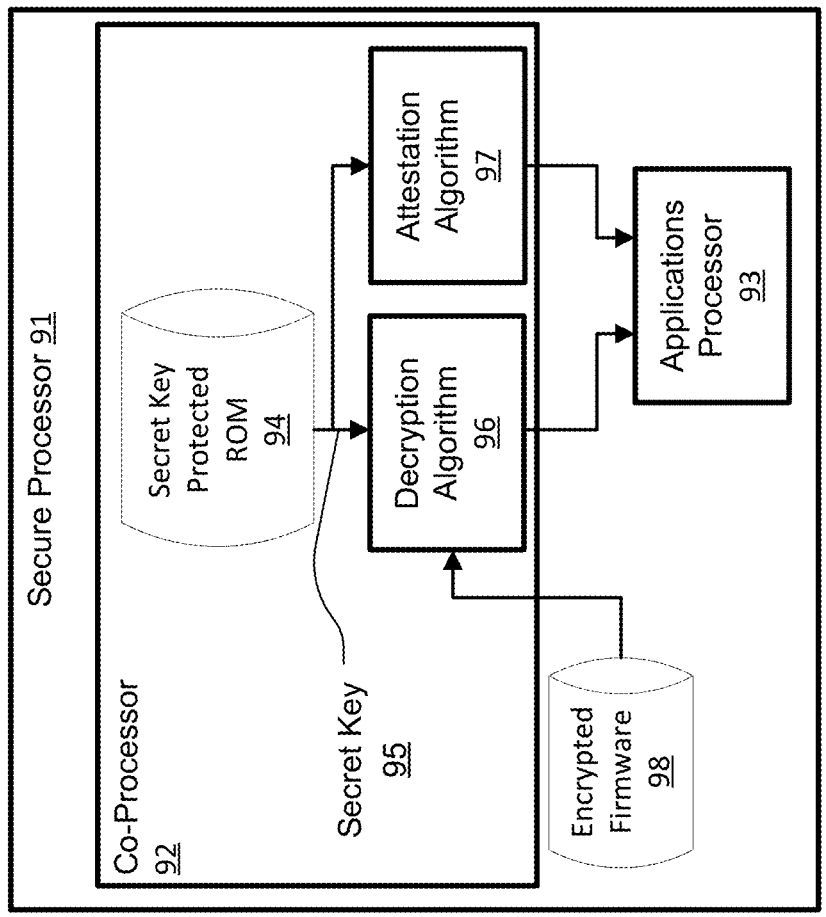
FIG. 9 is a schematic representation of data flow through functional components used in a prior art secure processor.

FIG. 9 is a schematic representation of data flow through functional components used when booting a prior art secure processor. The secure processor 91 includes a co-processor 92 and an applications processor 93 in communication. To ensure that only approved applications are run on the applications processor 93, the software used to boot the system is encrypted. Due to its encryption, the boot software may be stored as encrypted firmware 98 outside the security boundary of the co-processor 92. This allows the encrypted firmware 98 to be updated without tampering with the internals of the co-processor 92.

The boot process operates as follows. When the secure processor 91 turns on, the co-processor 92 loads the secret key 95 from a protected read-only memory (ROM) 94 into a decryption algorithm 96 and an attestation algorithm 97. It then loads the encrypted firmware 98, decrypts the firmware using the decryption algorithm 96, and sends the decrypted firmware to be run by the applications processor 93. In one embodiment, the attestation algorithm 97 is optionally used by the applications processor 93 to prove to an external party that the loaded firmware image is correct. The attestation algorithm 97 may not be included if that functionality is not required by the applications processor 93. The security of the boot process depends directly on maintaining the security of the secret key 95. In certain high-security applications, for example in military use, it is entirely conceivable, even likely, that a captured secure processor will be disassembled and any secret key 95 compromised. Therefore, in these situations the security of the co-processor 92 ultimately depends on the security of its hardware; that is, it possesses a hardware root of trust. For this reason, the co-processor 92 often is hardened against physical and electrical tampering, which increases its cost significantly. In particular, the co-processor 92 must prevent access to the ROM 94 that contains the secret key 95, and must prevent access to the key itself when in transit between the ROM 94 and the various functional modules within the security boundary of the co-processor 92.

Figure 10:
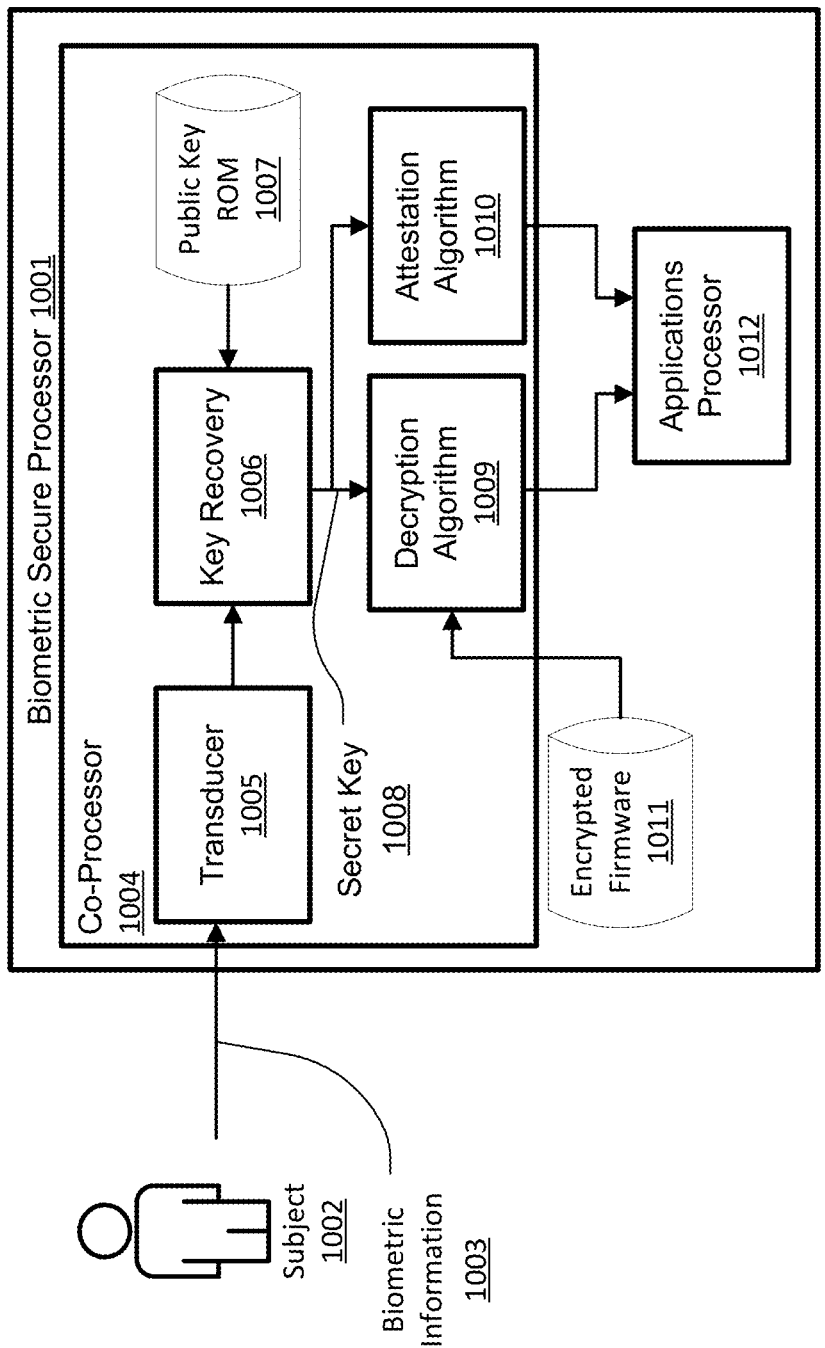
FIG. 10 is a schematic representation of data flow through functional components used in an improved, biometric secure processor.

FIG. 10 is a schematic representation of data flow through functional components used in an improved, biometric secure processor. Advantageously, the embodiment of FIG. 10 enables a system that eliminates the need for a hardware root of trust, yet provides improved security. Eliminating the hardware root of trust is a significant cost saver. Hardware roots of trust take many forms and can be found in many systems, some of which include trusted platform modules, smart cards, chips, ARM TrustZone, Intel SGX, hotel keys, self-encrypting drives, key fobs, USB tokens, Aladdin eToken, and e-Passports.

The boot process of the biometric secure processor 1001 operates as follows. A subject 1002, provides his or her biometric information 1003 to the biometric secure processor 1001, and in particular to a co-processor 1004. This biometric information 1003 is captured by a transducer 1005 in the co-processor 1004, in the same manner as described above in connection with FIGS. 4 and 6. The transducer 1005 processes the biometric information 1003 and sends these data to the key recovery process 1006. The key recovery process 1006 receives a biometric public key from a ROM 1007, and recovers the secret key 1008 as described above. In the embodiment of FIG. 10, the subject 1002 does not need to provide any identity information, as the ROM 1007 includes only a single biometric public key. However, in an alternate embodiment, the ROM 1007 may contain more than one biometric public key, so that more than one subject 1002 may use the biometric secure processor 1001.

Once the key recovery function 1006 has completed, the secret key 1008 is sent to the decryption algorithm 1009 and the attestation algorithm 1010, which perform the same function as their counterparts in the prior art processor of FIG. 9. The decryption algorithm 1009 receives the encrypted firmware 1011, decrypts it, and sends the unencrypted firmware to be run by the applications processor 1012. The applications processor 1012 may optionally use the attestation algorithm 1010 to attest to the integrity of its firmware at a later time.

The embodiment of FIG. 10 has wide-ranging applications, especially in military use and supervisory control and data acquisition (SCADA) control systems that require start-up procedures. For example, tank computing facilities require expensive active anti-tamper systems and a hardware root of trust. Thus, one possible application is to prevent a tank from starting up unless an authorized individual presents a biometric. Authorized military personnel may complete the enrollment process to produce a biometric public key, as shown in FIGS. 3 and 5. The biometric public key may then be installed in a computing facility in the tank, and in particular as a ROM 1007 of a biometric secure processor 1001. The tank requires software to start up, which may be stored as encrypted firmware 1011. Thus, the tank does not turn on unless the would-be driver is authenticated using the authentication process as shown in FIGS. 4 and 6. No secure storage is required on the tank for the biometric authentication processes, thereby reducing the cost to manufacture the tank.

Figure 11:
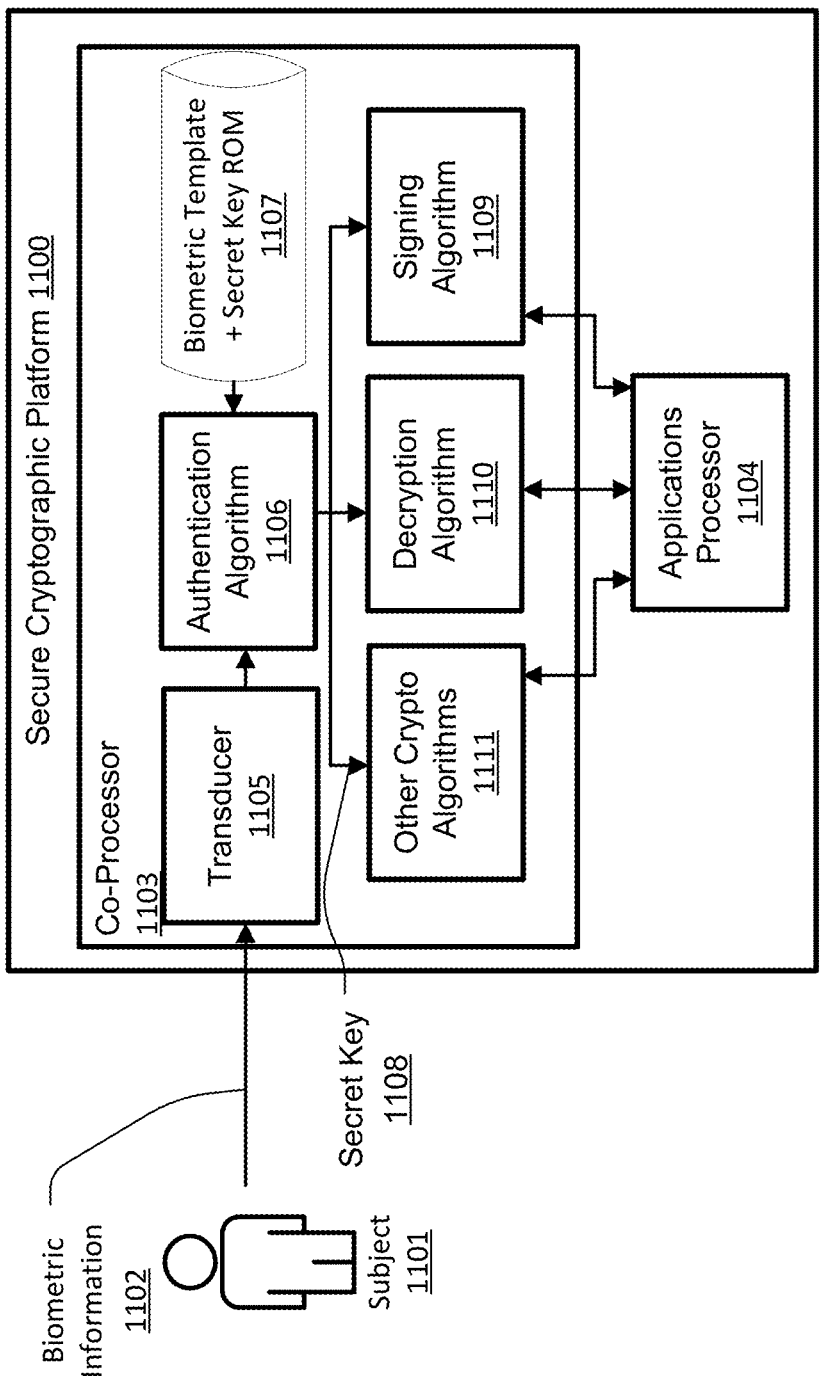
FIG. 11 is a schematic representation of data flow through functional components used in a prior art secure computing platform.

FIG. 11 is a schematic representation of data flow through functional components used in a prior art secure cryptographic platform 1100. The subject 1101 presents his or her biometric information 1102 to a transducer 1105 in a co-processor 1103. The transducer 1105 processes the biometric information 1102 and sends these data to an authentication algorithm 1106. The authentication algorithm 1106 obtains a copy of an authorized individual's biometric data from the ROM 1107. If the biometric information 1102 matches (to within an acceptable level) the individual's biometric data obtained from the ROM 1107, the authentication algorithm 1106 obtains the secret key stored in the ROM 1107. Other algorithms (e.g., the signing algorithm 1109, the decryption algorithm 1110, and other crypto algorithms 1111) may then access the secret key 1108. The applications processor 1104 may communicate with the co-processor 1103 to invoke the cryptographic algorithms 1109, 1110, 1111. Note that the construction in FIG. 11 requires securing the ROM 1107 to permit securely and secretly storing both the biometric template information and the secret key.

Figure 12:
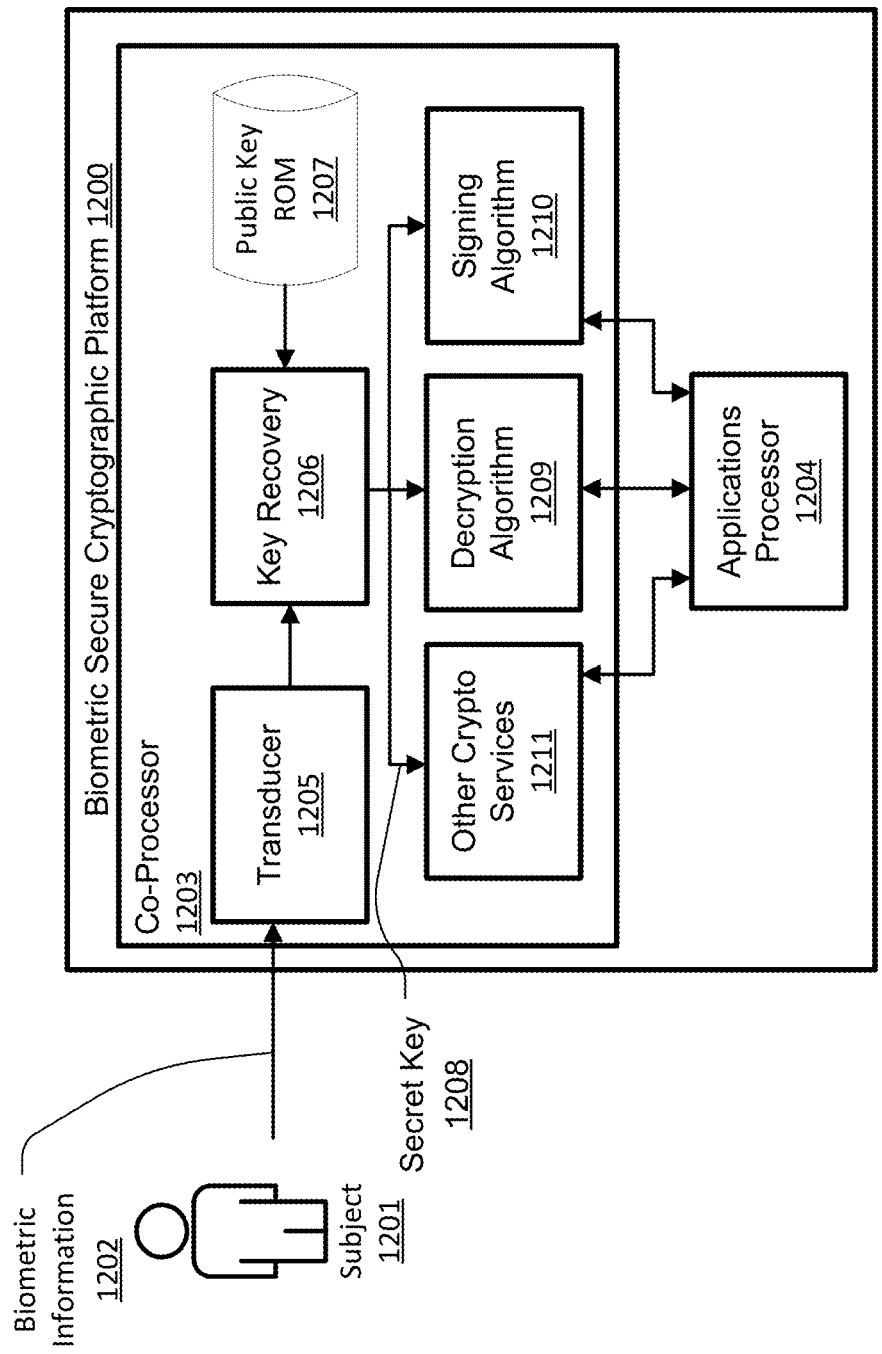
FIG. 12 is a schematic representation of data flow through functional components used in an improved, biometric secure platform.

FIG. 12 is a schematic representation of data flow through functional components used in an improved, biometric secure cryptographic platform 1200. The subject 1201 presents his or her biometric information 1202 to a transducer 1205 inside of a co-processor 1204. The transducer 1205 processes the biometric information 1202 and sends these data to a key recovery process 1206. The key recovery process 1206 obtains a biometric public key from the public key ROM 1207, and recovers the secret key 1208 as described above. Cryptographic algorithms such as the decryption algorithm 1209, signing algorithm 1210, and other cryptographic algorithms 1211 may then use the secret key 1208. The applications processor 1204 may then communicate with the co-processor 1203 to invoke the cryptographic algorithms 1209, 1210, 1211.

Note that if the subject 1201 is not authenticated during the key recovery process 1206, the secret key 1208 is not generated, so none of the cryptographic algorithms 1209, 1210, 1211 are available to the applications processor 1212. Also note that the biometric secure cryptographic platform 1200 does not require the use of any secure ROM, unlike the prior art platform of FIG. 11. By contrast, the public key ROM 1207 may be accessed by anyone, without loss of security functionality.

Embodiments of the present invention realize several advantages over the prior art. Noise is often introduced due to temperature variations, a person not scanning his or her finger or eye exactly the same way each time, and other such errors. Experimental data suggest that the methods described herein result in a higher error correction rate than any other known method in the biometric mask art (by more than a factor of three in certain applications). Essentially, this means that the invention makes it possible for the biometric scan to have a lot of noise and still be cryptographically secure, a major differentiator over prior art.

One downside that is often cited for biometrics is that if an individual's iris scan or fingerprint is compromised, it can't be "reset" like a password can be reset. But with the processes described herein, multiple keys can be derived from the same biometric, so if F(S) is compromised, one can compute a new F'(S) for the same person's biometric. Embodiments of the invention are unique in being able to overcome this downside. Also, F(S) is a stable key that can be integrated into any other cryptographic protocol. Therefore, embodiments of the invention trivially extend to multi-factor authentication by use of F(S) in combination with other passwords and tokens. As would be understood by those skilled in the art, the secret number S is not necessarily directly used as the key for encryption and/or signing. Instead, the derivation function F may use both S and function identification information as its input. The function F can be implemented using a standard HMAC algorithm (such as HMAC-SHA256). An arbitrary number of functions (e.g., F, F', F'', F''', etc.) may be used under conditions wherein each function produces a different secret. The function itself may be public. The biometric public key may contain information that enables identification of the function used.

One primary challenge with existing PKI is how to cryptographically tie a public key to a user. The methods disclosed herein solve that problem. For example, the U.S. military has stated that there is a vulnerability in their current systems because they are not able to attribute actions to a particular person, which affects forensics and legal prosecutions. One does not know whether a particular user performed a malicious action, or whether someone stole his or her token, password, or certificate and pretended to be the user. With the techniques disclosed herein, one can ensure that the user was physically present and performing the action by scanning the user's biometric at that time. The user cannot give their biometric to someone else (without ripping out their eye, for example), and no one can steal someone else's biometric. Therefore, embodiments of the invention can cut down on costs associated with data forensics and steps taken after a breach has occurred.

As another example of an advantageous application of the concepts disclosed herein, note that a biometric may be a measurement of organic characteristics of a group of individuals. Thus, in another embodiment of the invention, the biometric used to produce the public key may consist of measurements of a group of people, so that successful authentication can occur only when all people are present for their organic characteristics to be measured. This embodiment is useful when one must prove that all parties are present in one or more locations at the same time. This embodiment therefore may be seen as a new threshold cryptosystem that uses biometric data rather than, or in addition to, other data (such as points on a secret curve to be reconstructed, as is known in the art). Thus, a biometric public key threshold cryptosystem can be made to require a threshold number of inputs from one or more sources in order to create a public key and perform an authentication. For example, a military operation might require a quorum to declare war or launch a missile, while a hedge fund might require a majority of partners to approve a large virtual currency transaction. Similarly, such a biometric public key threshold cryptosystem also can be made to allow an individual to present a threshold number of pieces of information to perform authentication, e.g., 3 out of 15 pieces of information selected from the group consisting of irises, fingerprints, social security number, date of birth, legal name, token, personal identification number (PIN), browsing history, etc.

Architecture Implementations

The described fuzzy extractor can be secure whether implemented locally on a device or in a central server. In embodiments, the local device or central server may be configured with a secure enclave (e.g., a hardware root of trust) where operations of the present invention (e.g., capturing biometric data, generating/extracting keys, encrypting/decrypting data, and signing transactions) may be securely performed.

Figure 25:
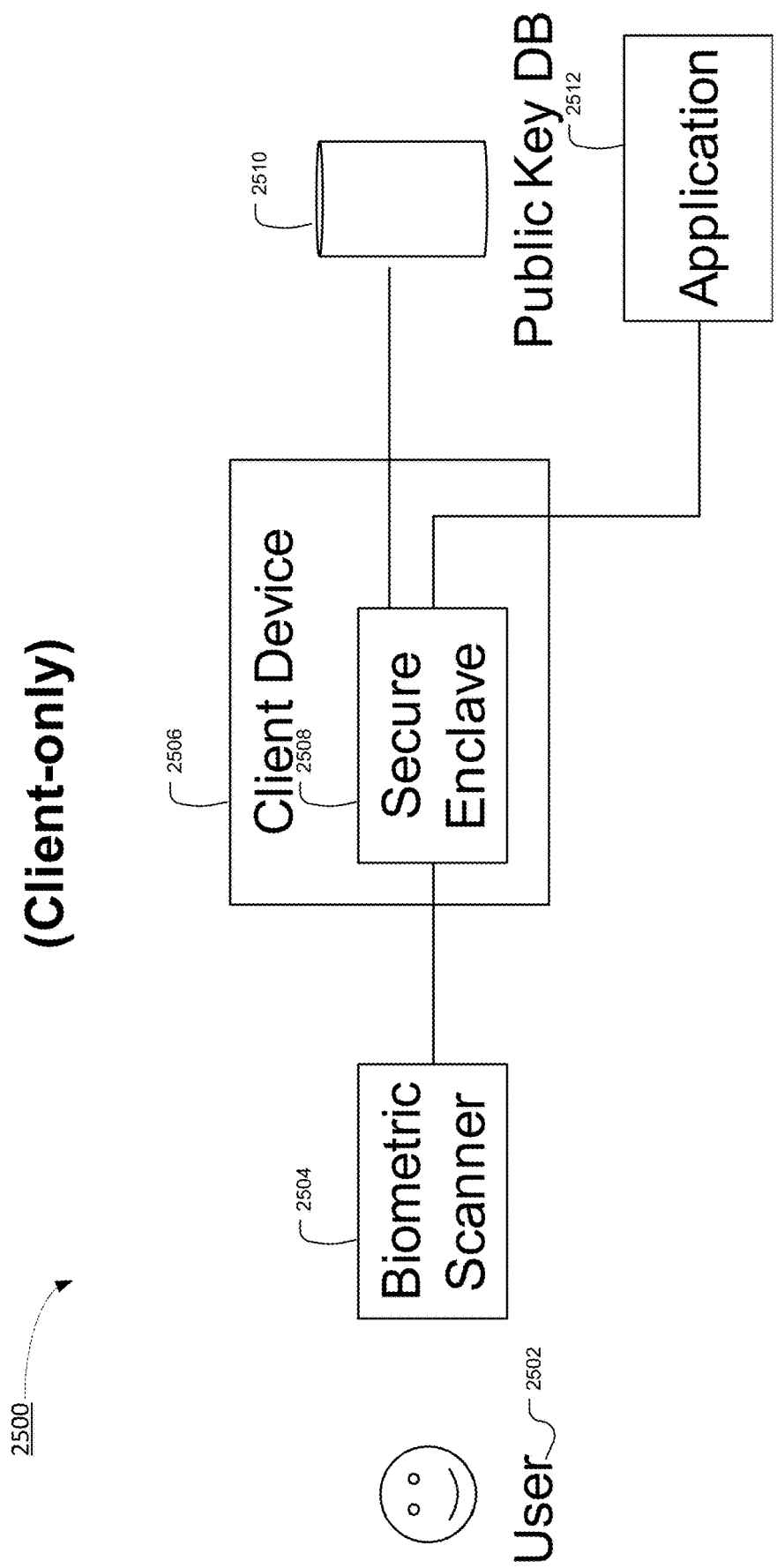
FIG. 25 is a schematic diagram showing an embodiment in which the secure enclave is in the client device, in accordance with an exemplary embodiment.

FIG. 25 is a schematic diagram showing an embodiment of a computer architecture 2500 in which the secure enclave 2508 is configured in the client device 2506, in accordance with an exemplary embodiment. Here, the biometric scanner 2504 collects the biometrics from the user 2502. The scanner 2504 encrypts the biometrics such that only the secure enclave 2508 can decrypt them (e.g., using PKI). The scanner 2504 sends the encrypted biometrics to the enclave 2508. The enclave 2508 decrypts the biometrics, which then can be used for key generation/extraction and authentication using techniques described herein. The enclave 2508 may retrieve and store data in the public key database 2510 for decrypting the biometrics, retrieving keys, generating keys, extracting keys, authentication, and such. The secure enclave interacts with the application 2512 using the generated or extracted key.

Figure 26:
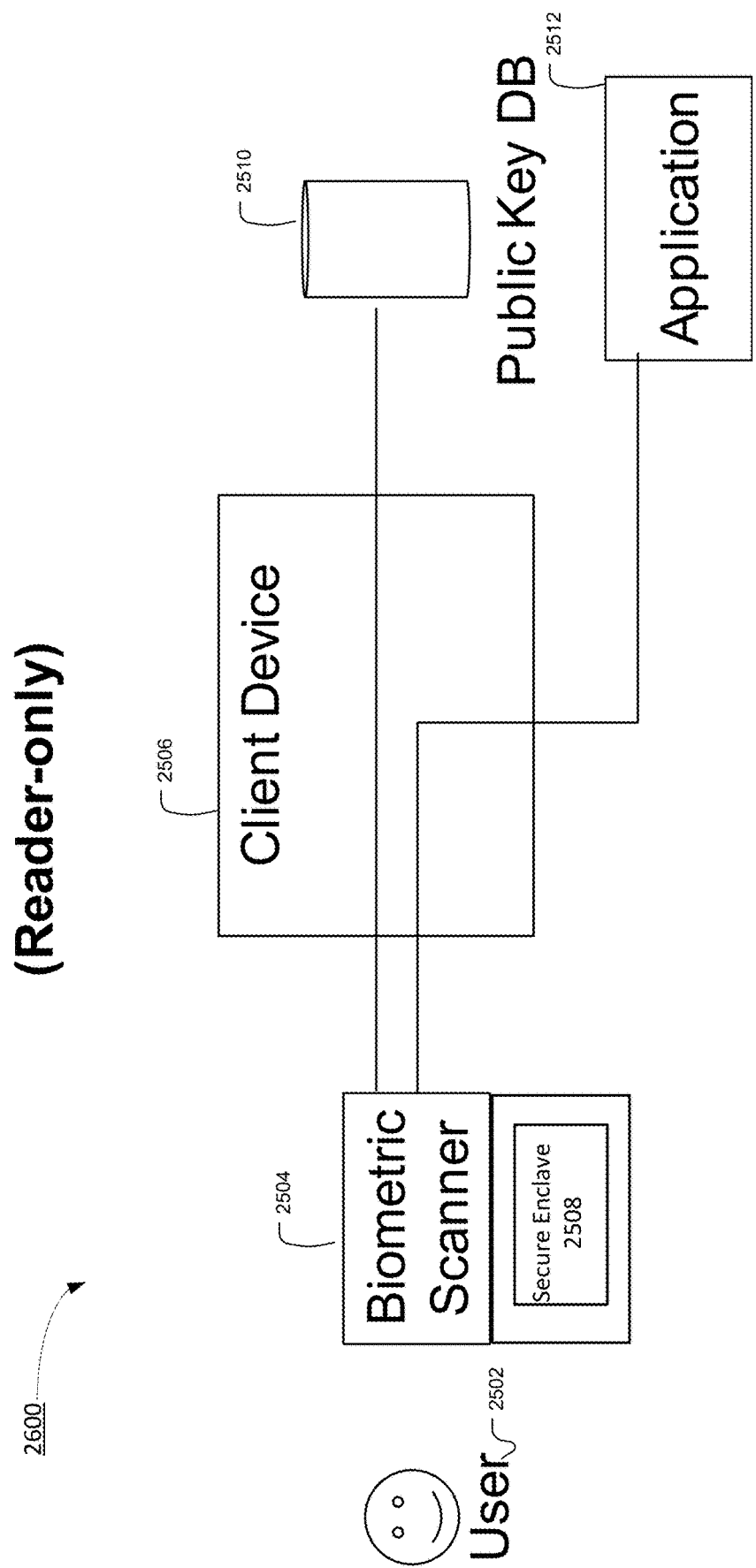
FIG. 26 is a schematic diagram showing an embodiment in which the secure enclave is in the biometric scanner, in accordance with an exemplary embodiment.

FIG. 26 is a schematic diagram showing an embodiment of a computer architecture 2600 in which the secure enclave 2508 is in the biometric scanner 2504, in accordance with an exemplary embodiment. Here, the scanner 2504 does not transmit the biometrics to the client device 2506, but rather the secure enclave 2508 is within the scanner 2504 and the key generation or extraction is performed within the enclave 2508 inside the scanner 2504. The enclave 2508 may retrieve and store data in the public key database 2510 for decrypting the biometrics, retrieving keys, generating keys, extracting keys, authentication, and such. The secure enclave interacts with the application 2512 using the generated or extracted key.

Figure 27:
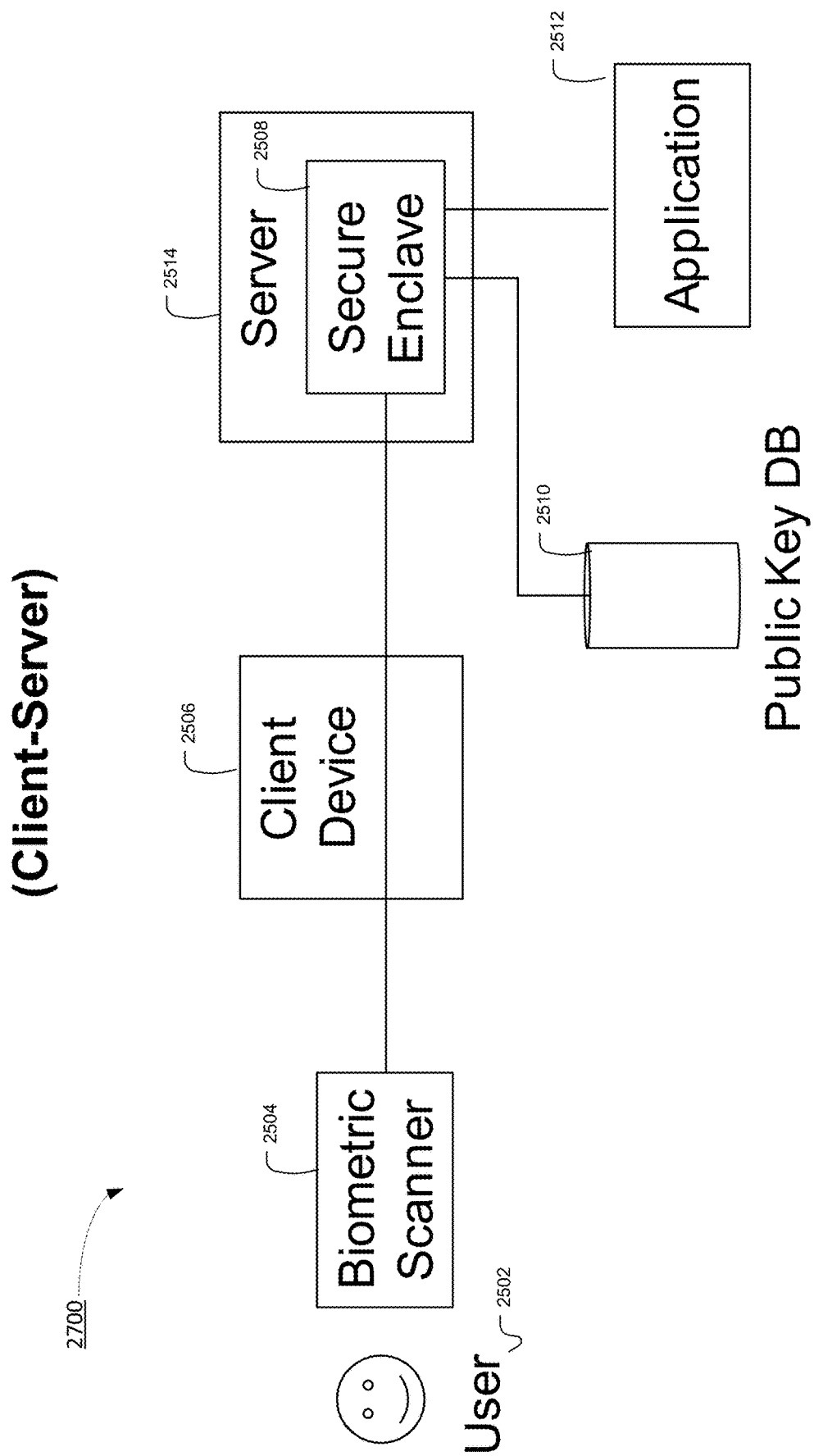
FIG. 27 is a schematic diagram showing an embodiment in which the secure enclave is in a server accessed via the client device, in accordance with an exemplary embodiment.

FIG. 27 is a schematic diagram showing an embodiment of a computer architecture 2700 in which the secure enclave 2508 is in a server 2514 accessed via the client device 2506, in accordance with an exemplary embodiment. Here, the biometric scanner 2504 collects the biometrics from the user 2502. The scanner 2504 encrypts the biometrics such that only the secure enclave 2508 in the server 2514 can decrypt them (e.g., using PKI). The scanner 2504 sends the encrypted biometrics to the enclave 2508. The enclave 2508 decrypts the biometrics, which then can be used for key generation/extraction and authentication using techniques described herein. The enclave 2508 may retrieve and store data in the public key database 2510 for decrypting the biometrics, retrieving keys, generating keys, extracting keys, authentication, and such. The secure enclave interacts with the application 2512 using the generated or extracted key.

Figure 28:
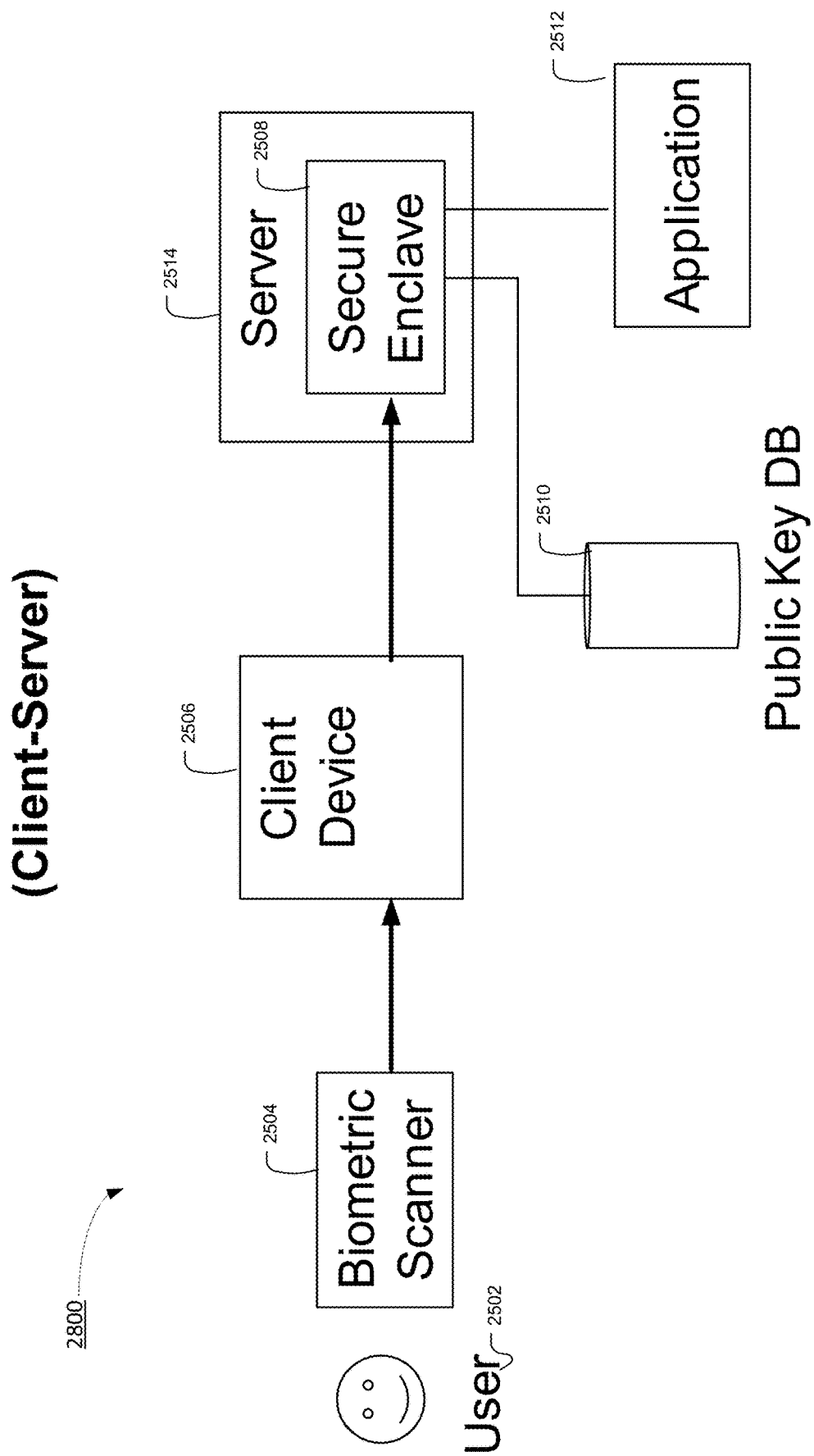
FIG. 28 is a schematic diagram showing an alternative embodiment in which the secure enclave is in a server accessed by the client device, in accordance with an exemplary embodiment.

FIG. 28 is a schematic diagram showing an alternative embodiment of a computer architecture 2800 in which the secure enclave 2508 is in a server 2514 accessed by the client device 2506, in accordance with an exemplary embodiment. Here, the client device 2506 receives biometrics from the biometric scanner 2504 (e.g., from a trusted, directly connected biometric scanner), encrypts the biometrics, and sends the encrypted biometrics to the secure enclave 2508 in the server 2514. The enclave 2508, decrypts the biometrics, which then can be used for key generation/extraction and authentication using techniques described herein. The enclave 2508 may retrieve and store data in the public key database 2510 for decrypting the biometrics, retrieving keys, generating keys, extracting keys, authentication, and such. The secure enclave interacts with the application 2512 using the generated or extracted key.

Figure 29:
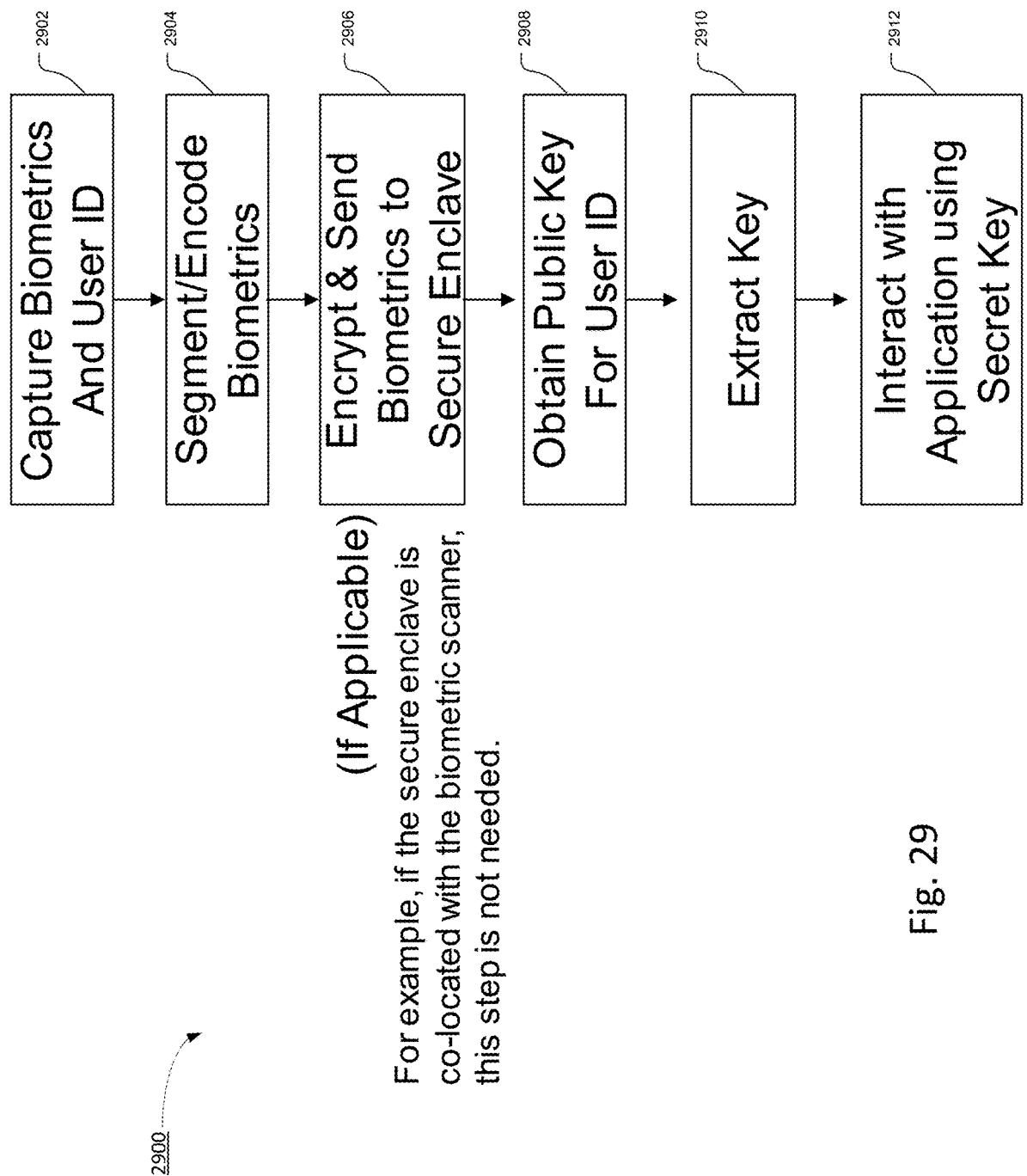
FIG. 29 is a schematic diagram showing logic flow associated with FIGS. 25-28, in an exemplary embodiment.

FIG. 29 is a schematic diagram showing logic flow 2900 associated with FIGS. 25-28, in an exemplary embodiment. Because the biometric is not stored, the trusted computing base (TCB) remains small (e.g., does not scale with the number of users). In FIG. 29, computer process 2902 (e.g., by biometric scanner 2504) captures biometrics and an identifier (ID) from the user. The computer process 2904 segments and encodes the biometrics captured from the user. The computer process 2906 then encrypts and sends the biometric to a secure enclave (e.g., located at the client device 2506 or server device 2514). The computer process 2906 is omitted when the secure enclave is co-located with the biometric scanner 2504 (as shown in FIG. 26). The computer process 2908 (in the secure enclave) next obtains a public key for the user ID captured at computer process 2902. For example, the public key is retrieved from the database (e.g., from the public key database 2510) based on the captured user ID. The computer process 2910 extracts or generates a secret key based on the captured biometrics and the obtained public key. The computer process 2912 then interacts with an application (e.g., to perform a transaction) using the secret key.

In an exemplary embodiment of the server architecture in FIG. 27, the biometric data is captured on the client device 2506, encrypted (by a biometric reader), and sent to the server 2514. The biometric data is decrypted inside a secure SGX enclave 2508 on the server 2514. The biometric data is processed, a secret key is extracted, and the transaction is executed using application 2512 all from within the enclave 2508. To guarantee that data is not stolen/tampered with between the client device 2506 and server 2514, all connections to the server 2514 may be TLS encrypted, and the client device 2506 may establish an IPSec tunnel directly to the enclave 2508 on the server 2514 (end-to-end encryption). The client 2506 itself may be a client process executed on a host computer (and that runs in an enclave on the host computer) that (1) directly interacts with the user 2502 to collect the transaction request, (2) directly collects the user biometrics, and (3) establishes the secure tunnel to the secure enclave 2508 on the server 2514. Thus, all transaction data sent/received by the enclave 2508 to/from a node, e.g., a bitcoin node, are public—they do not reveal anything about the user's biometrics or secret keys. In this way, even with a (1) malicious browser/OS on the client device 2506, (2) active man-in-the-middle adversaries between the user and server, and/or (3) compromised servers, biometric data cannot be stolen, and transactions cannot be executed on behalf of the user without his/her permission. In exemplary embodiments of the client-only architecture of FIG. 25, biometric data and requested transaction information can be captured and processed on the client device 2506. By the client device 2506, the secret key is extracted, and the transaction is executed via application 2512 using the secret key. This all occurs in the secure enclave 2508 on the client device 2506 that the user interacts with directly (e.g., via SGX/Trustzone). All transaction data sent/received by the enclave 2506 to/from a node, e.g., a bitcoin node, are public and tamperproof—they do not reveal anything about the user's biometrics or secret keys.

If the biometric reader or scanner 2504 is controlled by a party other than the controller of the secure enclave 2508, then the biometric reader or scanner 2504 can be programmed to encrypt all biometric data under a given secret key that is unique to the secure enclave provider. This secret key would be provisioned into the secure enclave 2508 via standard remote attestation. That way, only the secure enclave 2508 would be able to receive biometric data from the reader.

In some embodiments, the client process is trusted and runs in the enclave 2508 on the client device 2506. It directly communicates with the user 2502 to collect transaction and biometric data. Therefore, this guarantees correct transaction authorization. In the client-only model of FIG. 25, these data are used to create a signed transaction (public) in the enclave 2508 that is then sent to a node, e.g., to the bitcoin node. In the client-server models of FIG. 28, this trusted enclave of the client process establishes end-to-end security with the trusted enclave 2508 on the server 2514 (2-way attestation). This prevents (1) snooping/tampering of data between the enclaves, (2) spoofing a client or server enclave, and (3) active man-in-the-middles. The key extraction and transaction signing components run on the server 2514. The (public) signed transaction is then sent, for example, to the bitcoin node. These exemplary embodiments do not add attack surfaces because they leverage industry best practices for securing processing, data, and communications. For example, biometrics are processed within a secure enclave, all sensitive transmissions are end-to-end encrypted (e.g., using TLS/IPSec), and sensitive data is not stored at any time.

Secure Wallet-as-a-Service

Figure 14:
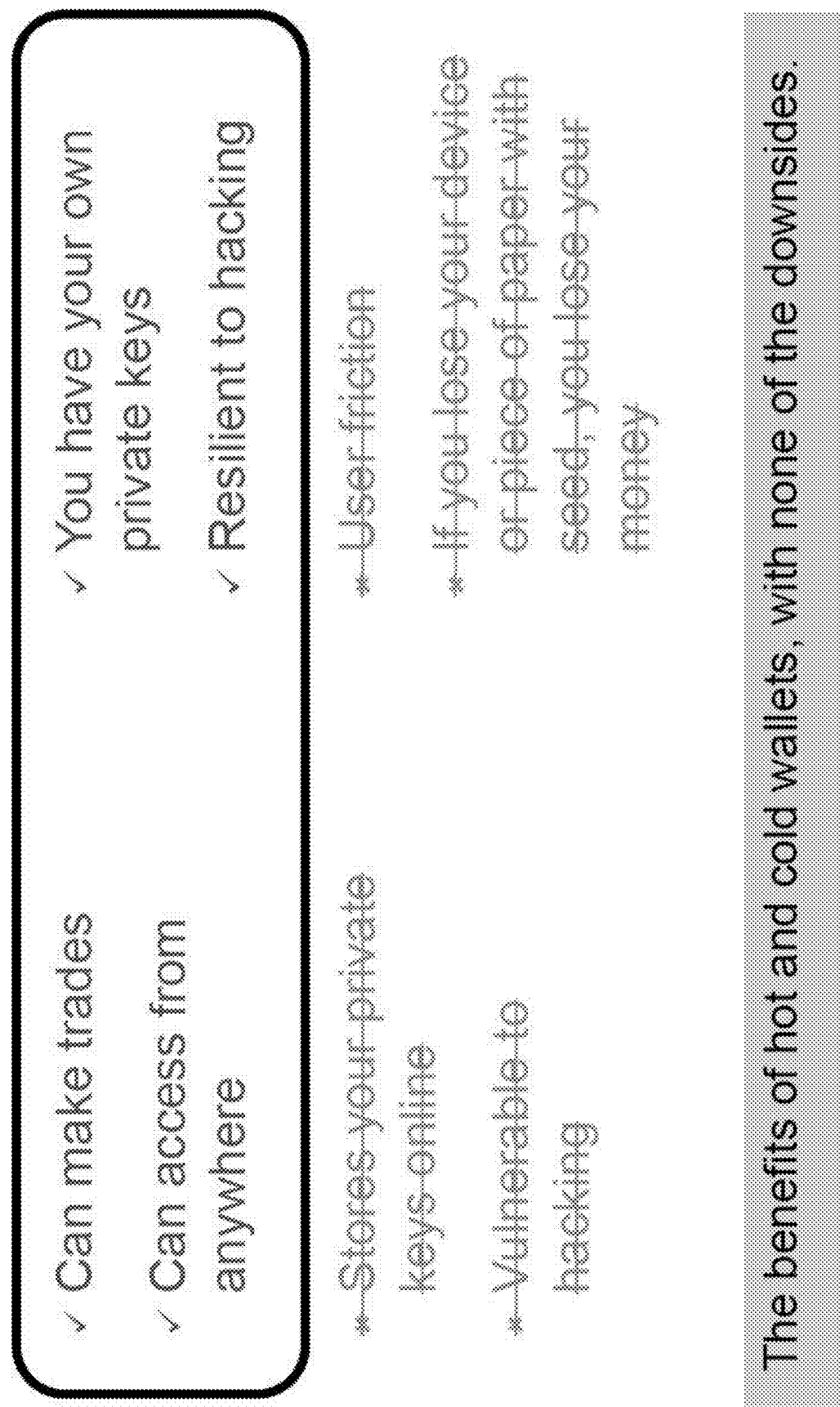
FIG. 14 shows how exemplary embodiments reap the benefits of hot and cold wallets with none of the downsides.

The biometric public key authentication techniques described herein can be used to provide a secure online wallet (e.g., as a sort of wallet-as-a-service or WaaS) that has the benefits but not the detriments of both hot wallets and cold wallets. As discussed above, biometric public key authentication techniques described herein can be accomplished without storing users' private keys or biometrics while still providing a fully online solution for authentication and other transactions based on stored public key information for which security is not required. A hot wallet solution facilitates online transactions by storing private information online (e.g., private keys, user biometrics, etc.) but places an undesirable burden on the hot wallet provider to secure the private information (an operational and technical risk that many investors do not want) while still leaving the private information susceptible to online hacking. A cold wallet solution is resilient to online hacking but puts the onus on users to secure their own private information (e.g., on paper or in a private storage device), making online transactions more difficult and increasing the chances that a user will lose the private information and be unable to access whatever is secured using the private keys (e.g., online currency). Exemplary embodiments can store only public key information, thereby eliminating the operational and technological risk of traditional hot wallets. Also, because biometric information is used as a private key, it is virtually impossible for a user to lose his or her private information. FIG. 13 compares some of the benefits (preceded by checkmarks) and detriments (preceded by asterisks) of hot wallets and cold wallets as known in the art. FIG. 14 shows how exemplary embodiments of the present invention reap the benefits of hot and cold wallets with none of the downsides.

Figure 15:
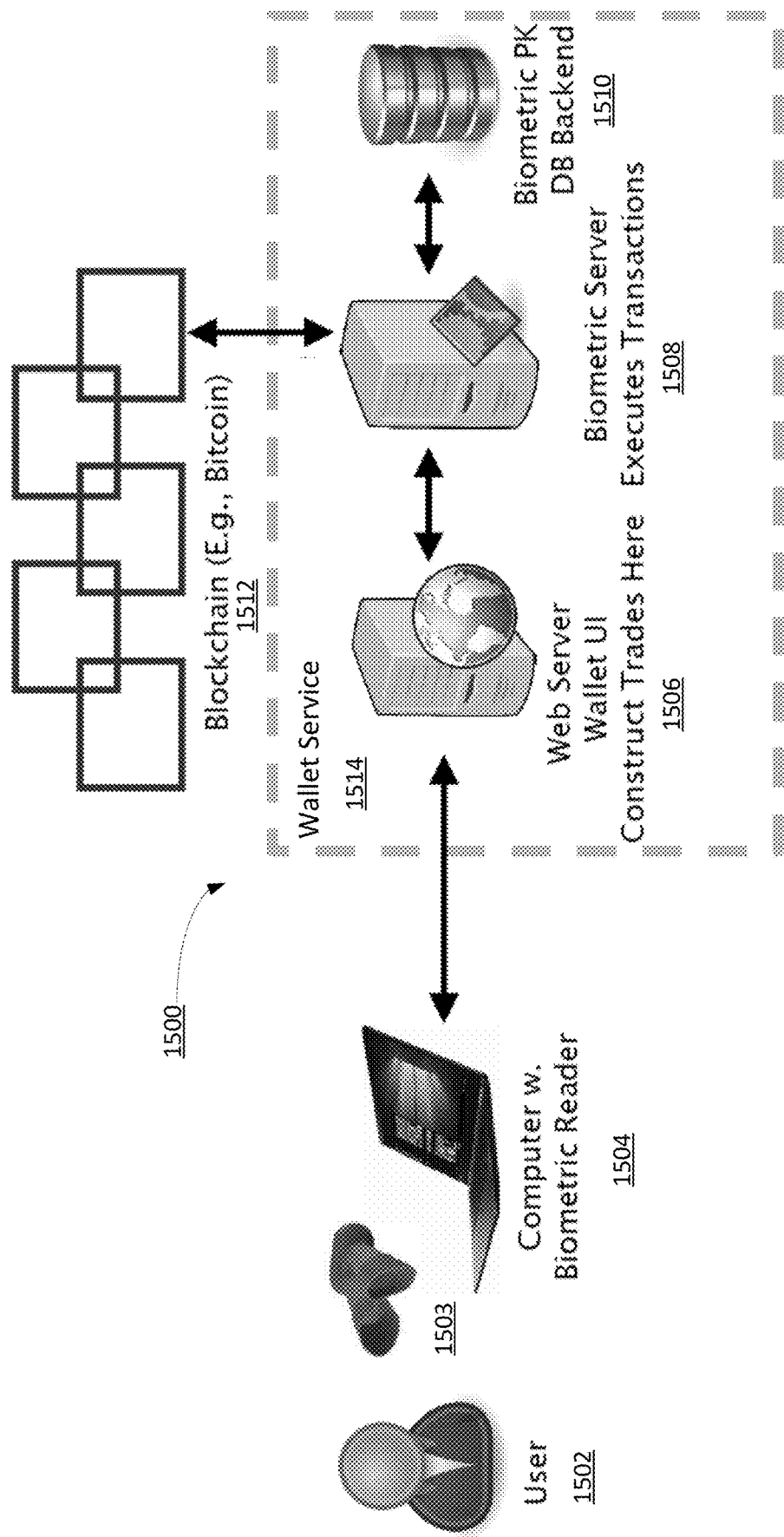
FIG. 15 is a schematic diagram showing a wallet service in the context of handling blockchain transactions, in accordance with an exemplary embodiment.

FIG. 15 is a schematic diagram of a system environment 1500 showing a wallet service 1514 in the context of handling blockchain transactions, in accordance with an exemplary embodiment. Here, a user 1502 via a computer with a biometric reader 1504 and coupled to a biometric scanner 1503 communicates with a wallet service 1514. The provider of the wallet service 1514 runs a web server system 1506 communicatively coupled to a biometric server system 1508. The web server system 1506 may provide a wallet user interface and constructs trades (e.g., cryptocurrency). The biometric server system 1508 performs biometric public key authentication and executes transactions based on public key information stored in a backend database (biometric PK database backend) 1510 communicatively coupled to the biometric server system 1508. The biometric server system 1508 executes the transactions in communication with the Blockchain (e.g., Bitcoin) 1512. Among other things, this exemplary embodiment allows the provider of the wallet service 1514 to be a full-service wallet/custody provider, e.g., selling to cryptocurrency exchanges and hedge funds.

Figure 16:
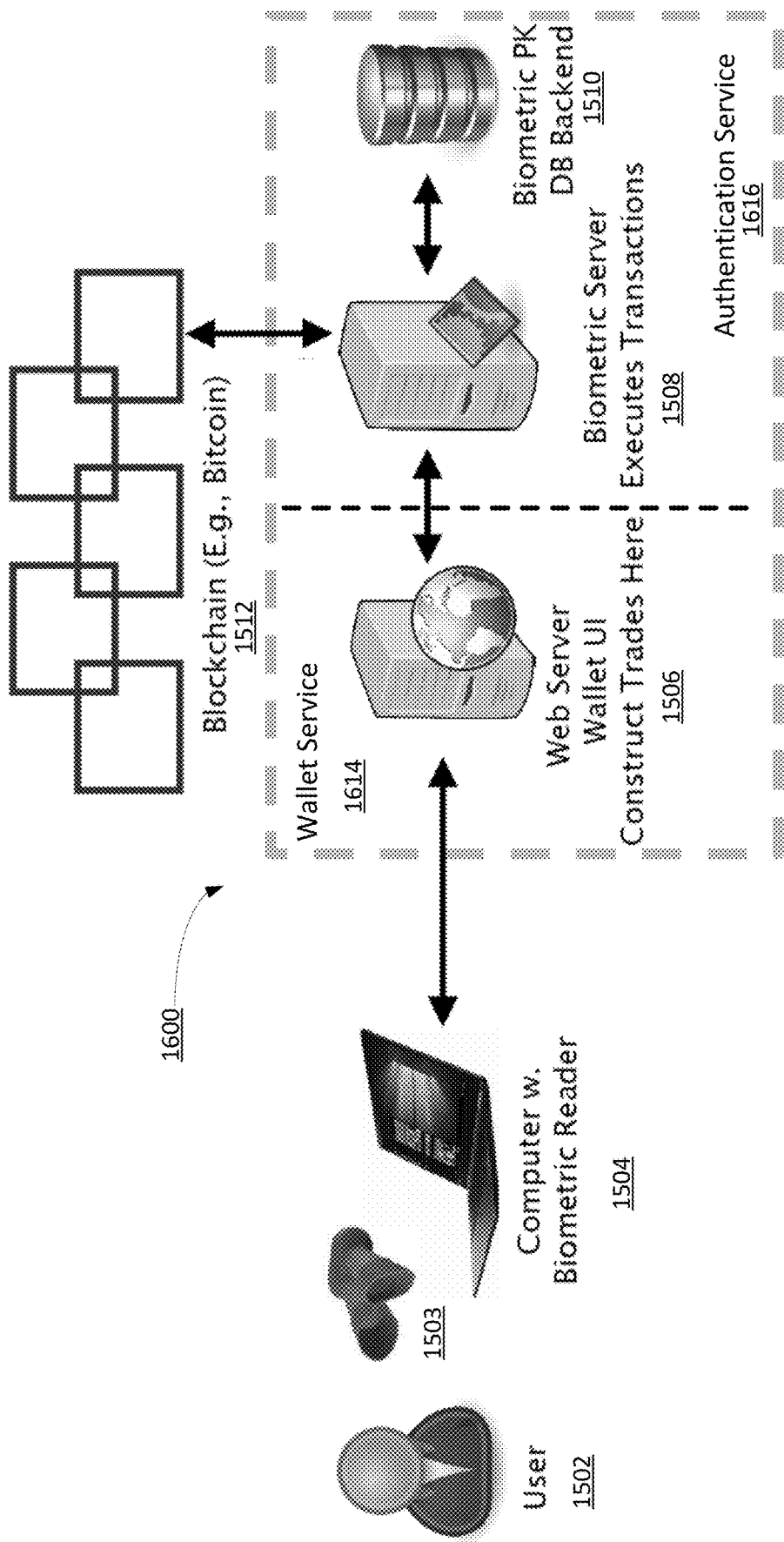
FIG. 16 is a schematic diagram showing an alternate wallet service in which a wallet service provider runs the web server system and an authentication service provider runs the biometric server system, in accordance with an exemplary embodiment.

FIG. 16 is a schematic diagram of a system environment 1600 showing an alternate embodiment with a wallet service. Here, a user 1502 via a computer with a biometric reader 1504 and coupled to a biometric scanner 1503 communicates with the wallet service 1614. The provider of the wallet service 1614 runs the web server system 1506 and the provider of an authentication service 1616 runs the biometric server system 1508 that is communicatively coupled to a backend database (biometric PK database backend) 510, in accordance with an exemplary embodiment. The biometric server system 1508 executes the transactions in communication with the Blockchain (e.g., Bitcoin) 1512. Thus, for example, the authentication service provider can provide authentication services 1616 for multiple wallet services. In this exemplary embodiment, the authentication service provider generally would provide an application program interface (APIs) through which the various wallet services (such as the wallet service 1614) can transact with the authentication service 1616. It should be noted that, in accordance with this exemplary embodiment, the authentication service provider may provide authentication services 1616 to at least one of multiple wallet service providers and to other types of service providers.

Figure 17:
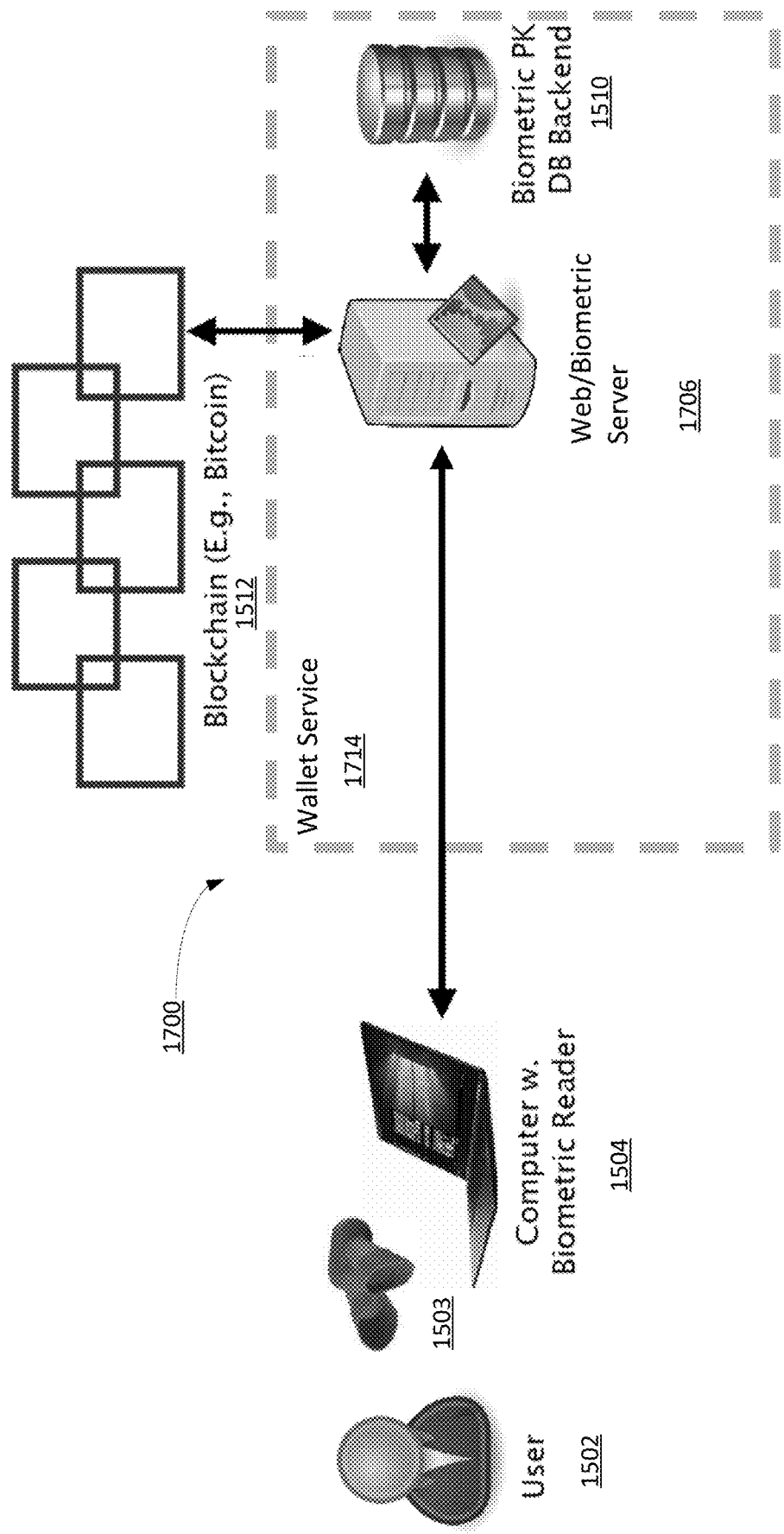
FIG. 17 is a schematic diagram showing an alternate wallet service in which the web and biometric operations are integrated, in accordance with an exemplary embodiment.

FIG. 17 is a schematic diagram of a system environment 1700 showing an alternate wallet service 1714 in which the web and biometric operations are integrated, in accordance with an exemplary embodiment. Here, a user 1502 via a computer with a biometric reader 1504 and coupled to a biometric scanner 1503 communicates with the wallet service 1714. The provider of the wallet service 1714 runs the integrated web and biometric server system 1706 that is communicatively coupled to a backend database (biometric PK database backend) 1510, in accordance with an exemplary embodiment. The integrated web/biometric server system 1706 executes transactions in communication with the Blockchain (e.g., Bitcoin) 1512. Thus, for example, biometric public key authentication can be integrated into an existing wallet service, such as wallet services, provided by wallet service providers like Ledger, Trezor, Anchor, etc.

Figure 18:
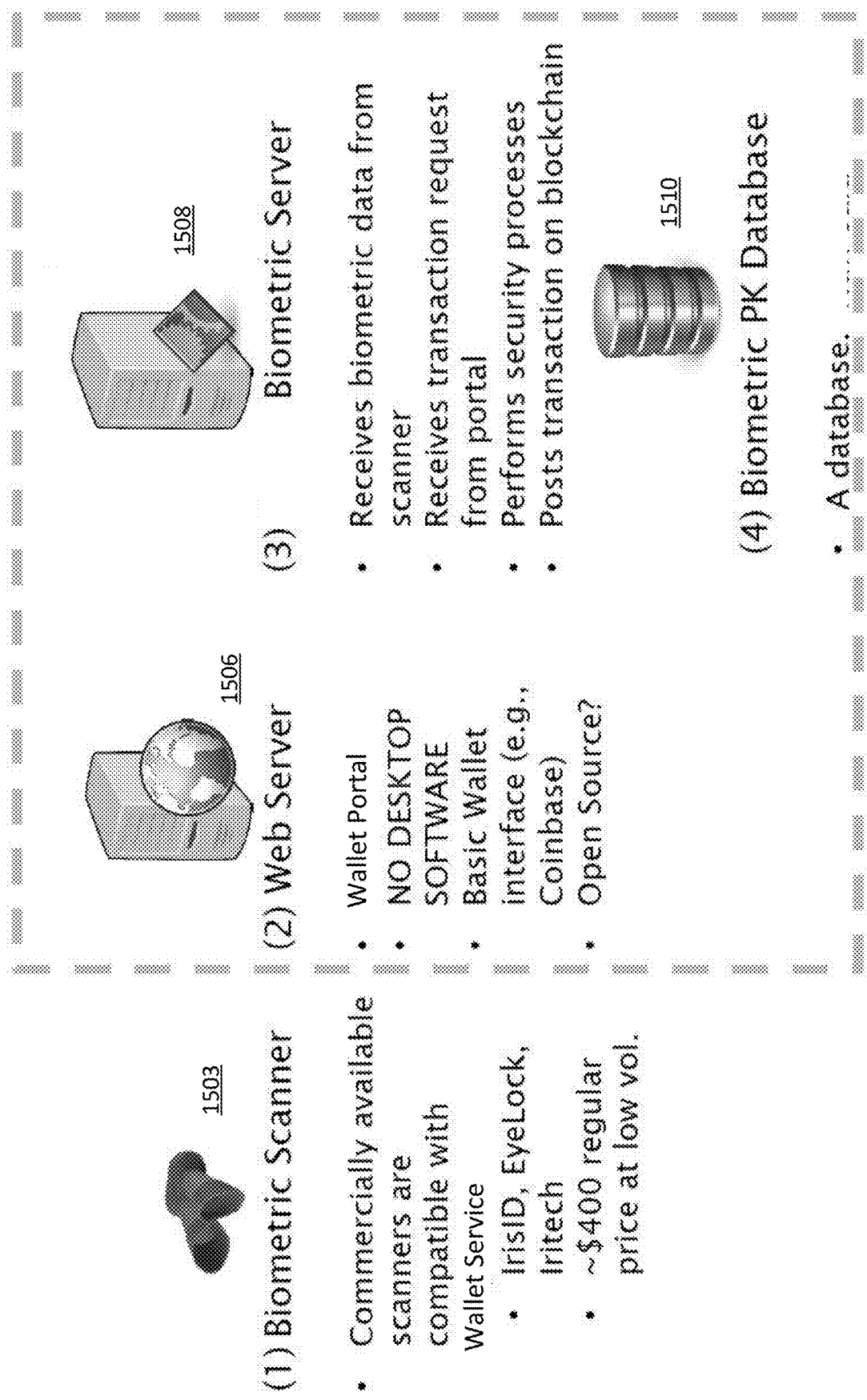
FIG. 18 is a schematic diagram showing the relative division of operations between the various components shown in FIGS. 15-17, in accordance with an exemplary embodiment.

FIG. 18 is a schematic diagram showing features of the various components and the relative division of operations between the various components shown in FIGS. 15-17, in accordance with an exemplary embodiment. Here, the biometric scanner 1503 can include a commercially available scanner such as an iris scanner, fingerprint scanner, or other device that is compatible with other wallet services. The web server system 1506 provides a wallet portal (without desktop software) that can provide a similar user interface as existing hot wallets such as Blockchain.info and Coinbase, and may be open source. The biometric server system 1508 receives biometric data from the scanner 1503, receives transaction requests from the portal of the web server system 1506, performs security processes, and posts transactions on the blockchain 1512. The biometric server system 1508 is coupled to the biometric PK database 1510. These embodiments of the wallet service can be made to interface with multiple exchanges, and can be made to require multiple users to access the wallet in order to authorize a transaction.

Figure 19:
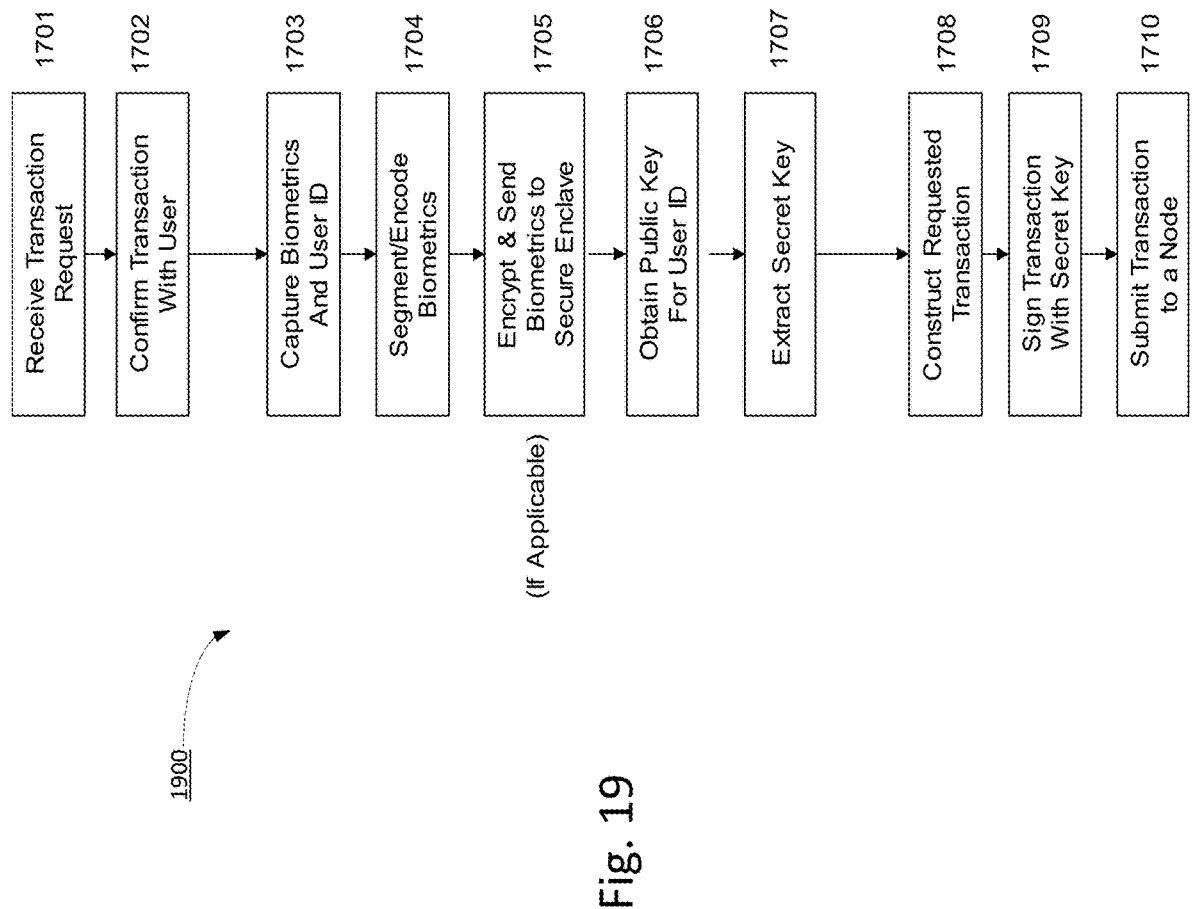
FIG. 19 is a schematic diagram showing logic flow for a wallet transaction, in accordance with an exemplary embodiment.

FIG. 19 is a schematic diagram showing logic flow 1900 for a wallet transaction, in accordance with an exemplary embodiment. In block 1701, a transaction request is received from a user (e.g., user 1502). For example, the user may have an account with a bitcoin exchange such as Coinbase, in which case the user may log into the exchange via the portal and specify a desired transaction (e.g., the user may enter his/her information, information about the other party to the transaction, the transaction amount, and signature). In block 1702, the transaction is confirmed with the user to verify that the transaction being approved is the transaction that is intend by the user, e.g., to confirm that the transaction amount and other party are correct. Upon confirming the transaction, user authentication is performed in accordance with blocks 1703-1707. Specifically, in block 1703, biometric and any other information required for authentication (e.g., a user identifier, in some embodiments) is captured from the user. The biometric information is segmented and encoded, in block 1704, and, if applicable (e.g., transmitted to a client device or server), is sent to a secure enclave, in block 1705. In block 1706, public key information for the user is then retrieved from the database, e.g., based on user identification information captured in block 1703. In block 1707, the secret key is extracted based on the user biometric and any other information along with the public key information, as described herein (e.g., FIG. 4). Once authentication is complete, the transaction is executed in blocks 1708-1710. Specifically, the requested transaction is constructed in block 1708. This can involve, for example, gathering elements for the transaction (e.g., parties, amount, etc., depending on type of transaction or cryptocurrency). The requested transaction is then signed with the secret key in block 1709. In block 1710, the signed transaction is submitted to a transaction processor. In certain exemplary embodiments, the transaction processor can be a node on a blockchain network, in which case the node may broadcast the signed transaction to various "miners" that compute a new block, sign the block, and post the block to the blockchain. When the block that contains the transaction has been accepted by the miners, the transaction is considered processed.

Examples of hacks demonstrate differences between the secure WaaS and a traditional hot wallet. For example, there are allegations that management team members of certain crypto hedge funds and exchanges personally hold secret keys instead of users holding them directly. The secret keys have sometimes been lost or stolen. With a secure WaaS, users do not have to trust their keys to anyone. Instead, users own their own keys because their keys are derived from their biometrics, and neither the keys nor the biometrics are stored so they cannot be stolen.

Furthermore, the secure WaaS also overcomes many of the shortcomings of cold wallets, particularly in the context of multiple-party authentication. In order to provide for multiple-party authentication, systems may divide the secret key into multiple shards that are stored by multiple parties. For example, a secret key may be divided into 9 shards with the user storing 3 shards, the hedge fund storing 3 shards, and an attorney storing 3 shards. The shards can be stored in many ways, such as written down on a piece of paper that is stored in a safe deposit box or stored on a hardware device that may be pin-code protected. To re-construct the secret key, some threshold number of shards (e.g., 5 of 9) are needed. This requirement can cause many issues, e.g., people can lose their shards, the key is hard to reconstruct when a transaction must be made quickly, it involves a manual and expensive process, it is prone to insider threat, etc. With the secure WaaS, the three parties (e.g., user, hedge fund, and attorney) can enroll and create a key that requires two out of the three parties in order to generate the private key to perform any transaction. As described herein, the enrollment can be done with biometrics, pin code, token, combination thereof, etc. This eliminates the manual process as well as fear of loss, and is much more secure.

Time Lock

One potential problem with blockchain and other types of online services is that the loss of private key information can result in a permanent loss of access to the service. This can be true for both biometric and non-biometric authentication systems, and it can have catastrophic results. For example, in a virtual currency system, death or incapacity of the user, or loss of private key information by the user, can effectively represent a loss of all of the user's funds, given that the user can no longer access the funds. As discussed herein, other parties can be given access to the service (e.g., requiring a threshold number of parties to provide biometrics for authentication), but the user may not want to simply provide others with such access without further limitations.

Thus, certain exemplary embodiments implement a time lock (restriction) mechanism that allows a specified action to be performed after expiration of a specified period of time under specified conditions. The specified period of time can be an actual time (e.g., the $18^{th}$ birthday of the owner's child), a relative time (e.g., if no action is taken for 6 months), a blockchain height, or other future event or condition that can be confirmed by the system. In a blockchain, blocks are linked to form a chain, each block refers to the previous block, and blocks can only be added to the chain such that the length (height) of the chain only grows. In a proof-of-work situation, each block takes a certain time to compute, so the specification of a blockchain height essentially corresponds to an amount of time.

For example if a user A does not log into a virtual currency exchange for a specified period of time (e.g., 6 months), then the virtual currency exchange could be made to pass currency from A's account to person C. User A can prevent this automatic transfer of currency to person C simply by logging into the exchange at least once every 6 months. In the event that User A loses his or her private key information or dies, thereby preventing User A from logging into the account, person C does not receive the funds immediately but only receives the funds after expiration of the time period. The virtual currency exchange additionally could be made to require person B to confirm that person A has died before passing the currency from A's account to person C, thereby adding a level of protection (e.g., if User A mysteriously disappears).

In one exemplary embodiment, a time lock is implemented using a pay-to-script-hash (P2SH). The P2SH is configured to enable the original currency owner A to access the funds OR to enable a secondary (beneficiary) owner to access the funds. However, the secondary (beneficiary) owner is restricted such that he/she may only access the funds after the pre-set amount of time has elapsed, e.g., if user A has not logged in for 6 months.

Figure 20:
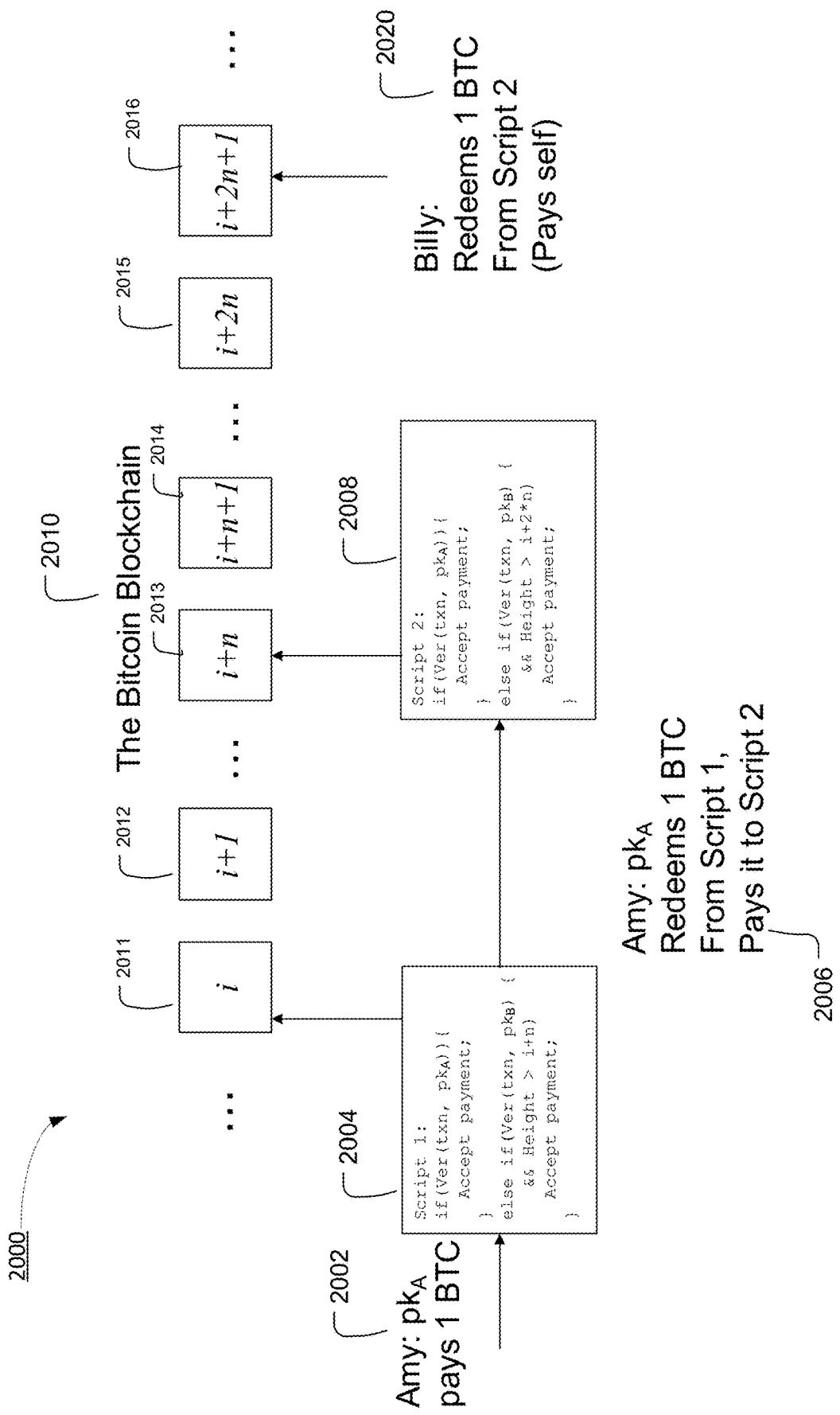
FIG. 20 is a schematic diagram showing an example P2SH implementing a time lock, in accordance with an exemplary embodiment.

FIG. 20 is a schematic diagram of a logic flow 2000 showing an example P2SH implementing a time lock, in accordance with an exemplary embodiment. Here, owner Amy sets up a time lock that allows beneficiary Bob to redeem money only after the blockchain reaches a predetermined height, which Amy can reset from time to time to prevent Bob from redeeming the money. Specifically, in this example, Amy pays 2002 1 bitcoin (BTC) to a script hash for Script 1 2004 (Amy's public key is $pk_A$; Bob's public key is $pk_B$). Script 1 2004 is configured such that Amy can redeem money from the script at any time and Bob can redeem money from the script only after the blockchain 2010 reaches a certain height 2011-2016 (in Script 1 2004, the height is i+n 2013). The time is extended/renewed when Amy redeems 2006 her 1 BTC from Script 1 2004 and pays it to Script 2 2008 (in Script 2 2008, the height is i+2*n 2015). If and when the script 2008 expires, Bob can redeem 2020 1 BTC from the script 2008. In this way, if Amy passed away (and her biometrics along with her), Billy could access her money—similar to in a will. It should be noted that each payment step and each redeeming step can, but is not required to, use biometric public key authentication technology as described herein. Thus, a time lock mechanism can be used alone or in combination with biometric public key authentication.

Virtually any online service that requires some form of authentication (e.g., a username and password) can implement a time lock mechanism. For but one example, an account owner could set up a beneficiary account (e.g., username and password) that only becomes usable after expiration of a predetermined period of time, e.g., the account owner does not log in for 6 months). The account owner could provide the beneficiary account information to his/her beneficiary without risk that the beneficiary could access the account.

Additional Implementations/Differentiators

Certificate/Registration Authority: Exemplary embodiments can implement a certificate authority or a registration authority for people.

Identity proofing: Exemplary embodiments can provide identity proofing without requiring a biometric, such as, for example, based on other entropy sources such as a user's answers to security verification questions (e.g., mother's maiden name, pet name, previous cars, employment history, residence, etc.) that are required by many online services. One problem with such security verification questions is that it is difficult for the user to prove his or her identity versus an impostor if the answers are compromised. Exemplary embodiments can tokenize such data using the techniques described herein (e.g., as shown in FIG. 3 with respect to biometric information). For example, a public key can be generated from a user's answers to security verification questions, and, as described above, the public key optionally can be generated using threshold cryptography such that, for example, the user only needs to answer, say, 7 of 10 questions correctly. Similarly, a public key can be generated from a user's personal information without any input from the user and hence without an enrollment process (e.g., based on known information about the user such as maintained by the government, a credit bureau, a social media provider, a search engine provider, etc.), and, again, the public key optionally can be generated using threshold cryptography. The public key token can be shared with services, such as Okta, that can use the identity proofing service without the user being at risk of having his or her identifying information compromised because the services do not need to store the answers. For example, the public key token may be provided along with the questions that were used to generate the public key information (and for which the user must provide answers).

Recovery Back-Up: Exemplary embodiments can provide recovery back-up (e.g., for forgotten password) with no centralized "back-up system" (e.g., password reset, device re-provisioning, etc.) required. With on-device biometrics (e.g., fingerprint scanner on iPhone), provisions must be made for identifying and authenticating the user if his or her token (e.g., fingerprint data) is lost or stolen. This generally requires a centralized "back-up system" of alternate authentication credentials and associated processes. Using the techniques described herein, alternate authentication credentials can be "baked" directly into the public key (via threshold cryptography), resulting in back-up authentication without a secondary authentication infrastructure/database. Thus, no storage of secret credentials is required. Unique key pairs can be generated from the same user biometric(s) and other information such that there are multiple keys for identity anonymity. Different keys can be provided to different services.

Benefits over on-device biometrics: With on-device biometrics (e.g., fingerprint scanner on iPhone), the user effectively turns the device into a token. The infrastructure challenges and user friction associated with hardware tokens are well understood—some key ones being (a) users lose their tokens, but the device still has to be able to identify them if their token is lost/stolen (typically through some recovery process); (b) frequently revoking old/lost tokens and provisioning new tokens poses infrastructure challenges; and (c) tokens must be hardened extraordinarily well to be effective (e.g., Ledger tokens were recently hacked by a 15 year old), which is expensive and difficult. Exemplary embodiments mitigate these infrastructure challenges and user friction because the device is no longer turned into a token. Instead, any device, including a brand new one, is automatically capable of authenticating the user without provisioning. Thus, exemplary embodiments can dramatically reduce the complexity associated with key revocation because no key revocation is required in the event of a lost, stolen, or new device.

Prevention of Wire Fraud

An example of the wire fraud problem is someone falsely sends an email to a home buyer claiming to be the attorney for the bank with the wiring instructions, saying wire transfer of down payment must occur before closing, and will meet buyer at the closing. The techniques described herein can be used to establish secure communications and authenticating people. For example, one could pre-negotiate the wire transfer instructions, and buyer could use biometric to clear/approve it at closing.

Key-Stretching

Key stretching is increasing the computational complexity of the key extraction algorithm such that the overall security parameter is increased. For example, the information used to generate the public key can be padded with additional information, e.g., random bits, such as to extend from 120 bits to 128 bits. In order to authenticate, slows down everyone, direct trade of performance for security, can get you from 120 bit to 128 bits by brute forcing the 8 extra bits.

Tiered Security of Public Key

To enhance the security of the biometric public key, one may also encrypt the public key under a separate secret token. For example, if a user owns a secret S' and biometric public key PK, he/she may publish Enc_S(PK) instead of PK.

Alternative Secret Sharing Mechanisms

Some exemplary embodiments implement secret sharing based on the Learning Parity with Noise (LPN) problem's hardness assumption, although alternative embodiments may use any of various alternative secret sharing mechanisms. For example, there are other problems that do not yet have hardness assumptions but may in the future, such as linear secret share mod Q, polynomial secret share/Shamir, and polynomial secret share in the exponent, and alternative embodiments can use such problems for alternative secret sharing mechanisms. Another possible alternative is a standard linear secret share, which is the equation of the exact same form B=A. S+E, except the whole equation is mod q instead of mod 2. Another possible alternative is a Shamir secret share (where each valid share is a point on a polynomial) similar to the original Fuzzy Vault paper. Another possible alternative is to execute all operations of these shares "in the exponent," i.e., for some multiplicative group G with generator g, one may encode a secret share x as g^x. Since decoding for all of the above systems is linear, it may be computed in the exponent to retrieve an encoded secret.

Tiered Authentication

In some situations, it may be undesirable to force a user to participate in biometric public key authentication every time the user accesses a service. Thus, biometric public key authentication may be used in combination with a traditional authentication scheme (e.g., login using standard biometric authentication, username/password, PIN, behavioral, etc.) in order to provide a tiered authentication scheme in which the user is required to participate in biometric public key authentication only under certain conditions, with a traditional authentication scheme used at other times. For example, biometric public key authentication may be required when there is a question as to a person's identity (e.g., detection of anomalous behavior, even if traditional authentication was successful), upon a predetermined number of traditional login failures, when the user requests certain types of transactions (e.g., a currency transaction above a predetermined value threshold), or based on predetermined time intervals (e.g., once a day, once a week, etc., with traditional authentication used between such time intervals).

The following describes one exemplary embodiment for supporting tiered authentication in which biometric public key authentication is used for an initial login and then a traditional authentication scheme is used for a subsequent login:

(1) Following enrollment as described herein, the user connects to the server, and the server spawns a secure enclave (e.g. Intel SGX) that loads the user's Biometric Public Key.

(2) The user submits full biometric authentication information (e.g., two irises and fingerprints) to the secure enclave (after the enclave attests to its integrity to the user).

(3) The secure enclave extracts the user's secret key using public key biometrics. The secret key remains in the enclave.

(4) The enclave performs any authentication on behalf of the user.

(5) The user logs out of the enclave, but, importantly, the enclave persists in the server's memory.

(6) At a later time, the user logs back into the enclave using a traditional authentication scheme. This may require fewer or different factors of authentication than required in step 2 (e.g., just 1 fingerprint, a PIN, and/or behavioral system, etc.). The user then can perform any actions. This process does not use public key biometrics.

(7) The account can be "locked" by having the server delete the enclave (which deletes the secret key). This would return the user to step 1 above. This action can be initiated by the user, by the organization, by anomalous activity, by a timeout, by a timeout that depends on certain circumstances such as location or network, or other criteria.

Note that in this use case, there are still no "persistent" secrets in the system—the secret key is only in encrypted RAM and is never stored in non-volatile memory, and does not survive a power cycle. This is also anticipated to be combined with the multiple person and quorum use cases discussed herein. As but one example, 5 people could perform Public Key Biometric authentication and spawn an enclave that remains active and allows one person to perform 10 actions during the week, without requiring the 5 people to re-authenticate.

Peer-to-Peer Enrollment/Authentication

The following is an alternate method to the no-persistent-storage authentication methods discussed herein, referred to herein as "peer-to-peer enrollment" or "peer-to-peer authentication." This method could, for example, allow users to transfer data from their old phone to their new phone just by scanning their biometric on their new phone, and using this method to create a shared session key between the phones. Because at least one device persistently (i.e., not transiently, but not necessarily indefinitely or forever) stores biometric data of the user. This peer-to-peer enrollment/authentication has many of the disadvantages of persistent storage (e.g., biometric data could be hacked), but it does (1) enable the user to authenticate on any device, and (2) decrease requirements for the level of entropy of the biometric (e.g., fewer or lower quality biometric images). In this peer-to-peer enrollment/authentication method, the biometric data is stored on a first device, which may be one of a plurality of devices on which biometric data of the user is stored either in whole or in part. The second device may be the same type of device as the first device (e.g., both device may be smartphones) or may be a different type of device than the first device (e.g., the first device may be a smartphone and the second device may be a tablet or laptop computer). In some cases, the first device may include or be connected to a biometric scanner through which the user is enrolled on the first device, while in other embodiments, the first device may include a database that stores biometric data obtained elsewhere (e.g., the first device may be a server that stores biometric data received securely from a scanner device, and the first device does not necessarily need to have a biometric scanner or perform an enrollment of the user). A user can authenticate on a second device without the biometric data being transmitted off of the first device. For example, Device 1 enrolls the user or otherwise stores biometric data of the user, such that the user's biometric data is locally stored on Device 1, preferably in a secure enclave. Then, the same user wants to perform an authentication using Device 2. The user scans his/her biometrics with Device 2. The user's biometrics do not need to be persistently stored on Device 2. Device 1 and Device 2 can interact with each other to authenticate that the user using Device 2 is the same as the user that enrolled with Device 1, without the biometric data ever leaving either device.

Figure 21:
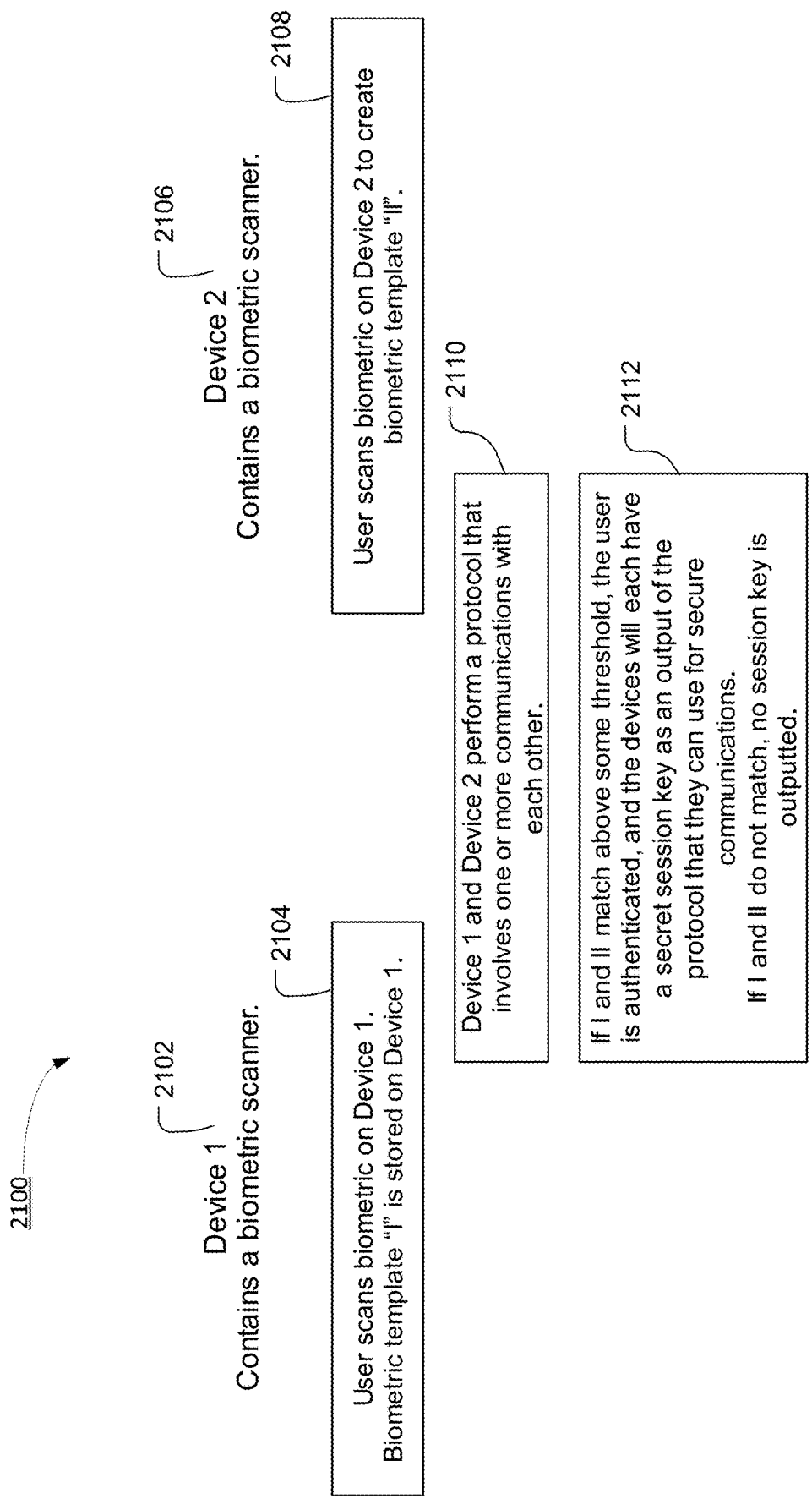
FIG. 21 is a schematic diagram showing an overview of the interaction, in accordance with an exemplary embodiment.

FIG. 21 is a schematic diagram of a logic flow 2100 showing an overview of the interaction in peer-to-peer enrollment, in accordance with an exemplary embodiment. In this example, Device 1 2102 and Device 2 2106 have no shared private information. Device 1 2102 is shown as including or containing a biometric scanner for the user to scan 2104 biometric on Device 1 that is created and stored as template I, and the stored biometric template I may be used in enrolling the user. But, as discussed above, Device 1 2102 could store 2104 biometric information (e.g., biometric template I) obtained elsewhere, without requiring Device 1 2102 to have a biometric scanner or perform an enrollment of the user. The user can scan 2108 his or her biometrics on Device 2 2106, at which point Device 2 2106 creates biometric template II. Device 1 2102 and Device 2 2106 perform 2110 a protocol that involves one or more communications with each other in order to determine if templates I and II match some predetermined confidence threshold (such as by using algorithms described herein, e.g., authentication algorithm in FIG. 4). If templates I and II match above the predetermined confidence threshold 2112, then each device will have a secret session key as an output of the protocol that they can use for secure communications, such as for allowing user data stored on Device 1 to be securely transferred to Device 2. If templates I and II do not match 2112, then no session key is output. The user data could be anything from low-security data (e.g., photographs, contacts, emails, documents, device configuration, application configuration, bookmarks, etc.) to high-security data, such as a top-secret document, and even could be an entire device profile such that Device 2 is reconfigured to operate as, or replace, Device 1 (e.g., such as when the user wants to decommission Device 1). This exemplary embodiment does not require key extraction from the biometric. Instead, the purpose here is to provision keys/biometrics into a device WITHOUT having to re-enroll the user through alternate authentication means (e.g., identity proofing) or having to use the fuzzy extractor. This approach has the advantage of improving the user experience (doing key extraction requires a significant amount of entropy from the user, while this approach requires less entropy, as it is an on-line protocol). It also allows the data to be decentralized on the devices, and the data never leaves any device.

An exemplary key exchange can be performed using a secure two-party computation, e.g., a multi-party computation (MPC) involving the two parties. One exemplary embodiment leverages a known 2-party MPC using oblivious transfer and Yao's garbled circuits (or equivalent), although other key exchange techniques can be used in alternative embodiments.

Figure 30:
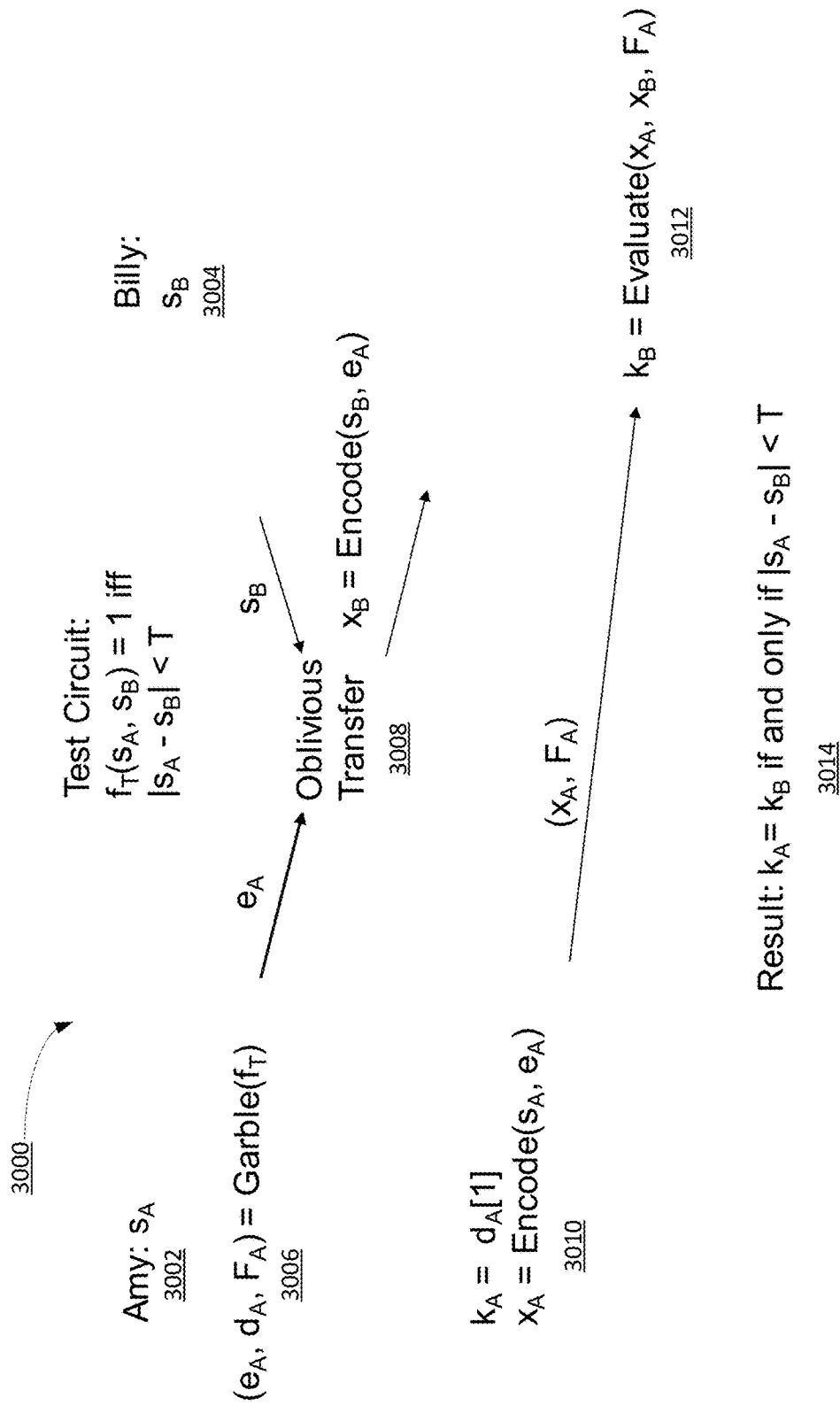
FIG. 30 is a schematic diagram showing an example of a key exchange via 2-party MPC using oblivious transfer and Yao's garbled circuits, in accordance with an exemplary embodiment.

FIG. 30 is a schematic diagram showing an example of a key exchange 3000 via 2-party MPC using an oblivious transfer and Yao's garbled circuits, in accordance with an exemplary embodiment. FIG. 30 shows the protocol being run in a first direction, i.e., from a party referred to as Amy 3002 (which may be Device 1) to a party referred to as Billy 3004 (which may be Device 2) in order to produce a first output key ($k_B$) 3014. In this key exchange process, Amy 3002 (with biometric template $S_A$) and Billy 3004 (with biometric template $S_B$) agree on a circuit ($f_T$) that determines if there is a biometric data match. The circuit $f_T(S_A, S_B)$ is equal to 1 if and only if $|S_A - S_B| <$ threshold (T). Amy 3002 garbles 3006 the circuit ($f_T$) to produce the garbled circuit $F_A$, a key to evaluate the circuit ($e_A$), and a key to decrypt circuit output ($d_A$). Amy 3002 then uses the oblivious transfer 3008 (on $S_B$ and $e_A$) to generate and send encoded circuit inputs ($x_B$) to Billy 3004. Amy 3002 then encodes 3010 her circuit inputs and sends the encoded circuit inputs ($x_A$), along with the garbled circuit $F_A$, to Billy 3004. Then, Billy 3004 evaluates 3012 the garbled circuit $F_A$, together with $x_A$ and $x_B$, to determine whether there is a biometric match. If the protocol is successful (a biometric match), then an output key ($k_B$) is produced 3014. The output key ($k_B$) is equal to key $k_A$ (i.e., $d_A[1]$) if and only if $|S_A - S_B| < T$.

In an exemplary embodiment, the protocol is additionally run in the reverse direction in order to produce a second output key, and the first and second output keys are combined to produce a final output key (e.g., using a hash or exclusive-OR operation) in order to prevent malicious garbling. Also, in an exemplary embodiment, all exchanged data is signed using the initially exchanged keys in order to prevent a man-in-the-middle attack.

Figure 22:
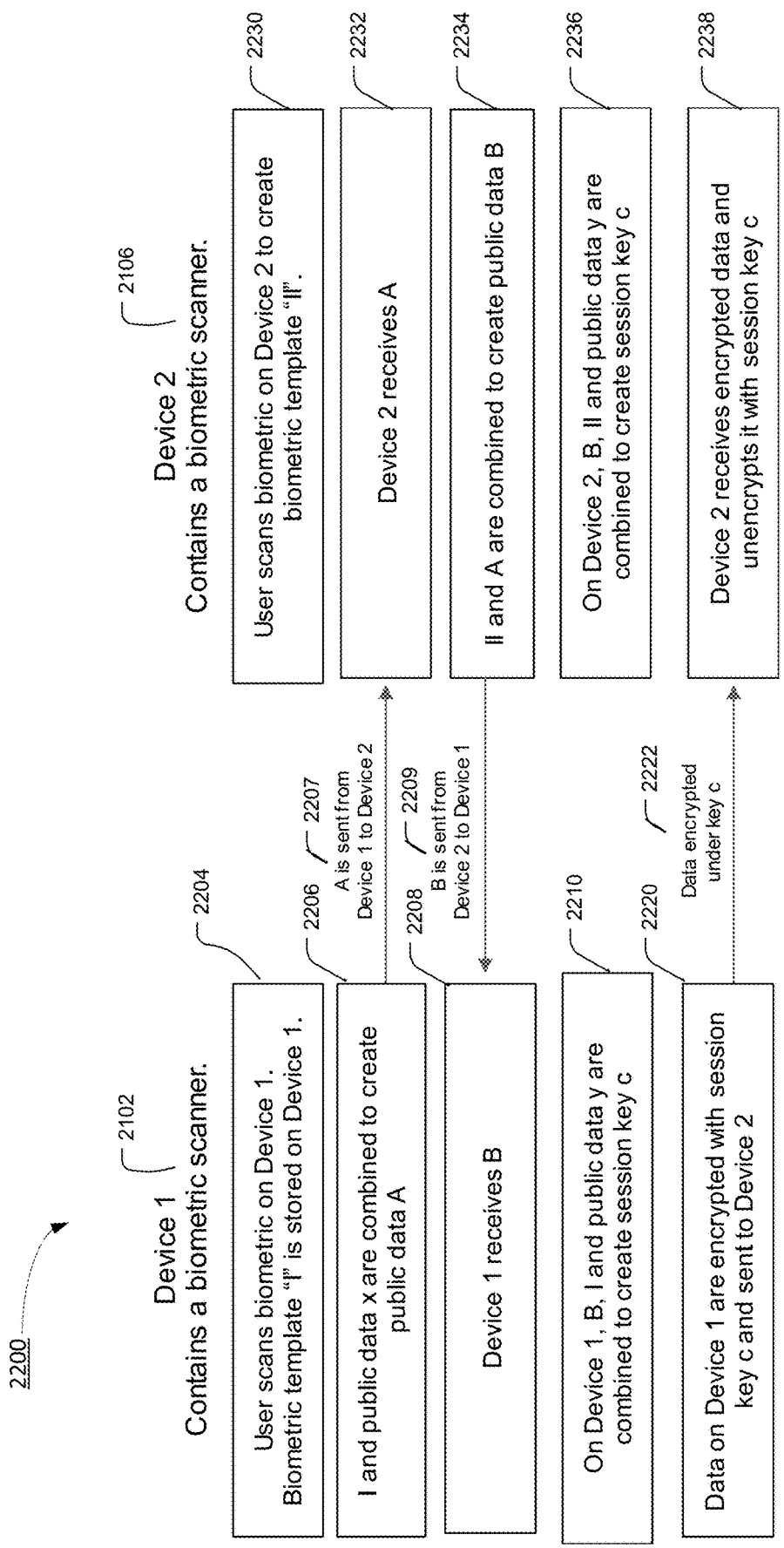
FIG. 22 is a schematic diagram providing a simplified description of another embodiment showing how the protocol can work to allow authentication of a subject using a second device as an individual whose biometric data is stored by a first device, in accordance with an exemplary embodiment.

FIG. 22 is a schematic diagram of a logic flow 2200 providing a simplified description of another embodiment showing how the protocol can work to allow authentication of a subject using Device 2 2106 as an individual whose biometric data is stored by Device 1 2101, in accordance with an exemplary embodiment. Here, Device 1 2102 stores 2204 biometric information for the enrolled individual in the form of a biometric template I, and Device 2 2106 creates 2230 a biometric template II upon receiving the biometric information for the subject (e.g., via a biometric scanner). Device 1 2102 combines 2206 the template I with public data x (e.g., a public key or other data available to both Device 1 2102 and Device 2 2206) to create public data A, and sends 2207 public data A to Device 2 2106. Device 2 2106 receives 2232 public data A and combines 2234 the template II with the public data A to create public data B, and sends 2209 public data B to Device 1 2102. Device 1 2102 receives 2208 public data B. Each device then creates 2210, 2236 a common session key c based on public data B and public data y (e.g., a public key or other data available to both Device 1 2102 and Device 2 2206). On Device 1 2102, public data B, template I, and public data y are combined to create 2210 the session key c. On Device 2 2106, public data B, template II, and public data y are combined to create 2236 session key c. The devices then can confirm that each device generated the same session key c, thereby successfully authenticating the subject as the individual. It also shows that once both devices have separately created the same session key c, they can perform secure communications, e.g., by using the session key c for symmetric encryption of messages. Once the user using Device 2 2106 has been confirmed to be the same user that enrolled on Device 1 2102, the user's data from Device 1 2102 can be encrypted 2220 with session key c and transmitted 2222 to Device 2 2106, wherein it can be decrypted 2238 and loaded on Device 2 2106. Thus, the user's data including cookies, saved passwords, photos, files, etc. can seamlessly be transferred to the new device. As in FIG. 21, Device 1 2102 is shown as including or containing a biometric scanner for use in enrolling the user, but, as discussed above, Device 1 2102 could store biometric information (e.g., biometric template I) obtained elsewhere, without requiring Device 1 2102 to have a biometric scanner or perform an enrollment of the user.

Figure 23:
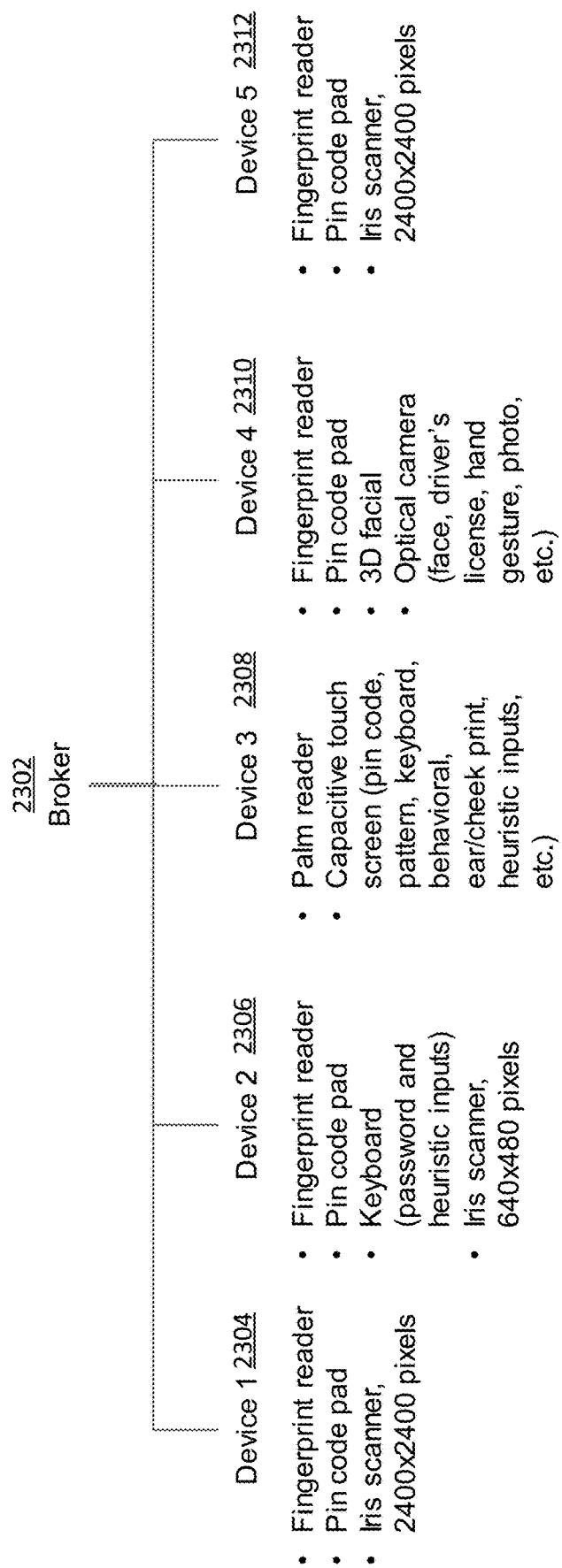
FIGS. 23 and 24 describe exemplary involvement of a Broker, in accordance with an exemplary embodiment.
Figure 24:
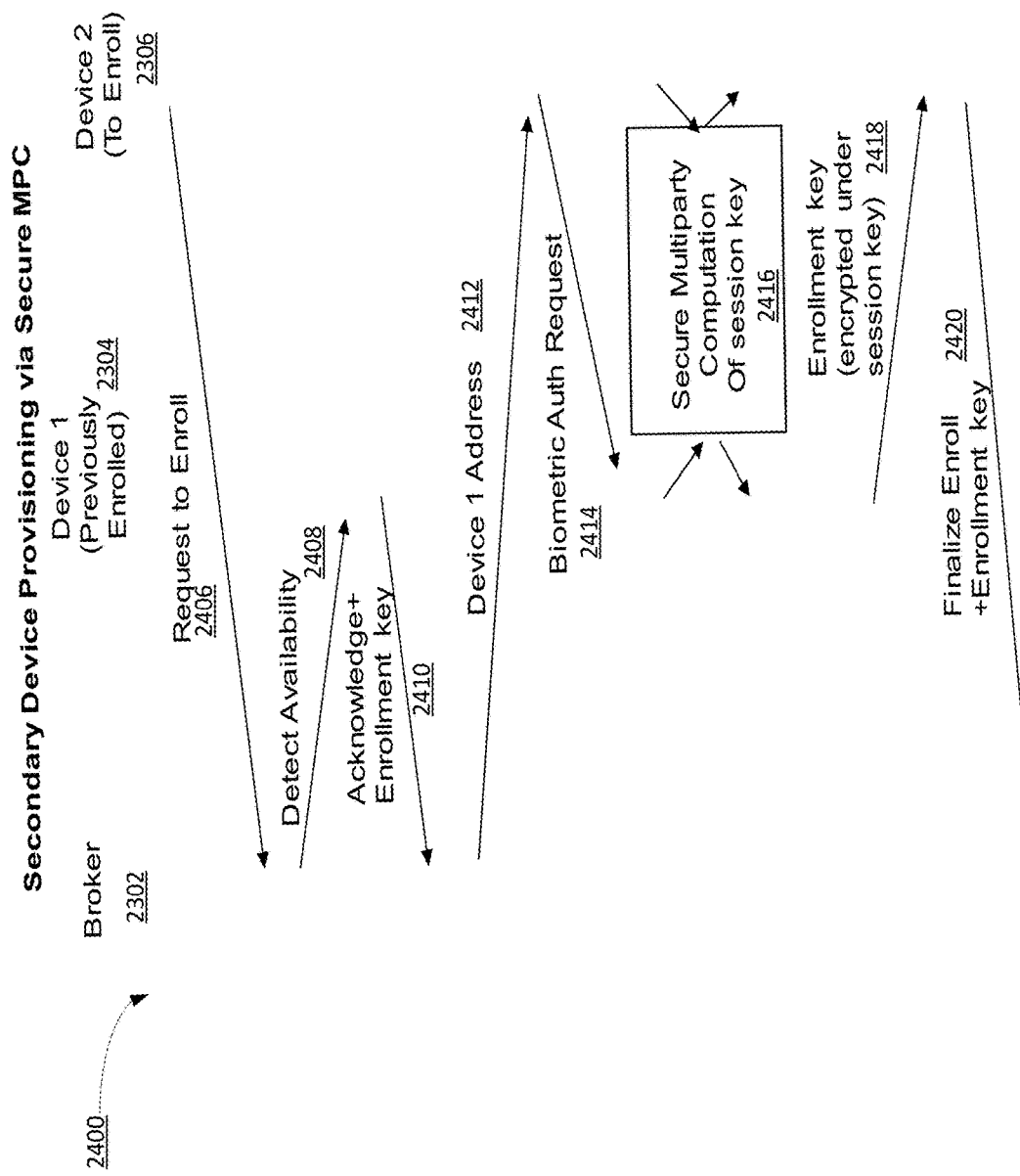

FIGS. 23 and 24 describe exemplary involvement of a Broker 1302, in accordance with an exemplary embodiment. The Broker 2302 could be a server, or the broker could be the user. A primary purpose of the broker 2320 is to connect Device 2 1306 to another device where the user has previously enrolled (in FIG. 21 and FIG. 24, Device 2 is connected to Device 1). The devices 2304, 2306, 2308, 2310, and 2312 include authentication components, such a fingerprint reader, pin code pad, keyboard (e.g., with password and heuristic inputs) iris scanner (e.g., 2400×2400 pixels, 640× 480 pixels, etc.), palm reader, capacitive touch screen, 3D facial optical camera, etc. If the devices 2304, 2306, 2308, 2310, and 2312 are connected to the internet, "connecting" could be accomplished by, for example, giving the IP address of Device 1 2304 to Device 2 2306.

In one exemplary embodiment, the broker 1302 is a central server hosted by the biometric public key authentication service (e.g., as shown in FIG. 14). Broker 1302 is a trusted central authority. When a device 2304, 2306, 2308, 2310, and 2312 is enrolled, information about the device and the biometric scanner used to obtain user biometric data, referred to herein as "specification information" (e.g., which biometric modalities it has, resolution, non-biometric inputs, etc., and which types of data it has for the user, e.g., fingerprint, password, pincode, iris, etc.) is conveyed to the Broker 2302. The "new" device, in this case Device 2 2306, indicates its specifications (e.g., which biometric modalities it has, resolution, non-biometric inputs, etc.) to the broker 2302. As depicted in FIG. 23, the broker looks across all devices 2304, 2308, 2310, and 2312 where the user is provisioned and determines which device (if any) is the best match to Device 2 2306, e.g., in terms of specification information. In this example, the broker selects Device 1 2304. In one exemplary embodiment, the broker and Device 1's communications are secured, e.g., encrypted under SSL. The broker 2302 and Device 2's communications are secured, e.g., encrypted under SSL. If the broker 2302 cannot find an available device, the broker 2302 can revert to use of the fuzzy extractor non-persistent storage method—which may require a higher level of entropy than the peer-peer enrollment—meaning more or better biometric scans to authenticate on the new device.

Thus, there is provided a peer-to-peer biometric enrollment and authentication method, as well as a method of brokering to mix and match capabilities with the available devices so as to enable the use of devices with varying biometric sensors and other user inputs. These methods also allow the user to provision keys into devices that are centrally managed without trusting the central authority to protect their secure data, as shown in FIG. 24. These methods can be contrasted with current ways to provision keys, which generally require the user to register with each new device (e.g., by logging in with user/password for each application), and also generally require revocation of obsolete keys from the old lost/stolen/inactive device. It should be noted that the peer-to-peer biometric enrollment/authentication techniques allow for bilateral protection without an established trust relationship between the first and second devices either directly or through a trusted intermediary. For example, the first device may be compromised or may be an impostor that purports to store biometrics of the user but instead is trying to "spoof" the user, e.g., in order to transfer harmful data to the user's second device, or the user of the second device may be an impostor who is trying to gain access to the user's first device. The peer-to-peer authentication protocol described herein will not work unless both devices have access to reliable biometric data of the user, and therefore each device essentially authenticates the other by virtue of the common key resulting from the protocol. Also, the peer-to-peer authentication works over an insecure communication link without allowing an eavesdropper or man-in-the-middle to obtain or compromise the biometric data or the common key resulting from the protocol. It also should be noted that further protections can be provided through multi-party authentication in which portions of biometric data of the user are stored across multiple devices rather than the biometric data being stored in a single device (e.g., iris or fingerprint data may be divided into shards that are stored in a distributed manner among multiple devices, where each such device, or a set of such devices, may be considered a "first device" with respect to the peer-to-peer authentication protocol).

FIG. 24 illustrates a logic flow 2400 of an example secondary device provisioning method via a secure multi-party computation (MPC). In FIG. 24, Device 2 2306 requests 2406 the Broker 2302 for peer-to-peer biometric enrollment with Device 1 2304. The Broker 2302 detects 2408 availability of Device 1 2304 for peer-to-peer biometric enrollment, and sends an enrollment inquiry to Device 1 2406. Device 1 responds to the Broker 2302 with acknowledgement 2410 of the request and its biometric enrollment key. The Broker 2302 then transmits 2412 the address of Device 1 2304 to Device 2 2306. In response, Device 2 2306 requests 2414 biometric authentication from Device 1. Based on the requested biometric authentication, a secure multiparty computation of the session key is performed 2416 by Device 1 2302 in communication with Device 2 2306. Once the session key is computed, Device 1 2304 transmits 2418 its enrollment key to Device 2 2306, which provisions the biometric authentication information and enrollment key encrypted under the session key. The peer-to-peer biometric enrollment is finalized (Device 2 provisioned) by Device 2 2306 generating and providing an enrollment key to Broker 2302. Device 2 transmits 2420 the finalized enrollment with enrollment key to the Broker 2302. The embodiments of the invention described above are intended to be merely exemplary; numerous variations and modifications will be apparent to those skilled in the art. All such variations and modifications are intended to be within the scope of the present invention as defined in any appended claims.

Various embodiments of the invention may be implemented at least in part in any conventional computer programming language. For example, some embodiments may be implemented in a procedural programming language (e.g., "C"), or in an object oriented programming language (e.g., "Java"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed in a non-transitory manner on a medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention may be implemented as entirely hardware, or entirely software.

What is claimed is:

1. A system for using biometric data to authenticate a subject as an individual whose biometric data has been previously obtained using a first transducer, without a need for non-transient storage of the biometric data, the system comprising:
a second transducer; and
a first computing facility that is coupled to the second transducer, the first computing facility including a computing processor and a non-transitory computer readable storage medium encoded with instructions that, when executed by the computing processor, establish processes comprising:
receiving by the first computing facility a request for a transaction;
receiving by the first computing facility, from the second transducer, a digital electronic signal that characterizes a biometric of the subject;
extracting by the first computing facility, from the digital electronic signal, (a) a set of biometric values of the subject and (b), for each member of the set of biometric values of the subject, a confidence value indicating a degree of confidence that the corresponding biometric value is stable between characterizations;

using the confidence values to select, by the first computing facility, a confident subset of the set of biometric values of the subject, the confident subset being a reliable discriminant of an identity of the subject based on the biometric;

receiving by the first computing facility, from a storage facility, a biometric public key that was computed based on a secret number and the biometric data of the individual that has been previously obtained using the first transducer, wherein the biometric public key verifiably characterizes both the biometric data of the individual and the secret number without a need for non-transient storage of either the biometric data of the individual or the secret number;

calculating, by the first computing facility, a candidate value for the secret number using the biometric public key and the confident subset;

determining by the first computing facility whether the subject is authenticated as the individual by determining whether the candidate value for the secret number is deemed equivalent to the secret number characterized by the biometric public key; and when the subject is authenticated as the individual, constructing by the first computing facility the transaction, digitally signing the transaction using the secret number, and transmitting the signed transaction to a transaction processor.

2. The system according to claim 1, wherein the storage facility is a public data source for storing the biometric public key, and the system further comprises a hardware security module for authenticating the public data source by the first computing facility.

3. The system according to claim 1, further comprising a non-transitory data store, wherein the storage facility is the non-transitory data store.

4. The system according to claim 1, wherein the storage facility is a cryptographic token provided by the subject.

5. The system according to claim 1, further comprising a hardware security module for ensuring integrity of the second transducer.

6. The system according to claim 1, further comprising a mathematics coprocessor.

7. The system according to claim 1, wherein the established processes further comprise receiving by the first computing facility, from the storage facility, a one-way function of the secret number, and wherein transmitting, by the first computing facility, includes applying the one-way function to the candidate value for the secret number and comparing a result to the received one-way function of the secret number.

8. The system according to claim 7, wherein the one-way function is a cryptographic hash function.

9. The system according to claim 1, wherein the biometric public key includes data comprising a bitwise exclusive OR of (a) a vector of biometric values of the individual, with (b) a matrix product of a binary matrix with a representation of the secret number as a vector of bits.

10. The system according to claim 9, wherein the binary matrix is non-square, and wherein transmitting, by the first computing facility, includes (a) calculating, by the first computing facility, a set of candidate biometric values of the individual using the biometric public key, the binary matrix, and the secret number, and (b) determining that a Hamming distance between the set of candidate biometric values of the individual and the set of extracted biometric values of the subject is less than a given threshold distance.

11. The system according to claim 9, wherein the binary matrix is selected from the group consisting of (i) associated uniquely with the individual, (ii) associated uniquely with a device, (iii) permanently fixed as a design parameter wherein a same binary matrix is used to authenticate multiple individuals, and (iv) combinations thereof.

12. The system according to claim 1, further comprising a third transducer for inputting additional assurance data used to compute the biometric public key.

13. The system according to claim 1, further comprising, using, by the first computing facility, biometric data pertaining to a different measurable characteristic to authenticate a second subject as a second individual whose biometric data has been previously obtained.

14. The system according to claim 1, further comprising decrypting, by the first computing facility using the candidate value for the secret number, encrypted cipher text received by a computing device in which the first computing facility is disposed.

15. The system according to claim 1, further comprising digitally signing a message, by the first computing facility, using the candidate value for the secret number.

16. The system according to claim 1, further comprising:
receiving encrypted firmware for booting a computing device in which the first computing facility is disposed, by the first computing facility, from a memory of the computing device;
decrypting, by the first computing facility using the candidate value for the secret number, the encrypted firmware to produce decrypted firmware; and
providing the decrypted firmware by the first computing facility to a computing processor of the computing device.

17. The system according to claim 1, further comprising executing a cryptographic algorithm that operates on the secret number, by the first computing facility, responsive to a request message from an application executing on a computing processor of a computing device in which the first computing facility is disposed.

18. The system according to claim 1, further comprising establishing time-restricted access to a resource, including:
allowing by a second computing facility access to the resource by a designated owner of the resource with no time restriction; and
allowing by the second computing facility access to the resource by a party other than the designated owner only when a specified condition has been satisfied.

19. The system according to claim 18, wherein the second computing facility is the same as the first computing facility.

20. The system according to claim 18, wherein the specified condition is occurrence of a passage of a specified amount of time since last access to the resource.

21. The system according to claim 18, wherein the transaction is access to a blockchain, and the specified condition is a time restriction based on a relative height of the blockchain.

22. The system according to claim 1, wherein the instructions include a P2SH script.

23. A system for using biometric data to encrypt target data of a subject as an individual whose biometric data has been previously obtained using a first transducer, without a need for non-transient storage of the biometric data, the system comprising:
a second transducer; and a computing facility that is coupled to the second transducer, the computing facility including a computing processor and a non-transitory computer readable storage medium encoded with instructions that, when executed by the computing processor, establish processes comprising:
  receiving by the computing facility target data to be encrypted;
  receiving by the computing facility, from the second transducer, a digital electronic signal that characterizes a biometric of the subject;
  extracting by the computing facility, from the digital electronic signal, (a) a set of biometric values of the subject and (b), for each member of the set of biometric values of the subject, a confidence value indicating a degree of confidence that the corresponding biometric value is stable between characterizations;
  using the confidence values to select, by the computing facility, a confident subset of the set of biometric values of the subject, the confident subset being a reliable discriminant of an identity of the subject based on the biometric;
  receiving by the computing facility, from a storage facility, a biometric public key that was computed based on a secret number and the biometric data of the individual that has been previously obtained using the first transducer, wherein the biometric public key verifiably characterizes both the biometric data of the individual and the secret number without a need for non-transient storage of either the biometric data of the individual or the secret number;
  calculating, by the computing facility, a candidate value for the secret number using the biometric public key and the confident subset;
  determining by the computing facility whether the candidate value for the secret number is deemed equivalent to the secret number characterized by the biometric public key; and
  encrypting the target data using the biometric public key.

24. A system to decrypt encrypted target data using biometric data of a subject as an individual whose biometric data has been previously obtained using a first transducer, without a need for non-transient storage of the biometric data, the system comprising:
  a second transducer; and
  a computing facility that is coupled to the second transducer, the computing facility including a computing processor and a non-transitory computer readable storage medium encoded with instructions that, when executed by the computing processor, establish processes comprising:
    receiving by the computing facility the encrypted target data, wherein the target data has been encrypted using a biometric public key of the subject, wherein the biometric public key was computed based on a secret number and the biometric data of the individual that has been previously obtained using the first transducer, wherein the biometric public key verifiably characterizes both the biometric data of the individual and the secret number without a need for non-transient storage of either the biometric data of the individual or the secret number;
    receiving by the computing facility, from the second transducer, a digital electronic signal that characterizes a biometric of the subject;
    extracting by the computing facility, from the digital electronic signal, (a) a set of biometric values of the subject and (b), for each member of the set of biometric values of the subject, a confidence value indicating a degree of confidence that the corresponding biometric value is stable between characterizations;
    using the confidence values to select, by the computing facility, a confident subset of the set of biometric values of the subject, the confident subset being a reliable discriminant of an identity of the subject based on the biometric;
    receiving by the computing facility, from a storage facility, the biometric public key;
    calculating, by the computing facility, a candidate value for the secret number using the biometric public key and the confident subset;
    determining by the computing facility whether the candidate value for the secret number is deemed equivalent to the secret number characterized by the biometric public key; and
    using the secret number to decrypt the encrypted target data.

* * * * *